(12) United States Patent
Poulsen et al.

(10) Patent No.: US 6,286,130 B1
(45) Date of Patent: *Sep. 4, 2001

(54) SOFTWARE IMPLEMENTED METHOD FOR AUTOMATICALLY VALIDATING THE CORRECTNESS OF PARALLEL COMPUTER PROGRAMS

(75) Inventors: David K. Poulsen; Paul M. Petersen; Sanjiv M. Shah, all of Champaign, IL (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/906,281

(22) Filed: Aug. 5, 1997

(51) Int. Cl.[7] .................................................. G06F 9/44
(52) U.S. Cl. ...................................................... 717/4
(58) Field of Search ..................................... 395/704, 706; 717/4, 5, 6, 7, 8, 9; 714/25

(56) References Cited

U.S. PATENT DOCUMENTS

| | | | |
|---|---|---|---|
| 3,707,725 | * 12/1972 | Dellheim ............................. | 714/38 |
| 5,048,018 | * 9/1991 | Berstein et al. . | |
| 5,168,554 | * 12/1992 | Luke . | |
| 5,193,180 | 3/1993 | Hastings . | |
| 5,241,675 | * 8/1993 | Sheth et al. . | |
| 5,335,344 | 8/1994 | Hastings . | |
| 5,371,747 | * 12/1994 | Books et al. . | |
| 5,535,329 | 7/1996 | Hastings . | |
| 5,583,988 | 12/1996 | Crank et al. . | |
| 5,689,712 | * 11/1997 | Heisch . | |
| 5,790,858 | * 8/1998 | Vogel . | |
| 5,860,009 | * 1/1999 | Uchihira et al. . | |

OTHER PUBLICATIONS

Helmbold, D.P., and McDowell, C.E., "A Taxonomy of Race Detection Algorithms", Department of Computer and Information Sciences, University of California, Santa Cruz, techincal report No. UCSC–CRL–94–35, Sep. 28, 1994.

(List continued on next page.)

Primary Examiner—Alvin E. Oberley
Assistant Examiner—George Opie
(74) Attorney, Agent, or Firm—Blakely, Sokoloff, Taylor & Zafman LLP

(57) ABSTRACT

A software-implemented method for validating the correctness of parallel computer programs, written in various programming languages, with respect to these programs' corresponding sequential computer programs. Validation detects errors that could cause parallel computer programs to behave incorrectly or to produce incorrect results, and is accomplished by transforming these parallel computer programs under the control of a general purpose computer and sequentially executing the resulting transformed programs. The validation method is system-independent and is portable across various computer architectures and platforms since validation is accomplished via program transformation; thus, the method does not depend on the features of a particular hardware architecture or configuration, operating system, compiler, linker, or thread environment. The input to the validation method is a parallel computer program. The parallel computer program results from annotating its corresponding sequential computer program with a parallelism specification; the annotations describe constraints in the sequential program to be relaxed to allow the exploitation of parallelism. Validation is accomplished by detecting semantic inconsistencies between the parallel computer program and its corresponding sequential computer program. The validation method translates the input parallel computer program into a second, sequential computer program such that the second sequential computer program, when executed, detects and reports the semantic inconsistencies between the parallel computer program and its corresponding sequential computer program.

25 Claims, 56 Drawing Sheets

OTHER PUBLICATIONS

Helmbold, D.P., McDowell, C.E., and Wang, J.–Z., "Analyzing Traces with Anonymous Synchronization", Proceedings of the 1990 International Conference on Parallel Processing, Aug., 1990, pp. II–70–77.

Helmbold, D.P., McDowell, C.E., and Wang, J.–Z., "Detecting Data Races from Sequential Traces", Proceedings of the 1991 Hawaii International Conference on System Sciences, pp. 408–417.

Mellor–Crummey, J., "On–the–fly Detection of Data Races for Programs with Nested Fork–Join Parallelism", Proceedings of Supercomputing 1991, Albuquerque, NM, Nov., 1991, pp. 24–33.

Mellor–Crummey, J., "Compile–time Support for Efficienct Data Race Detection in Shared–Memory Parallel Programs", Center for Research on Parallel Computation, Rice University, technical report No. CRPC–TR92232, Sep., 1992.

Hood, R., Kennedy, K, and Mellor–Crummey, J., "Parallel Program Debugging with On–the–fly Anomaly Detection", Proceedings of Supercomputing 1990, New York, NY, Nov., 1990, pp. 74–81.

Petersen, P.M., and Padua, D.A., "Dynamic Dependence Analysis: A Novel Method for Data Dependence Evaluation", Proceedings of the 5th Workshop on Languages and Compilers for Parallel Computing, New Haven, CT, Aug. 3–5, 1993, Lecture Notes in Computer Science, vol. 757, 1993, pp. 64–81.

Abramson. D., Foster, I., Michalakes, J., and Sosic, R., "Relative Debugging and its Application to the Development of Large Numerical Models", Proceedings of Supercomputing 1995, San Diego, CA, Nov., 1995.

Parallel Computing Forum, "The Parallel Computing Forum presents: PCF Fortran." B. Leisure, ed. (Aug. 1, 1990), pp. 45–50.

Guide Reference Manual, Version 2.1, Document No. 9607001. Champaign, IL, Kuck and Associates, Inc. Sep. 1996, pp. 5–22.

Aho, A.V., Sethi, R., and Ullman, J.D., "Compilers: Principles, Techniques, and Tools." Reading, Mass. Addison–Wesley, 1988. pp. 528–530.

* cited by examiner

FIG. 1 - Overall Structure of Invention
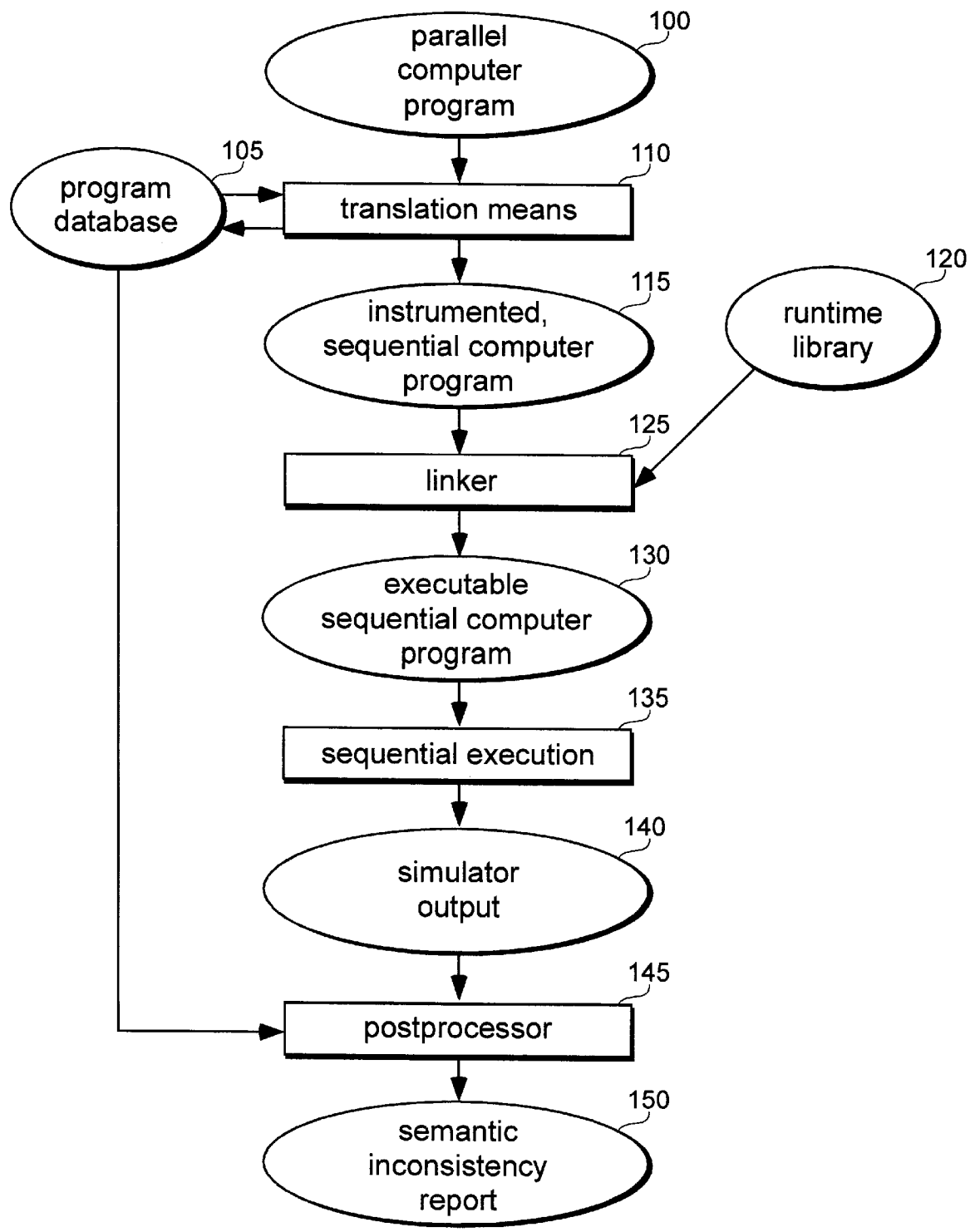

FIG. 2 - Algorithm for Translation Means 110
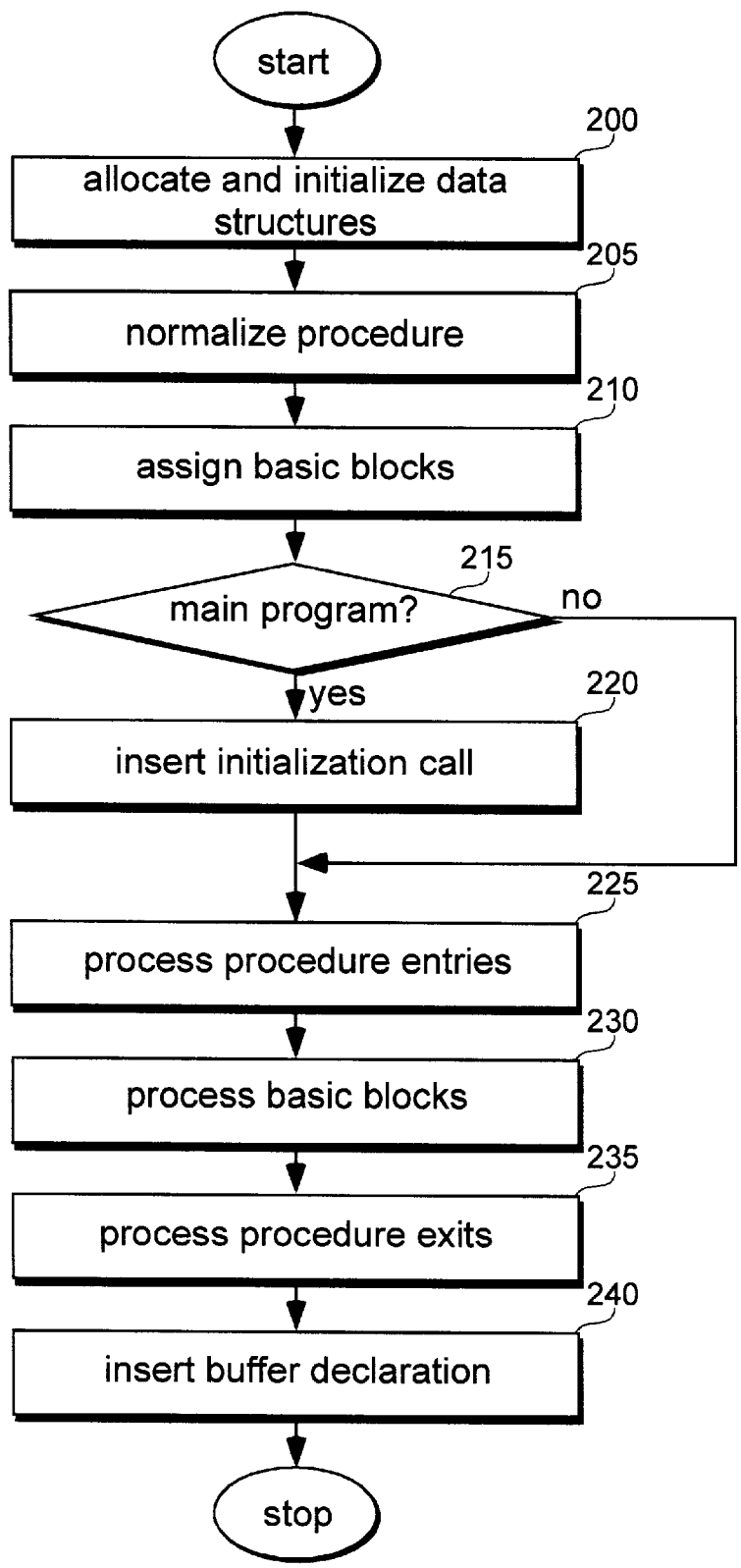

FIG. 3 - Process Procedure Entries, Step 225
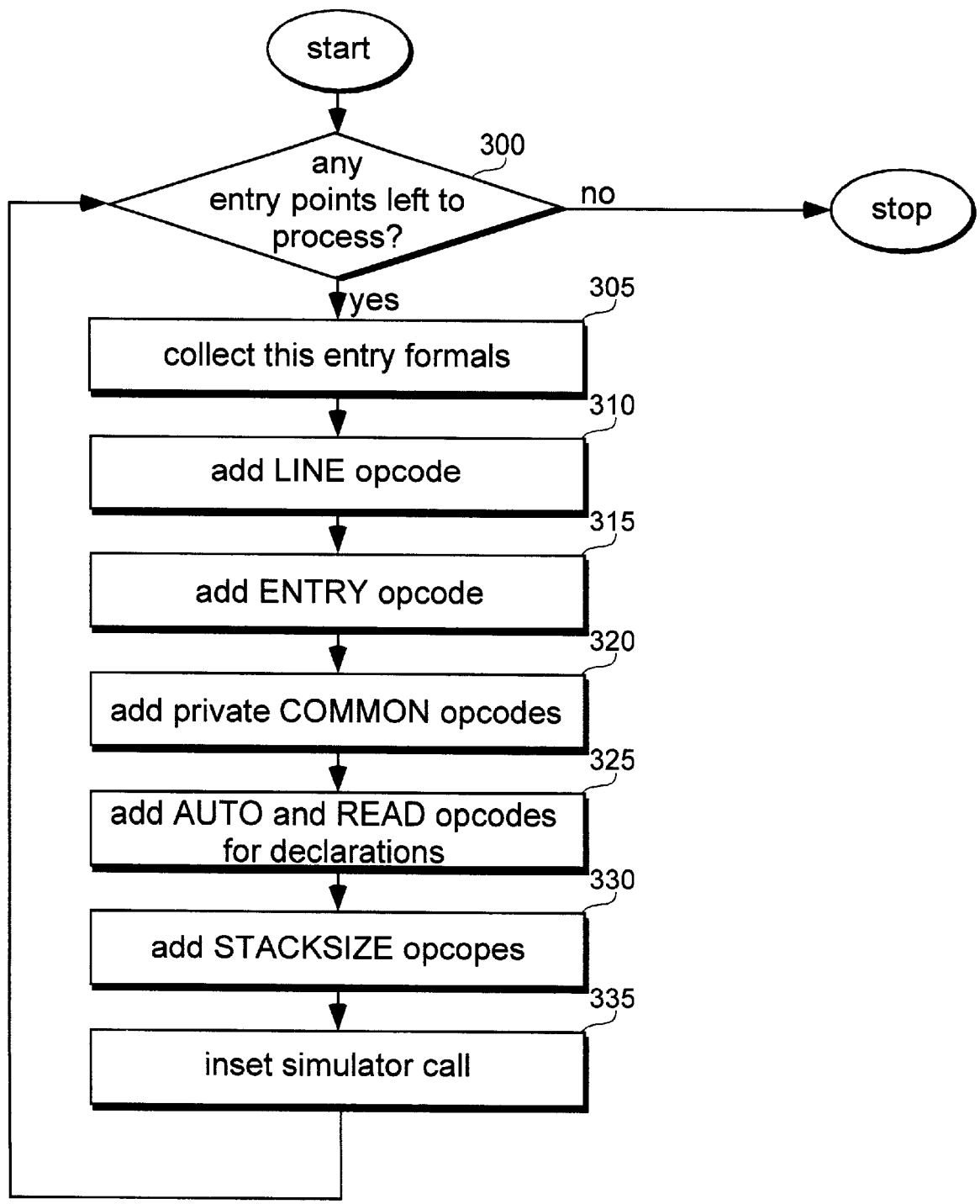

FIG. 4 - Process Basic Blocks, Step 230
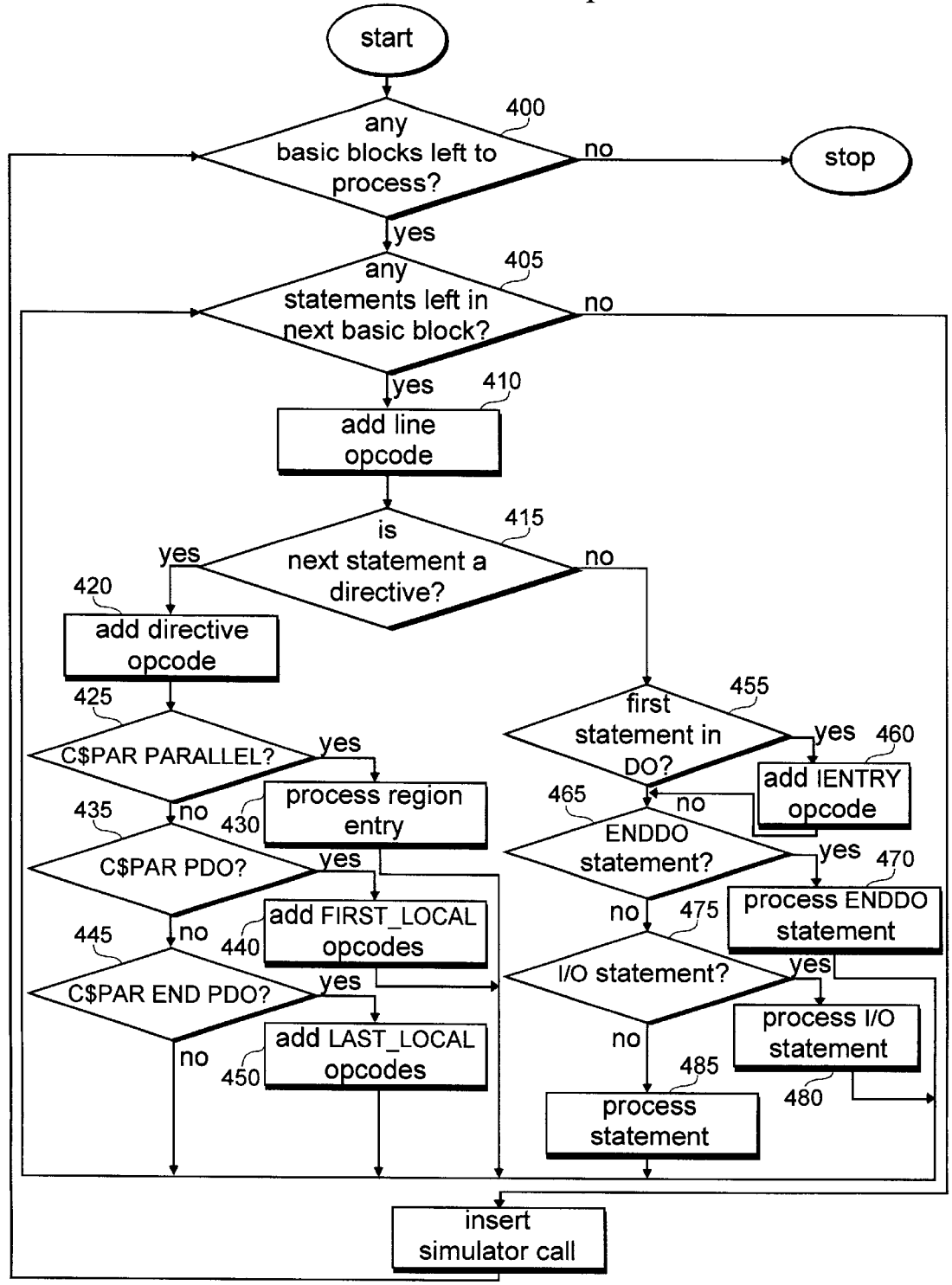

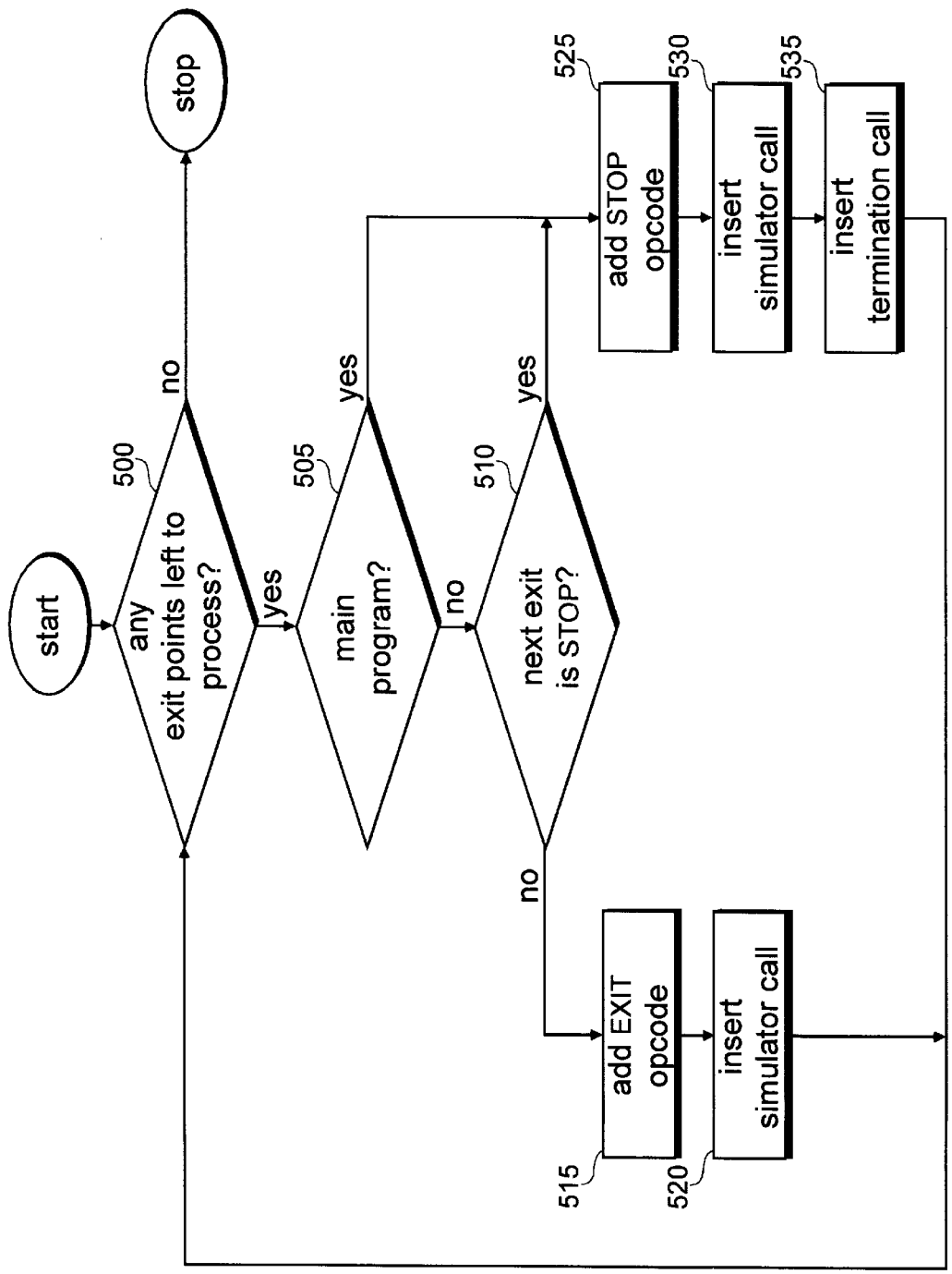
FIG. 5 - Process Procedure Exits, Step 235

FIG. 6 - Process Region Entry, Step 430
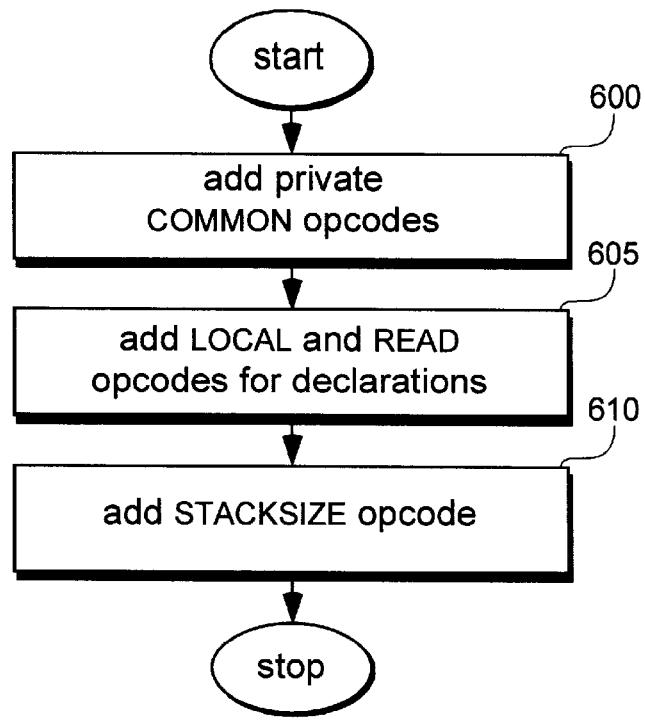
FIG. 7 - Process ENDDO Statement, Step 470
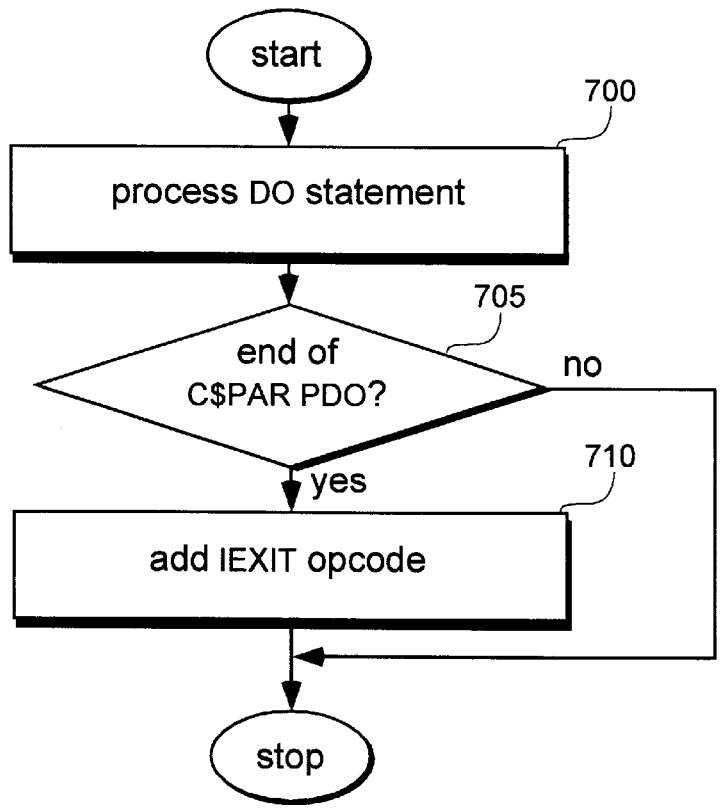

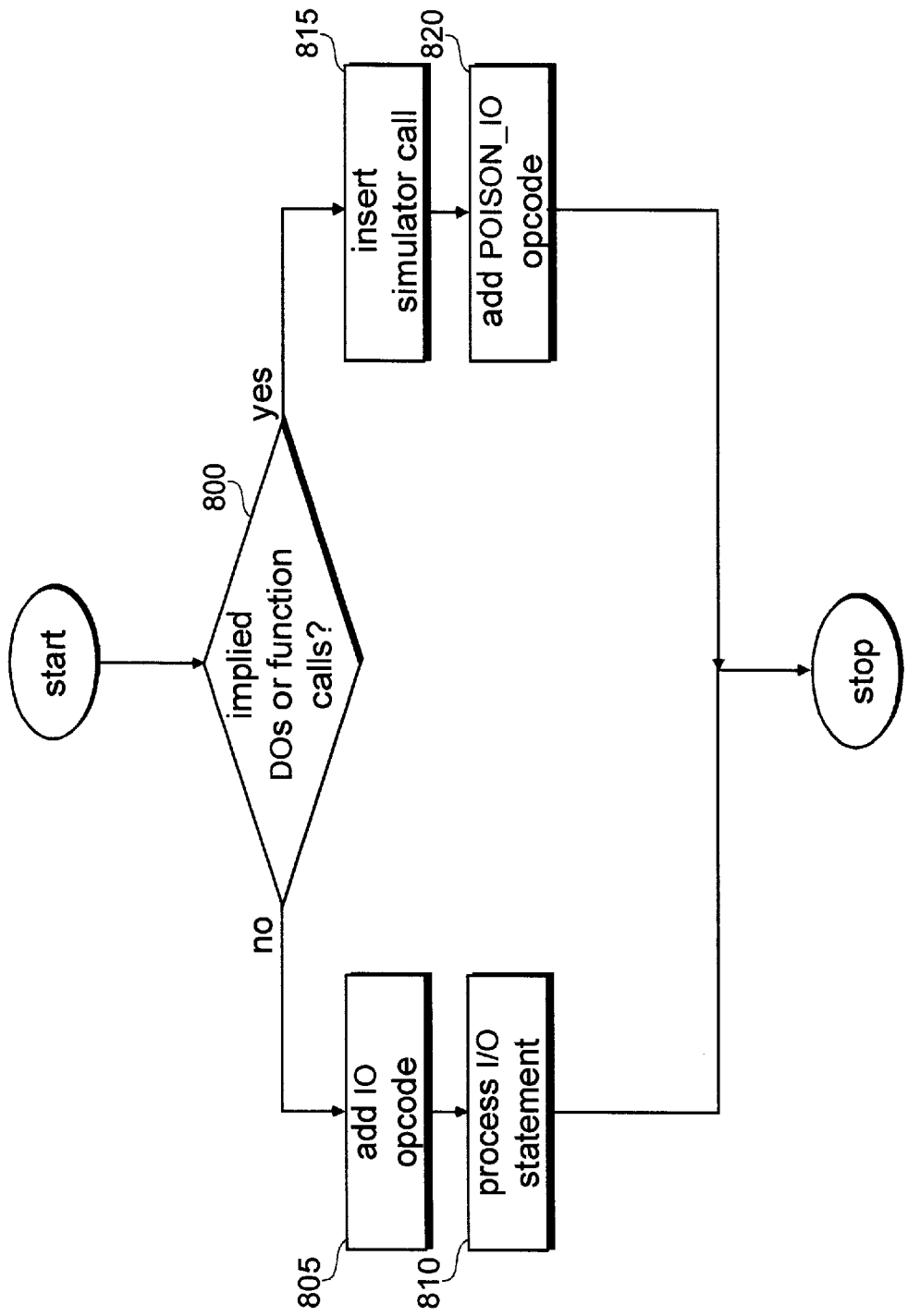
FIG. 8 - Process I/O Statement, Step 480

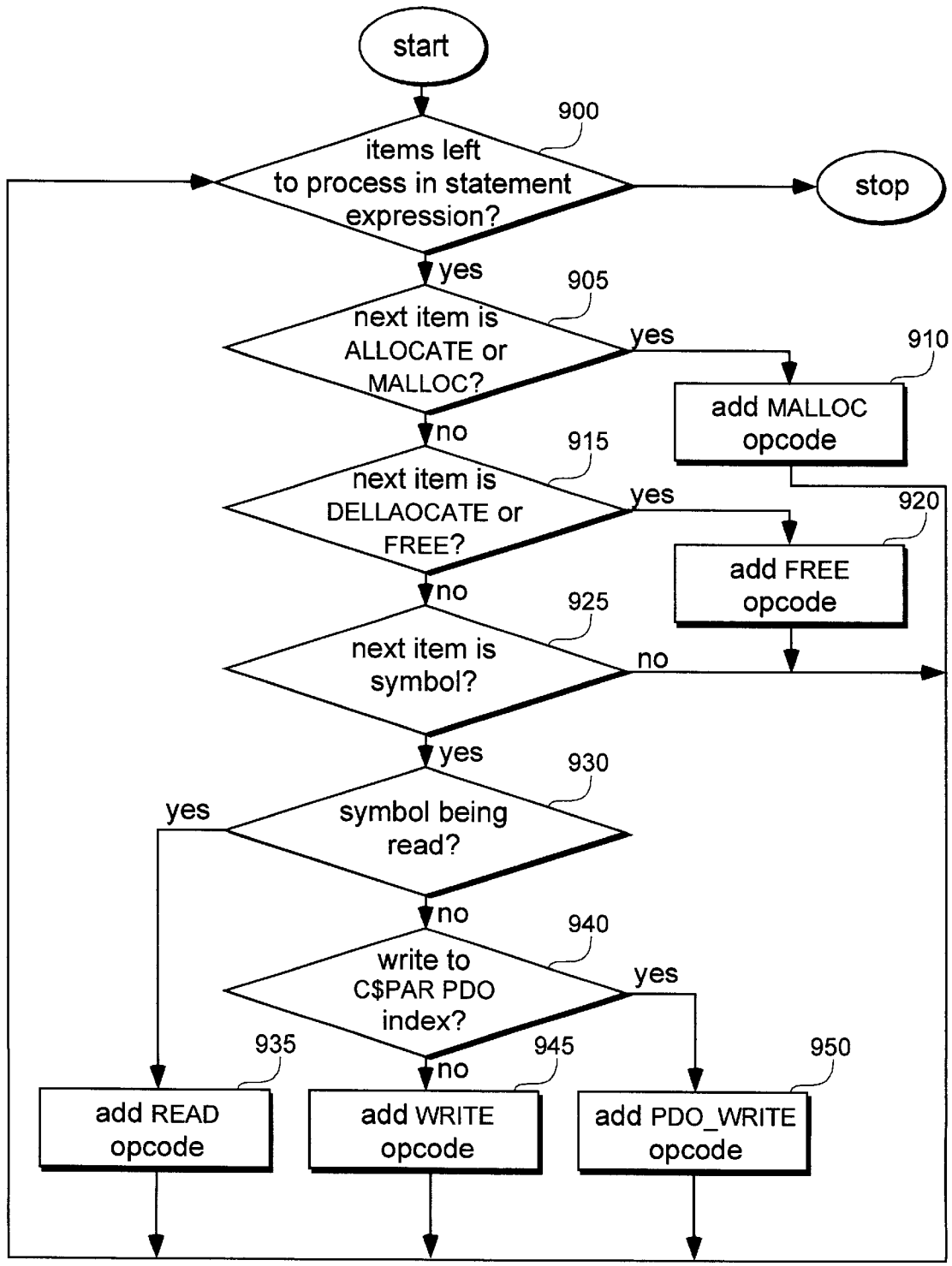
FIG. 9 - Process Statement, Steps 485, 700, 810

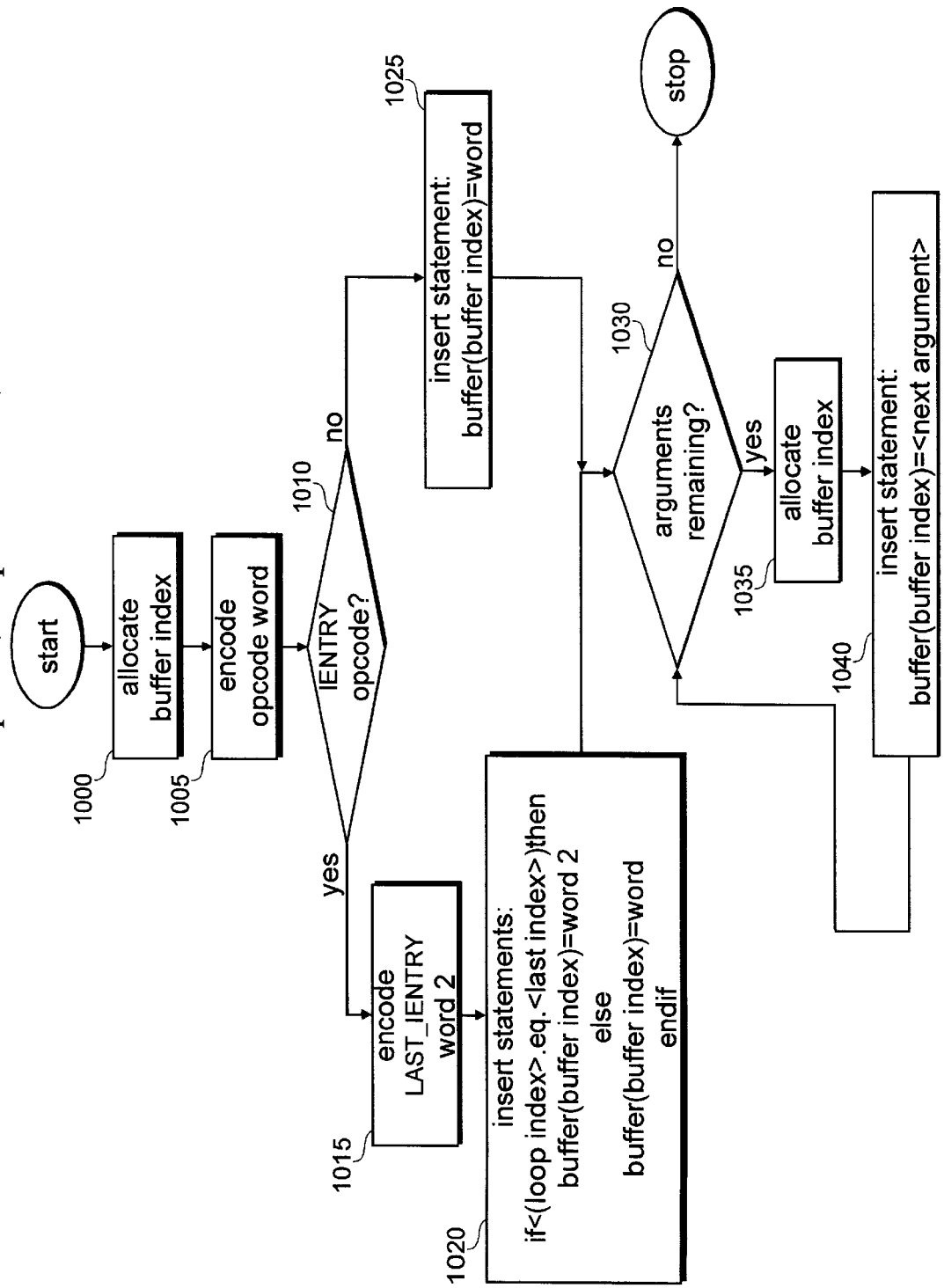
FIG. 10 - Add Opcode, Steps 310 - 330, etc.

FIG. 11 - Allocate Buffer Index, Steps 1000, 1035
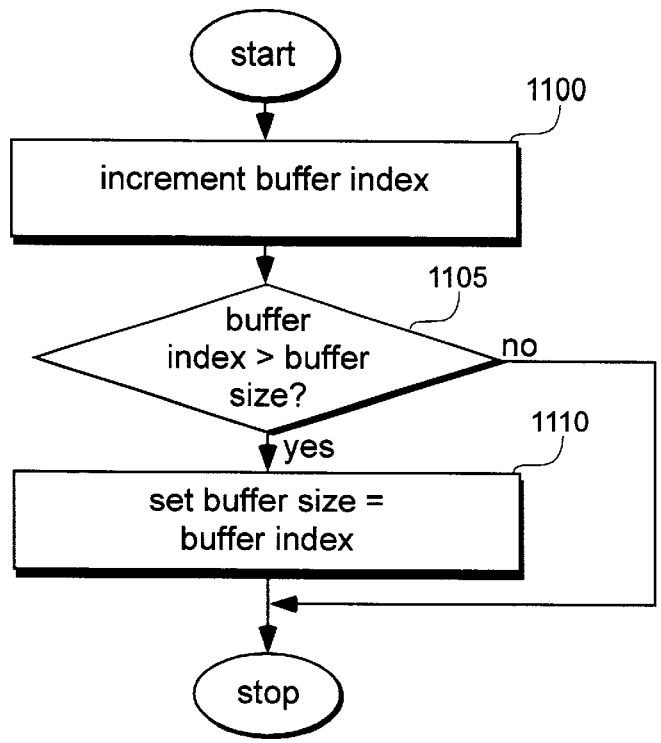
FIG. 12 - Algorithm for Initialization Calls Inserted by Step 220
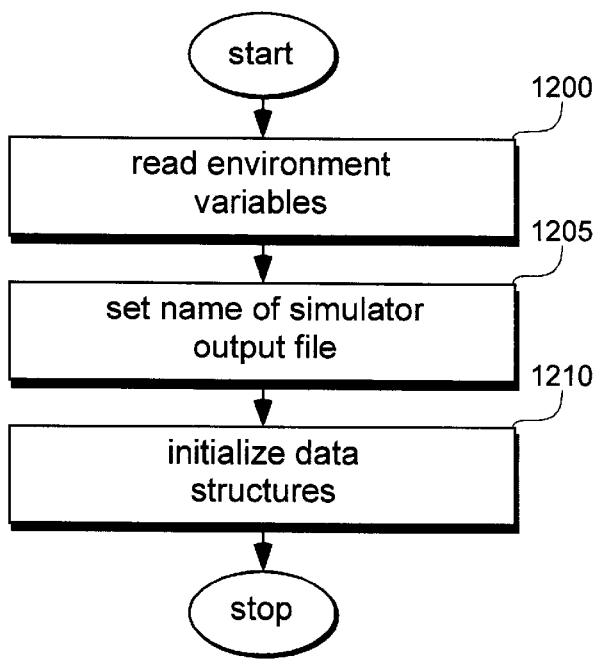

FIG. 13 - Algorithm for Simulator Calls Inserted by Steps 335, 490, etc.
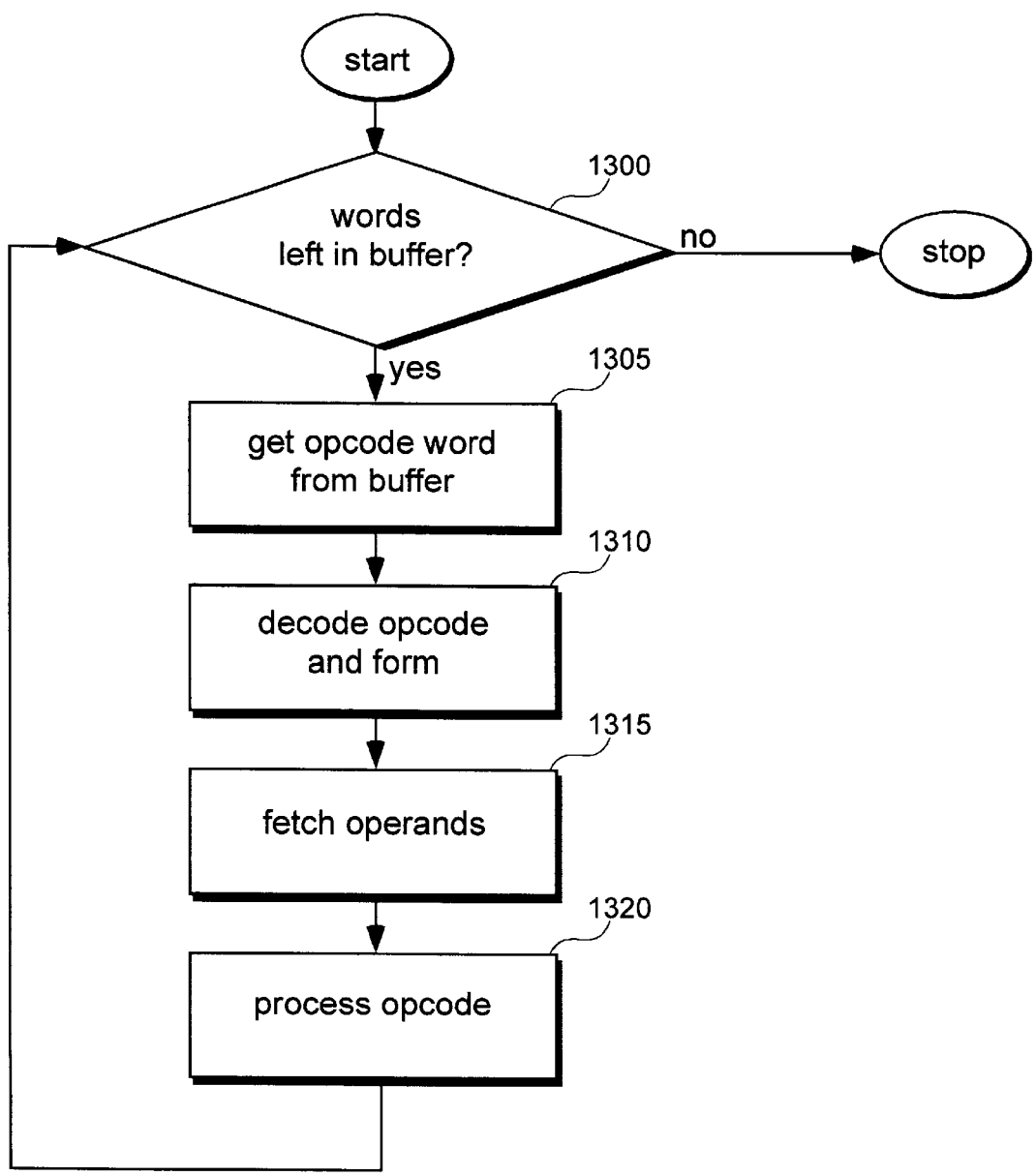

FIG. 14 - Algorithm for Step 1320, READ and WRITE Opcodes
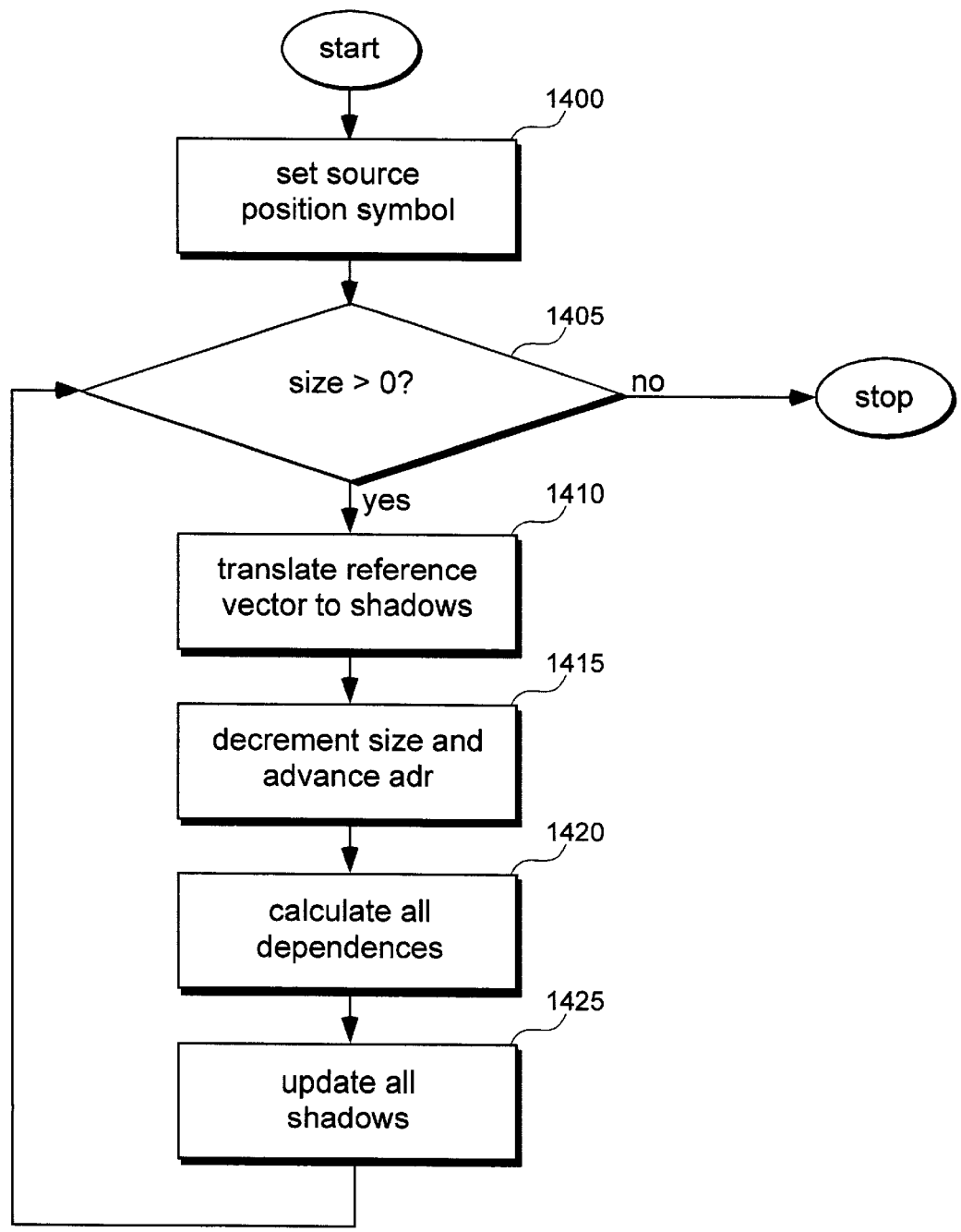

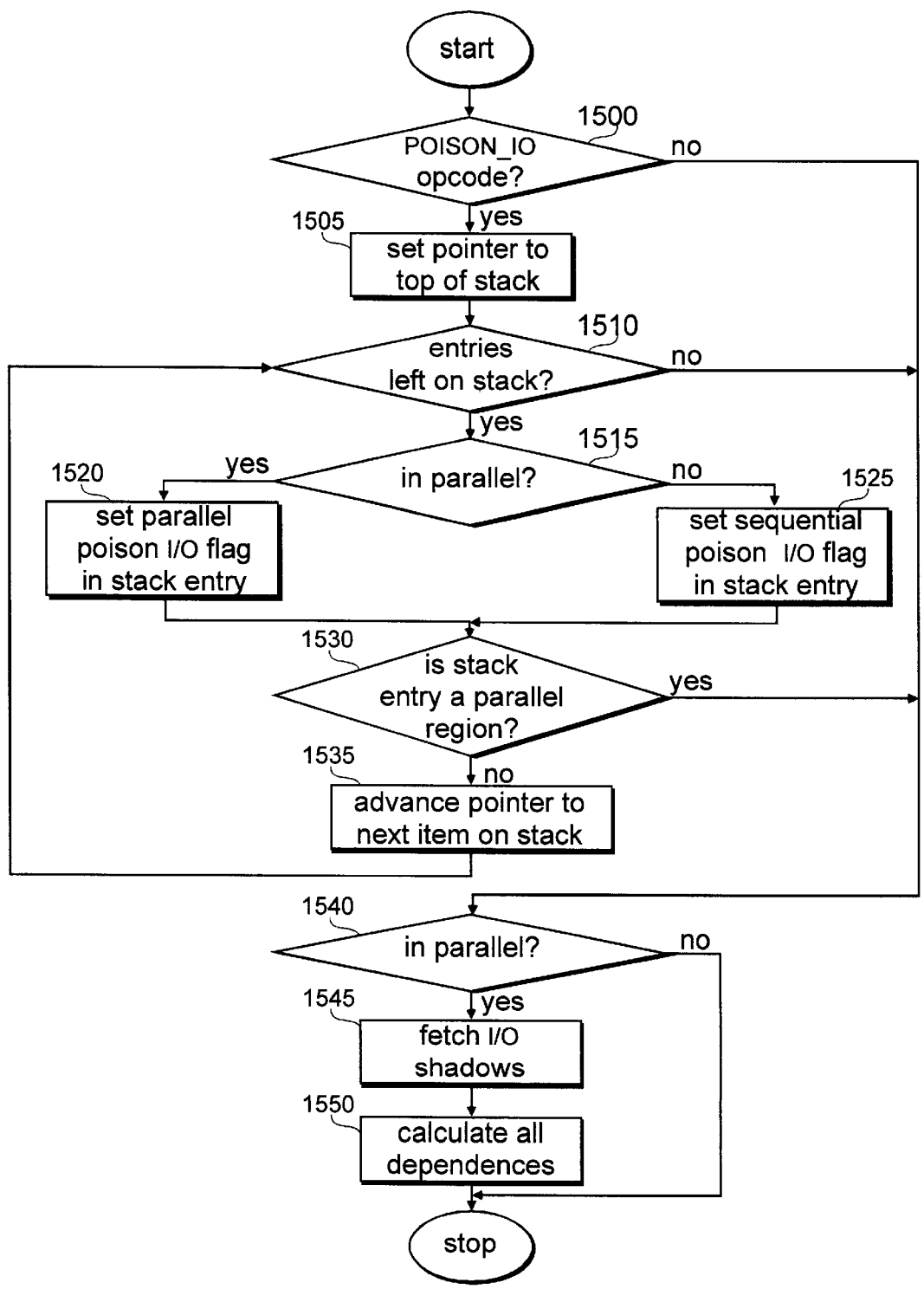
FIG. 15 - Algorithm for Step 1320, IO and POISON_IO Opcodes

FIG. 16 - Algorithm for Step 1320, MALLOC Opcode
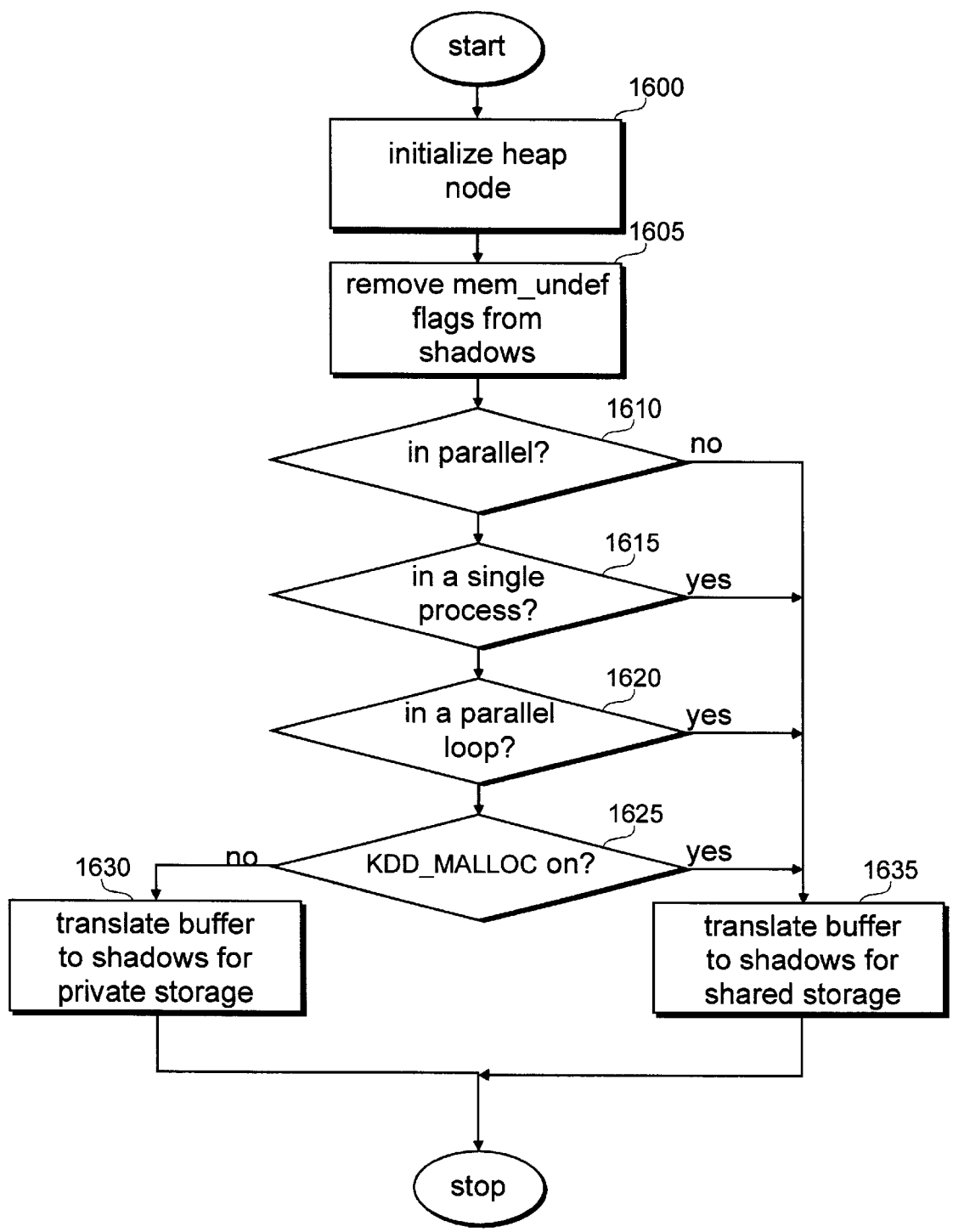

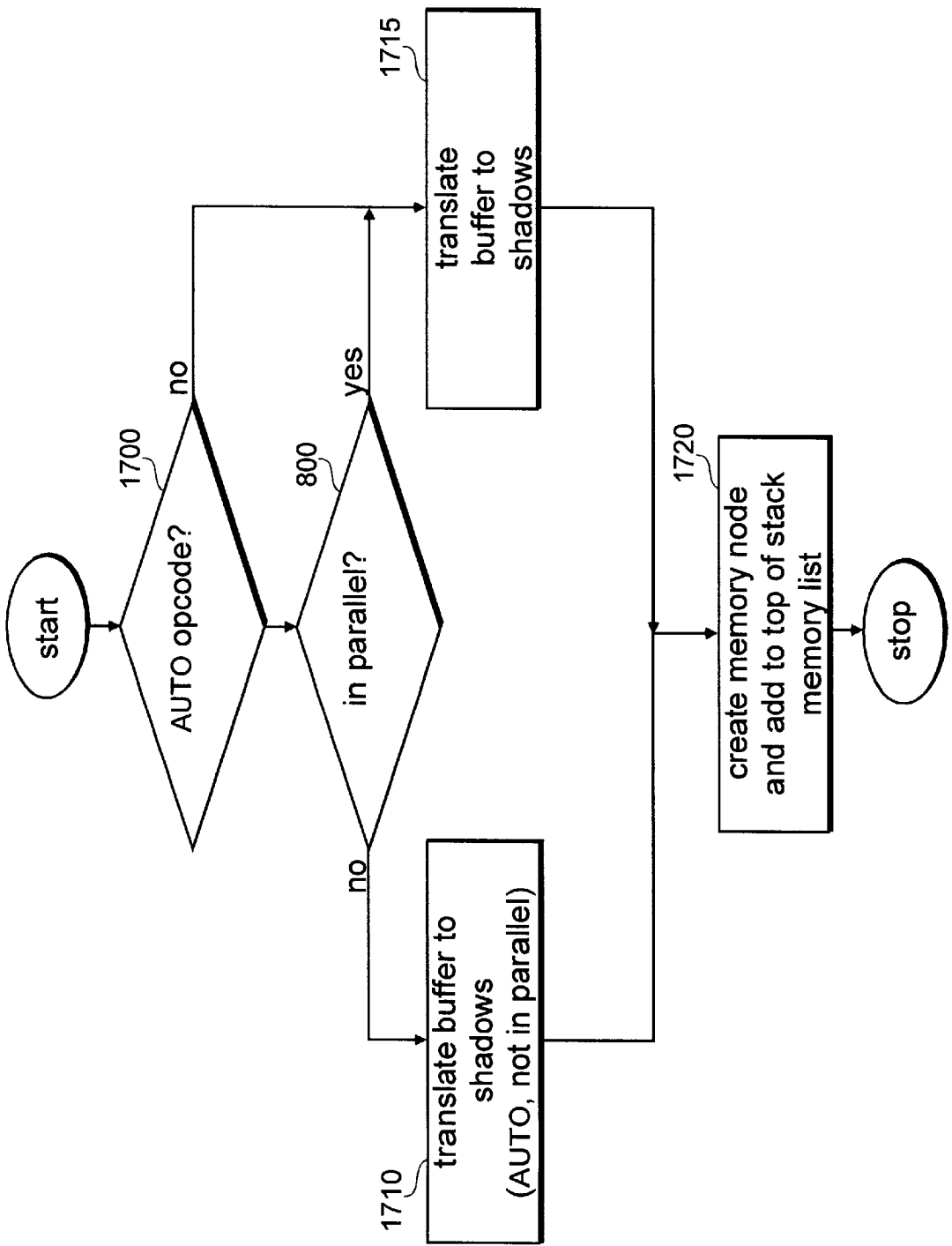
FIG. 17 - Algorithm for Step 1320, AUTO and LOCAL Opcodes

FIG. 18 - Algorithm for Step 1320, Private COMMON Opcodes
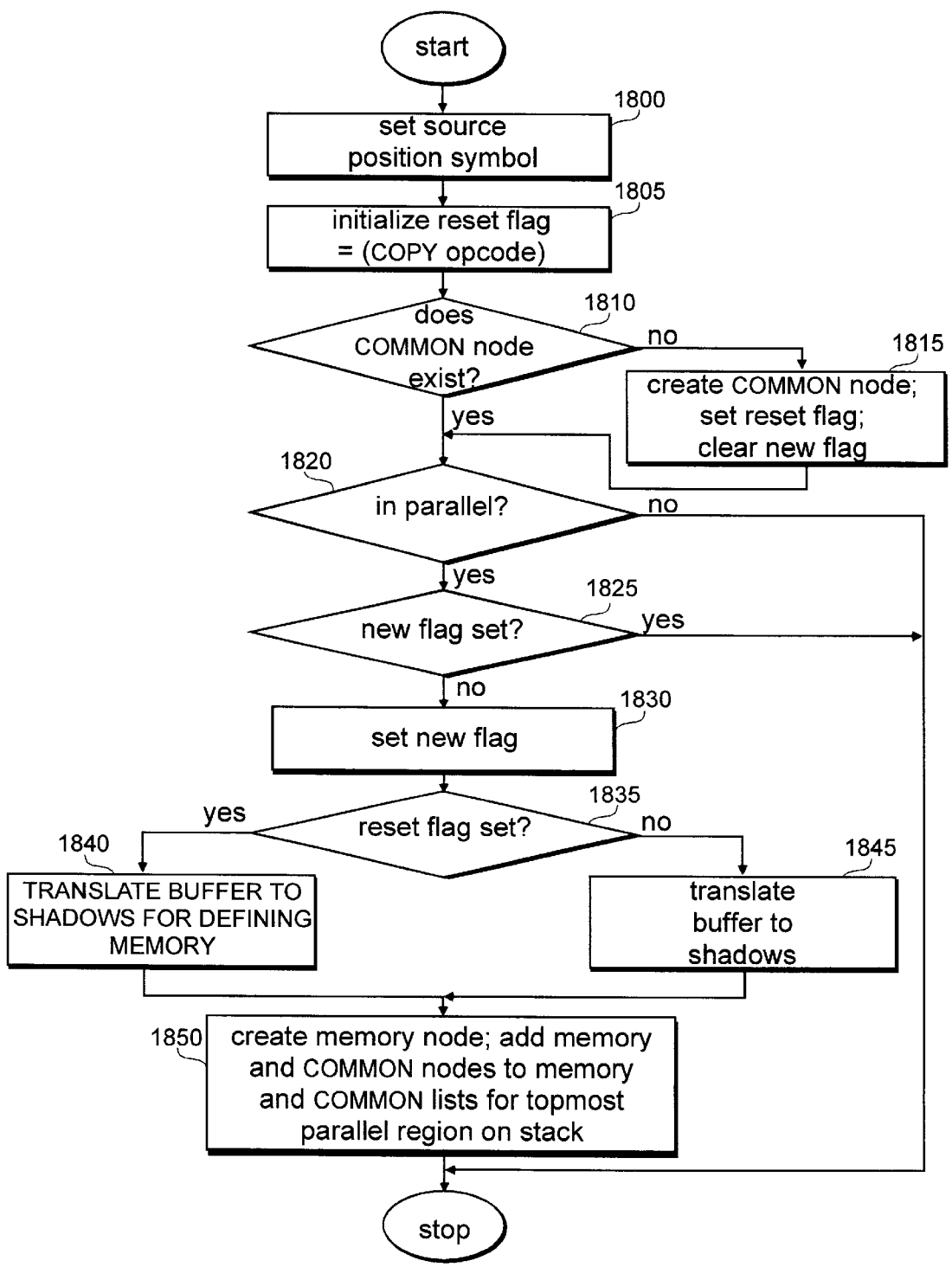

FIG. 19 - Algorithm for Step 1320, ENTRY Opcode
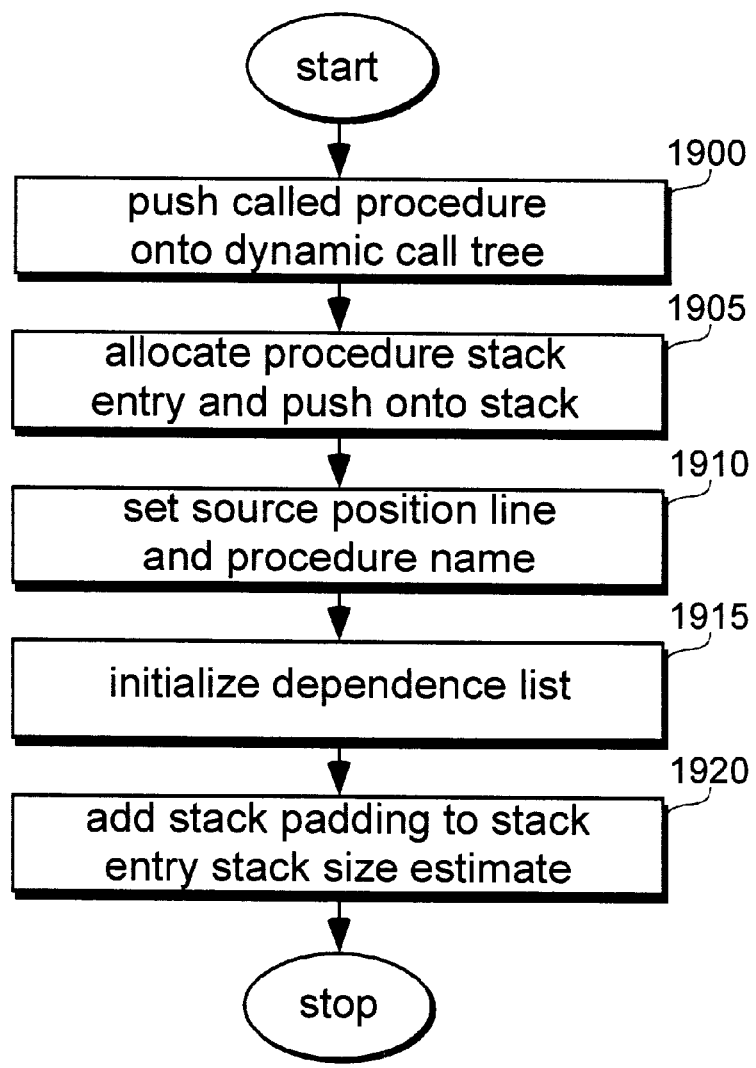

FIG. 20 - Algorithm for Step 1320, EXIT and REXIT Opcodes
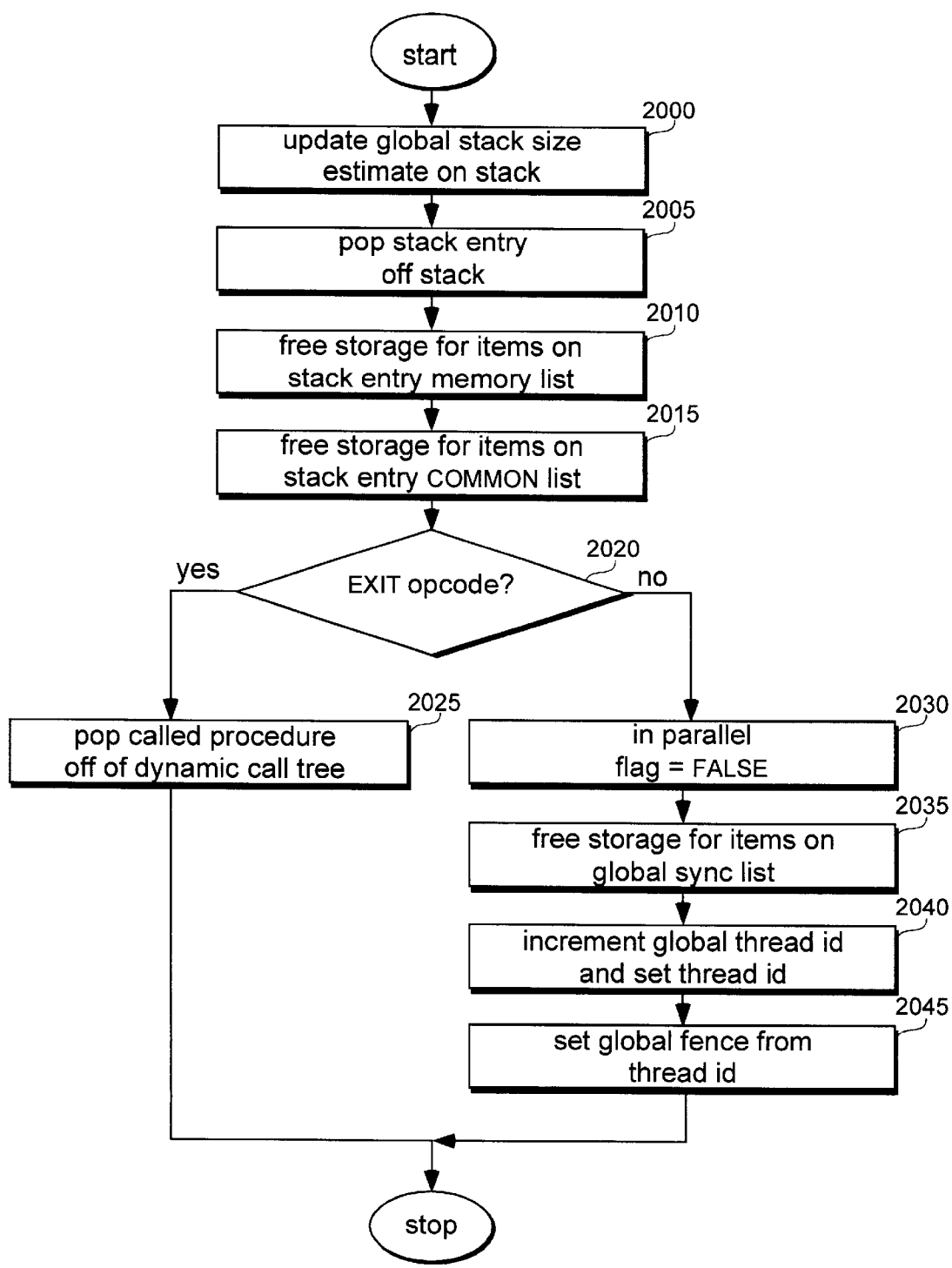

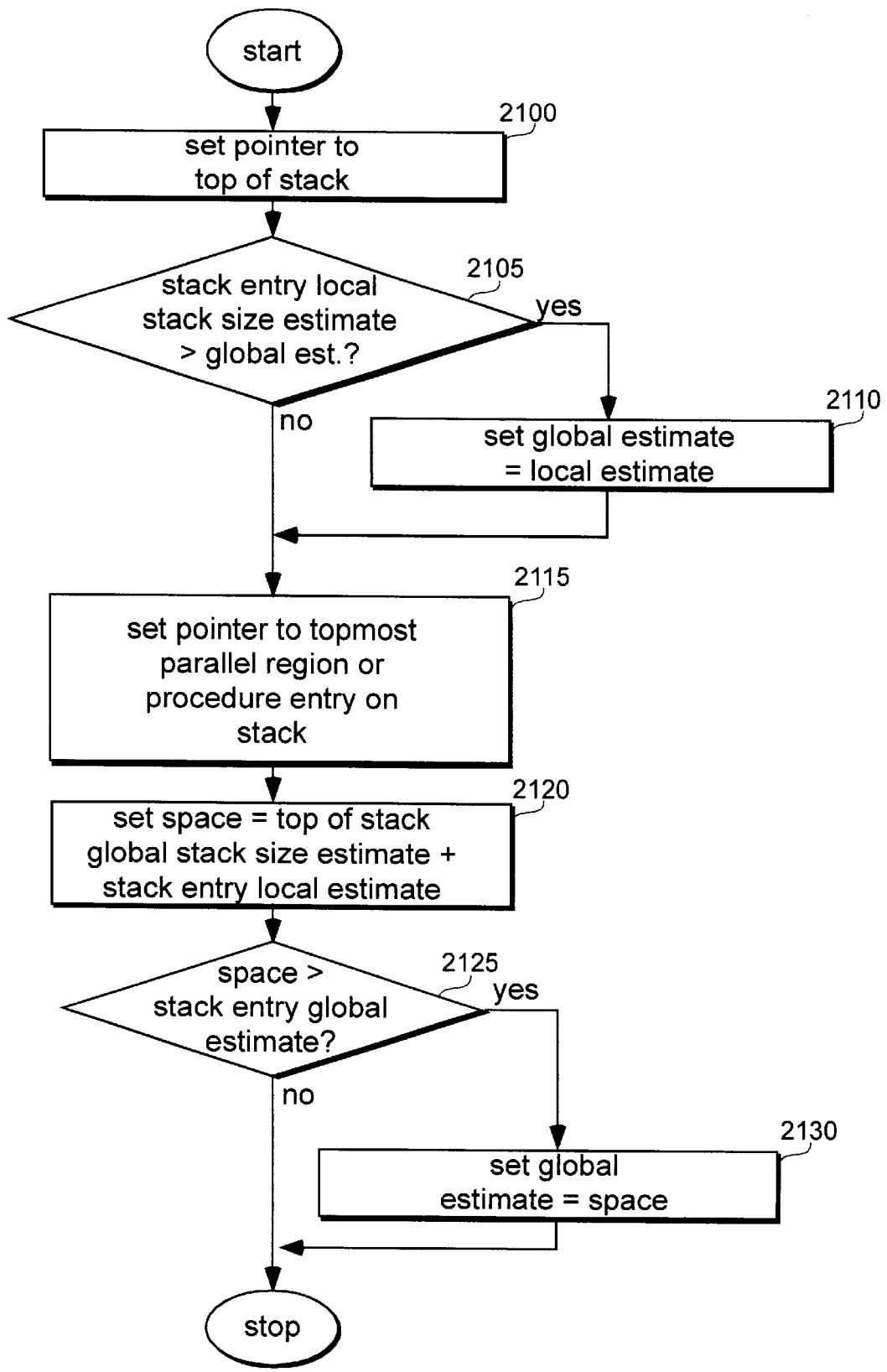
FIG. 21 - Update Stack Size Estimates, Step 2000

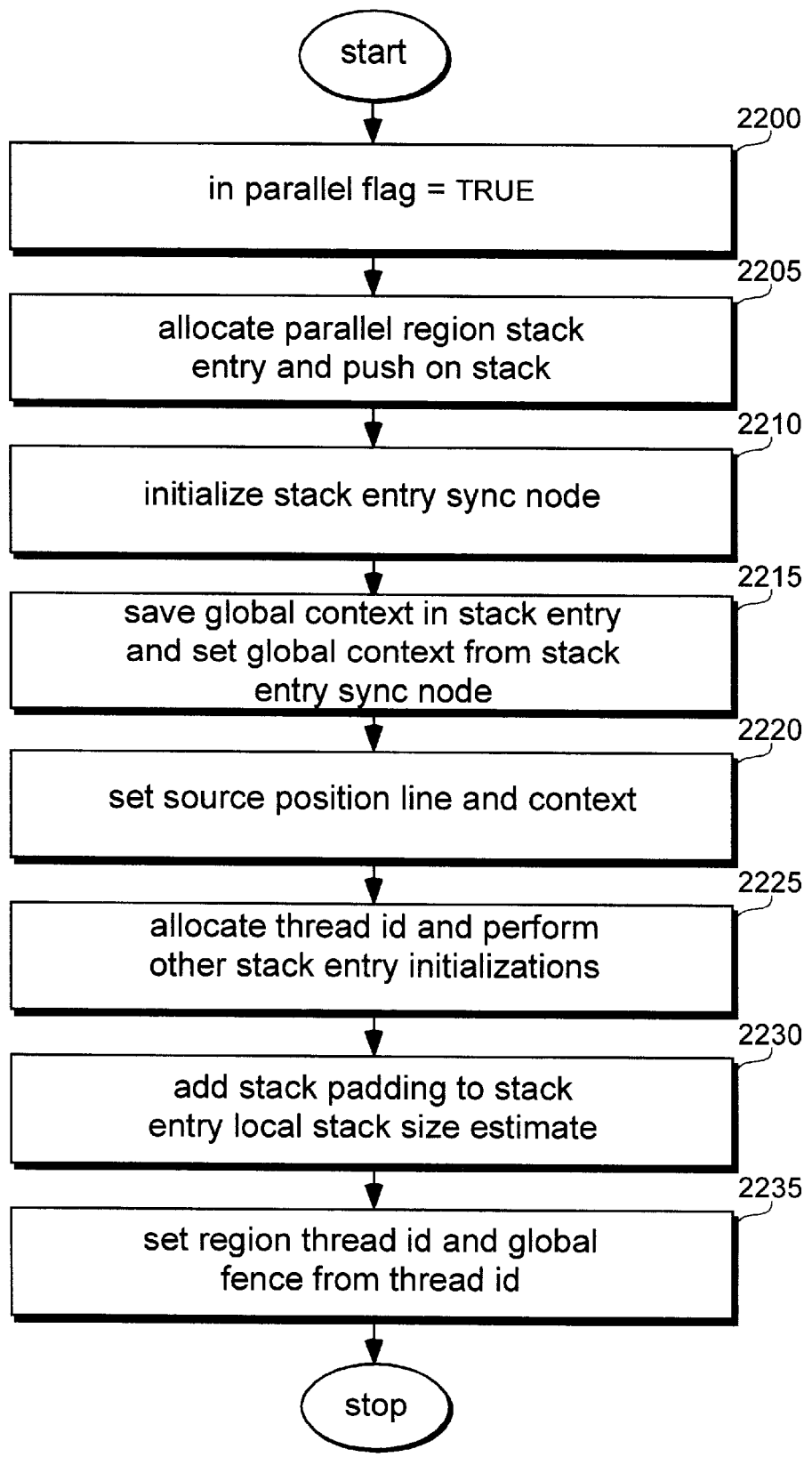
FIG. 22 - Algorithm for Step 1320, RENTRY Opcode

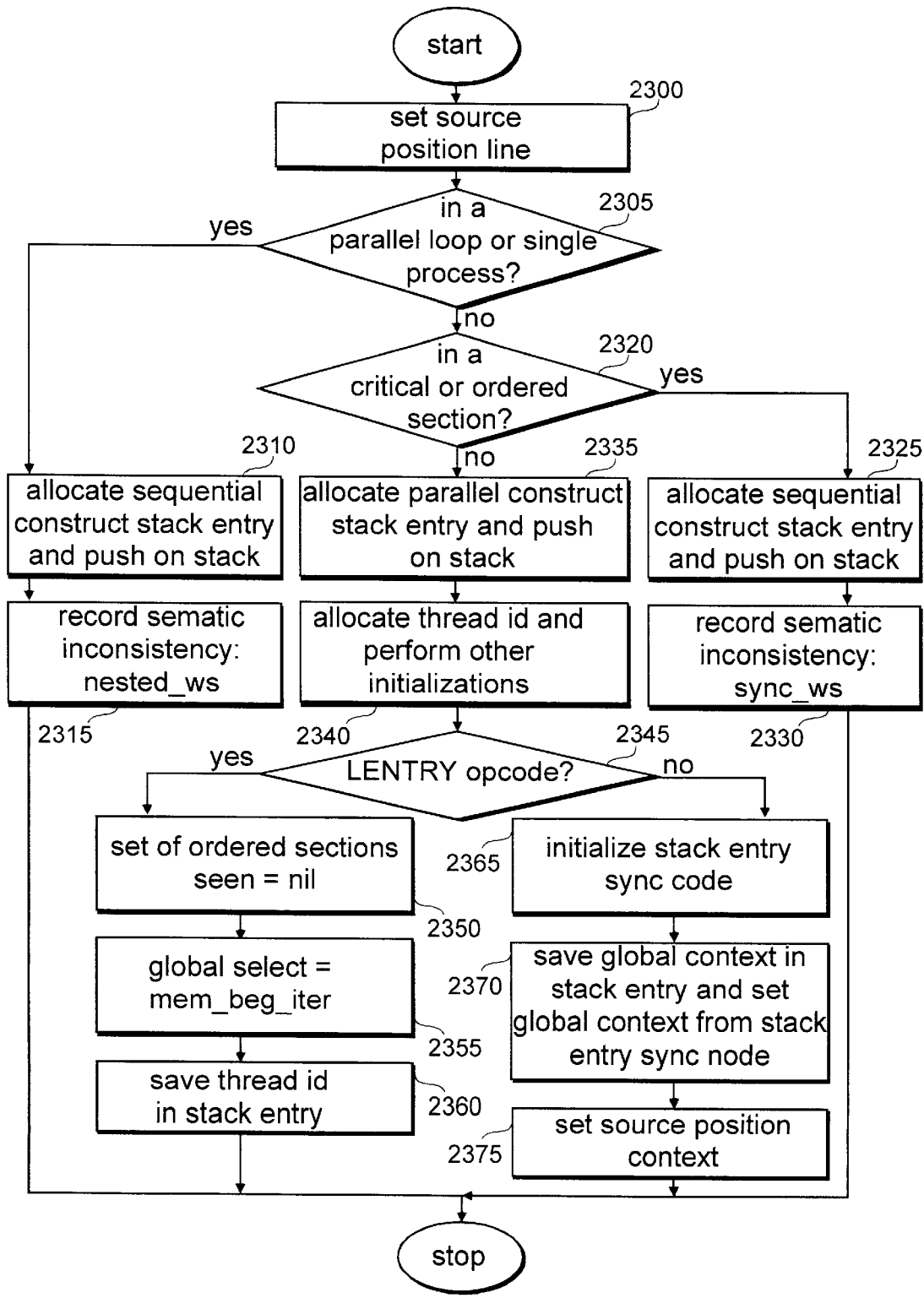
FIG. 23 - Algorithm for Step 1320, LENTRY and SENTRY Opcodes

FIG. 24 - Algorithm for Step 1320, IENTRY and LAST_IENTRY Opcodes
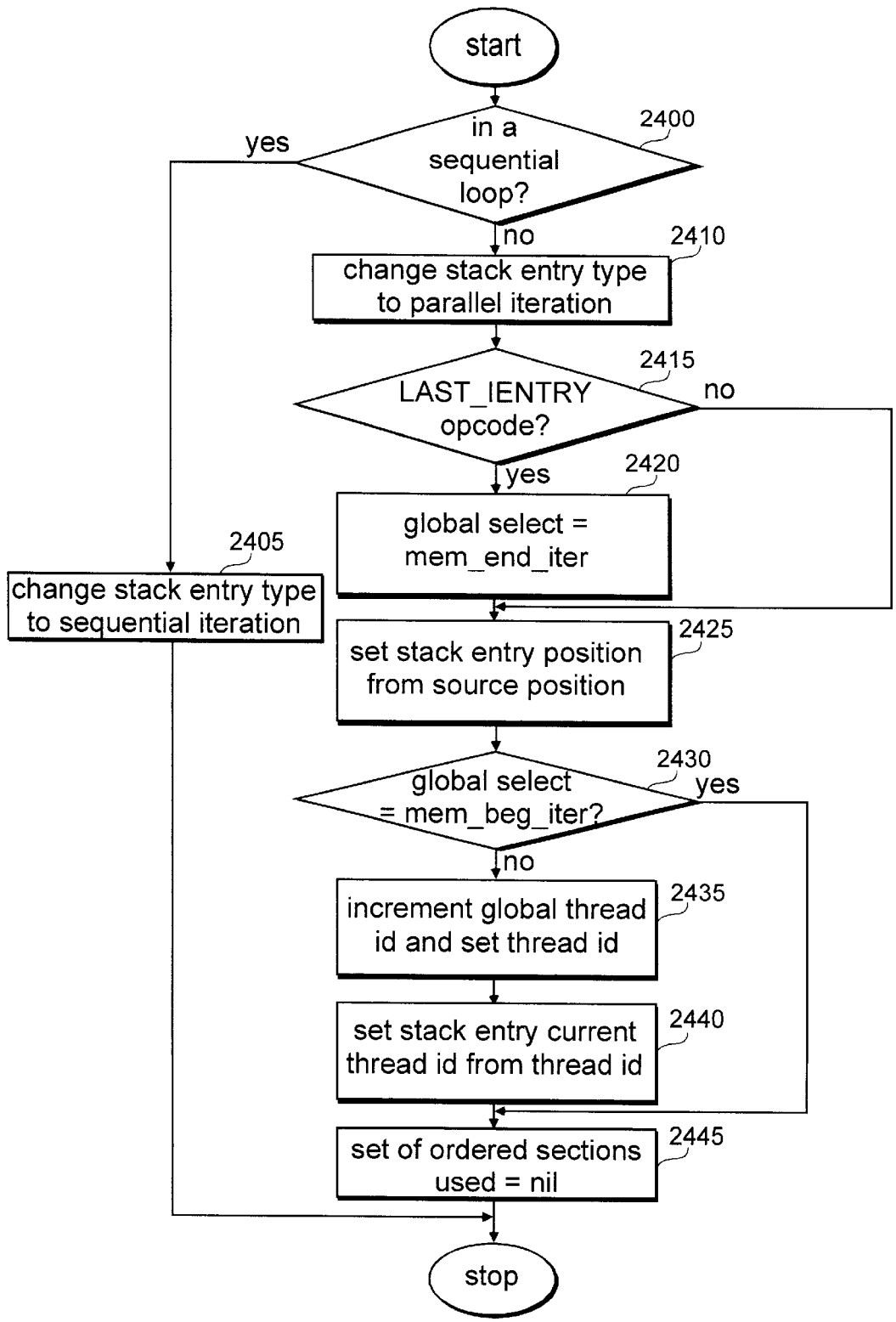

FIG. 25 - Algorithm for Step 1320, IEXIT Opcode
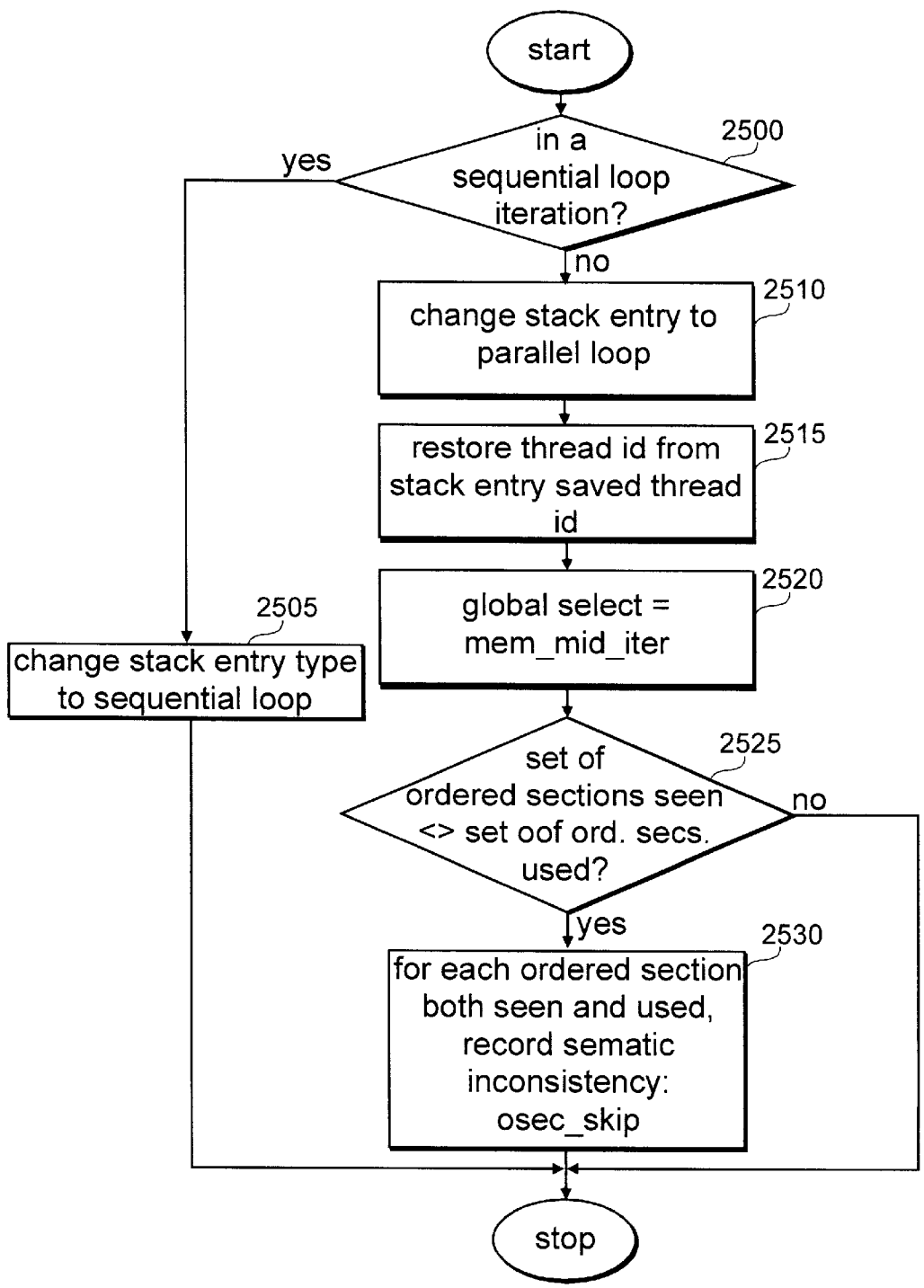

FIG. 26 - Algorithm for Step 1320, CENTRY and OENTRY Opcodes
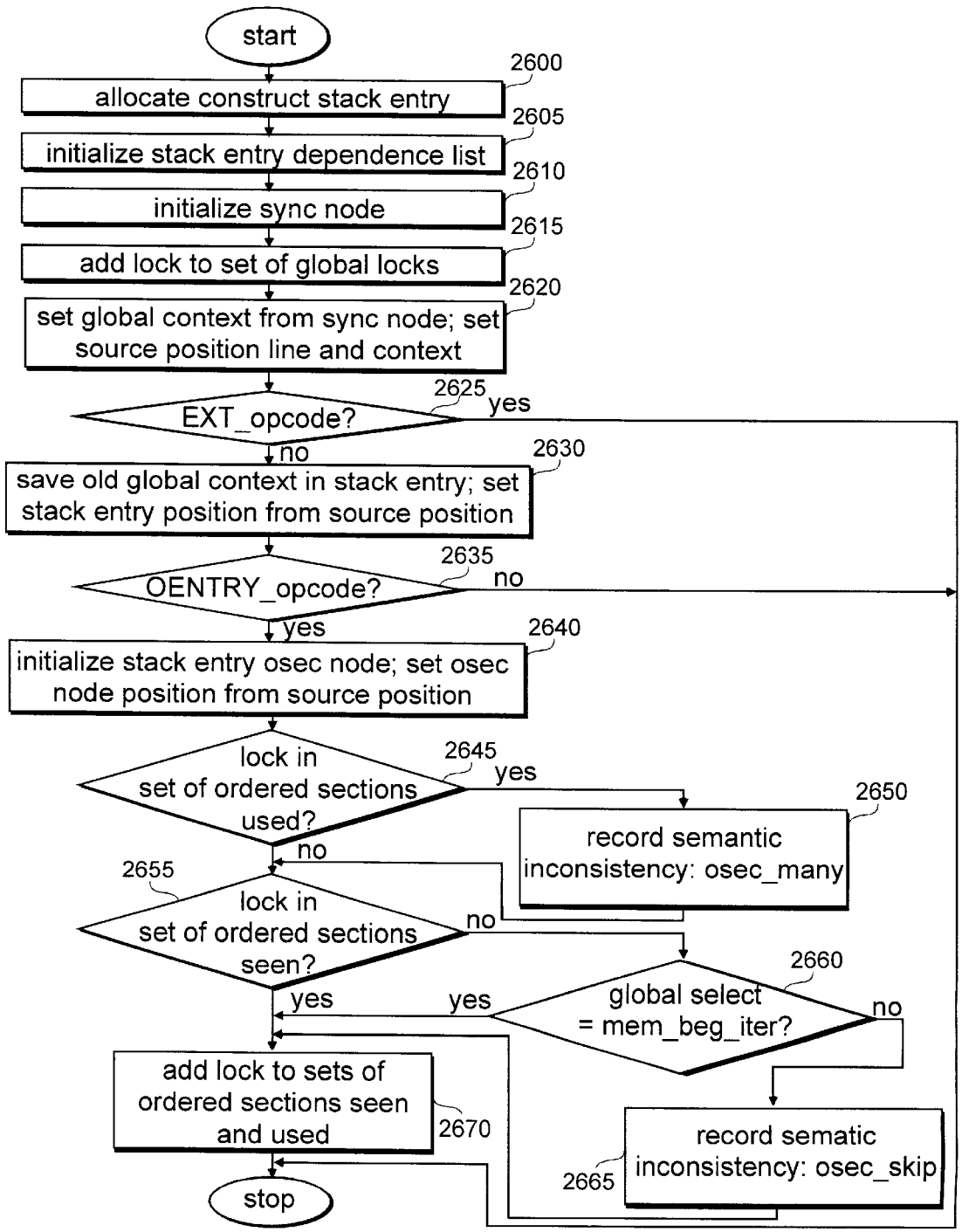

FIG. 27 - Algorithm for Step 1320, Construct Exit Opcodes
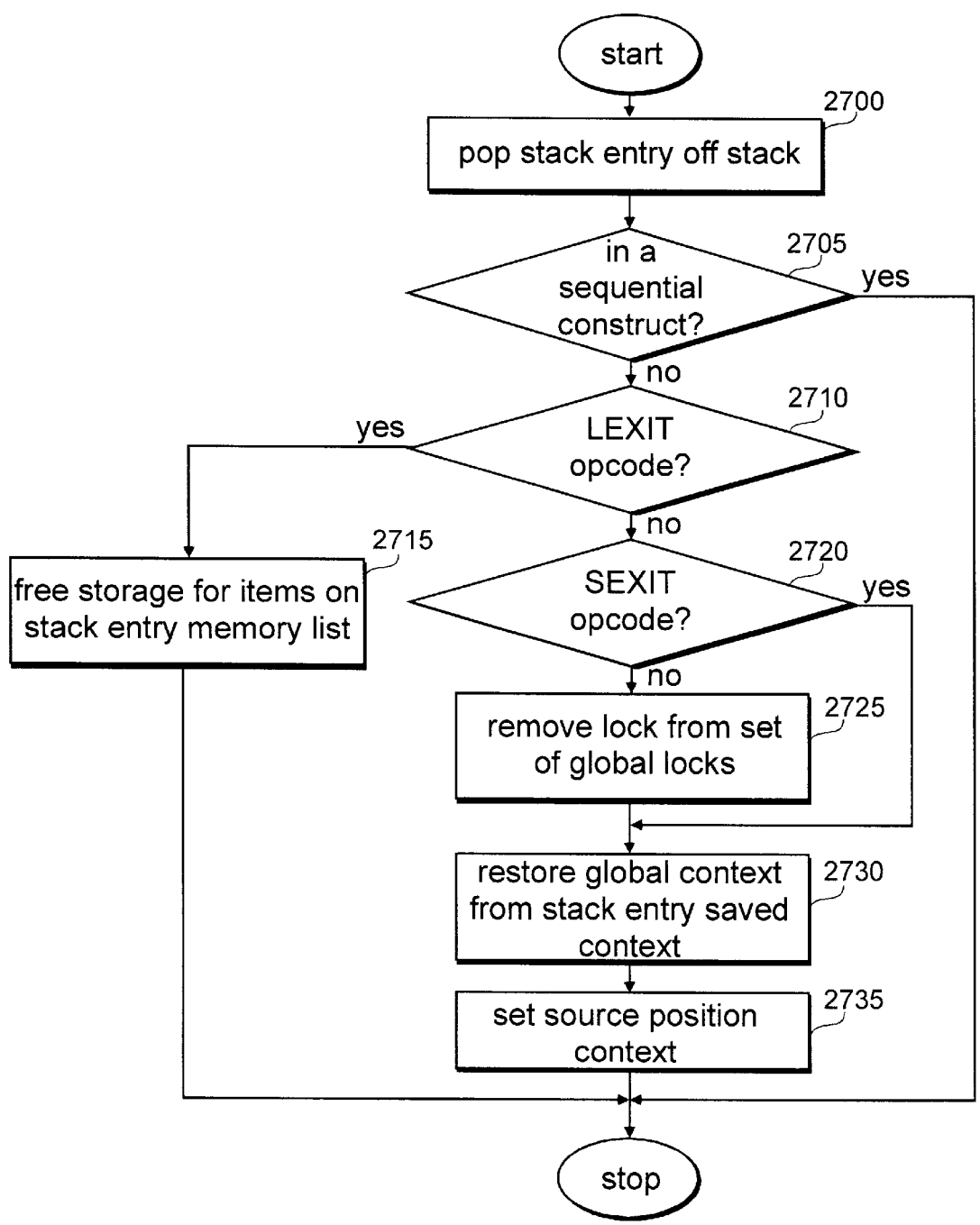

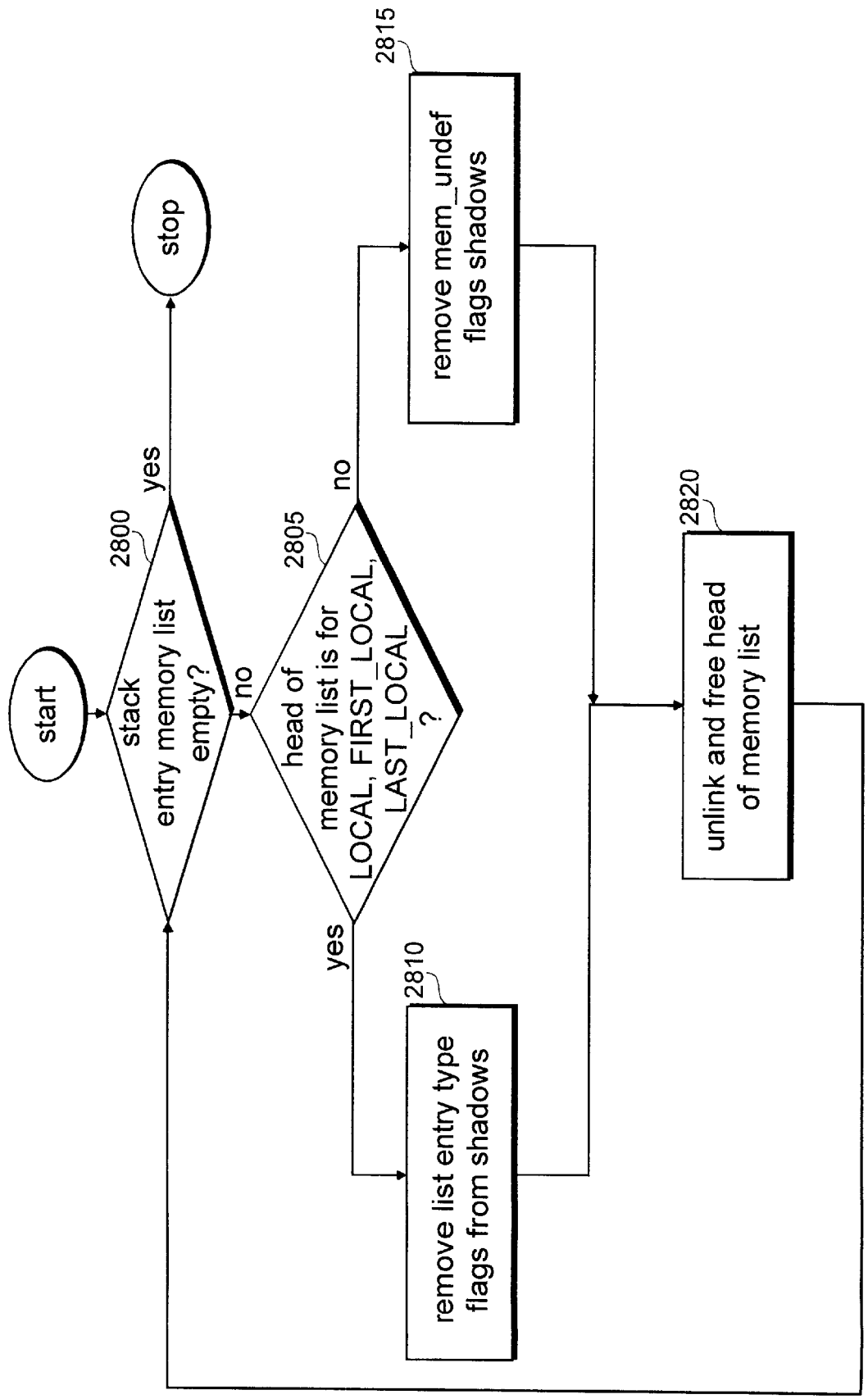
FIG. 28 – Free Memory List, Steps 2010, 2715

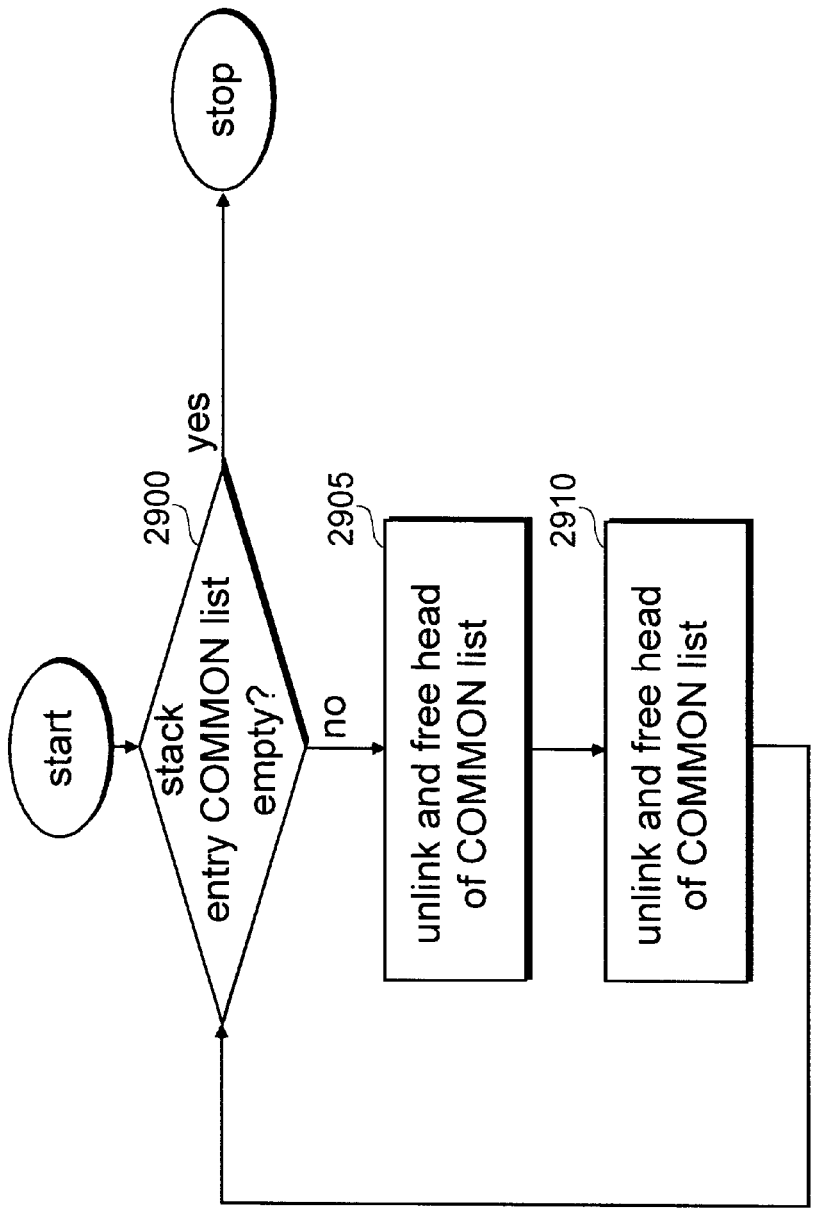
FIG. 29 - Free COMMON List, Steps 2015

FIG. 30 - Allocate Thread Id, Steps 2225, 2340
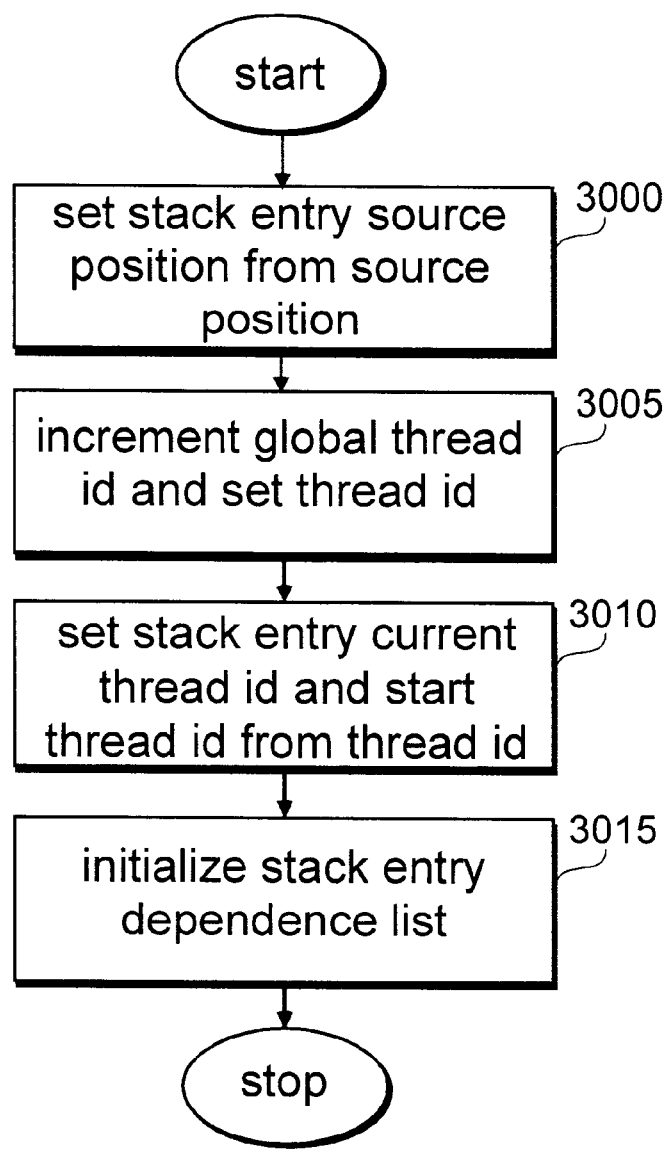

FIG. 31 - Algorithm for Step 1320, BARRIER and EXT_BARRIER Opcodes
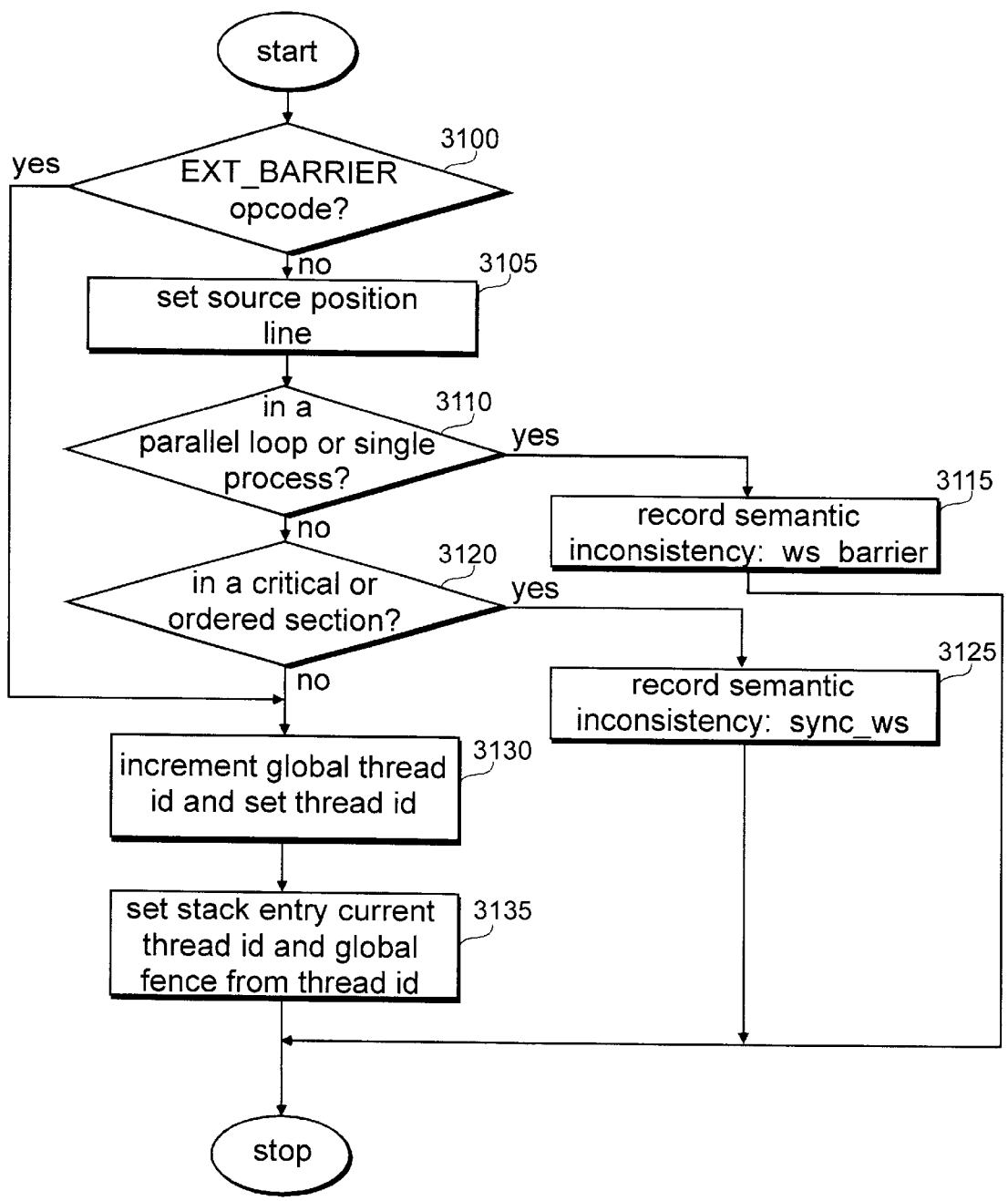

FIG. 32 - Algorithm for Step 1320, STOP Opcode
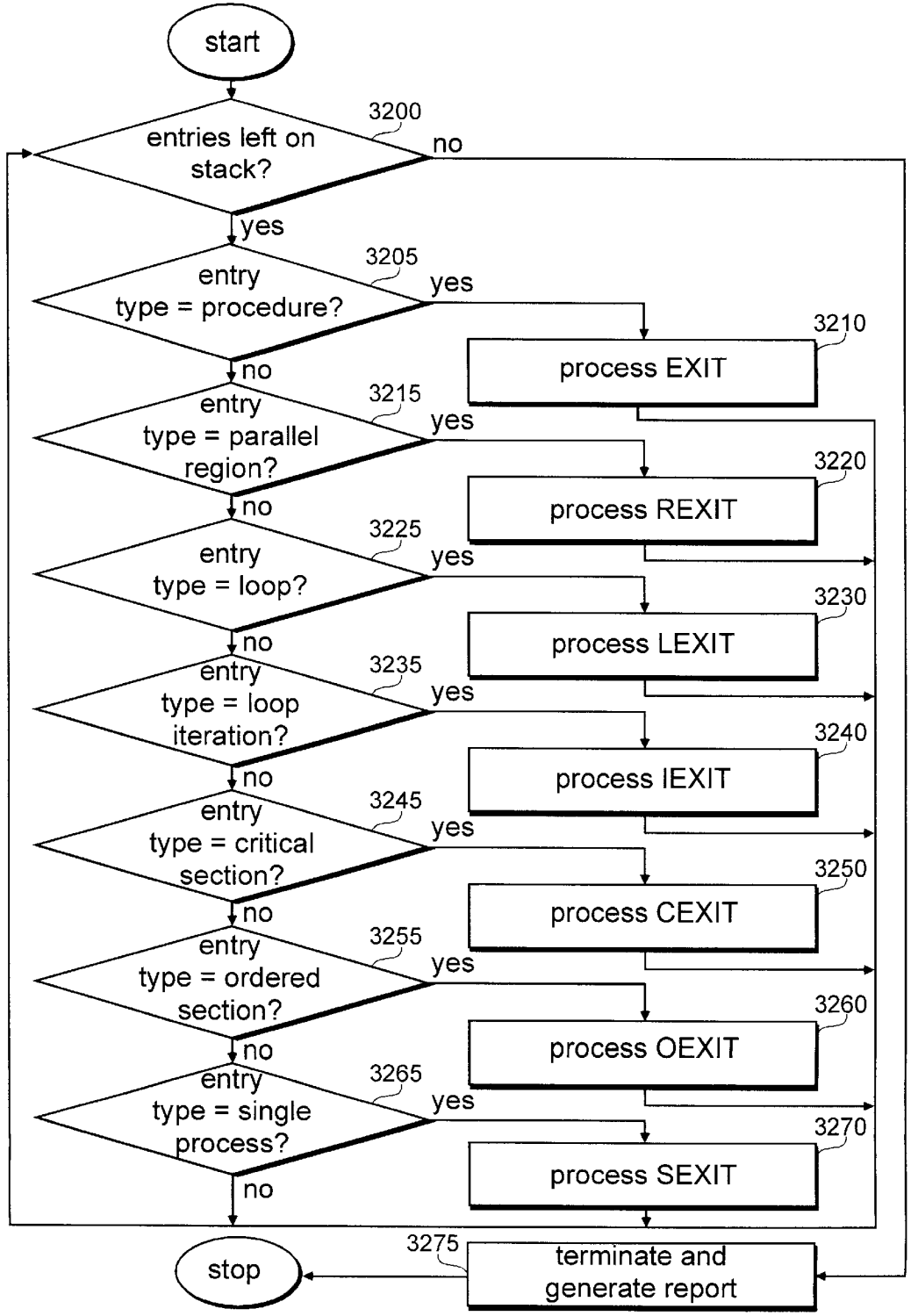

FIG. 33 - Algorithm for Step 1320, Other Opcodes
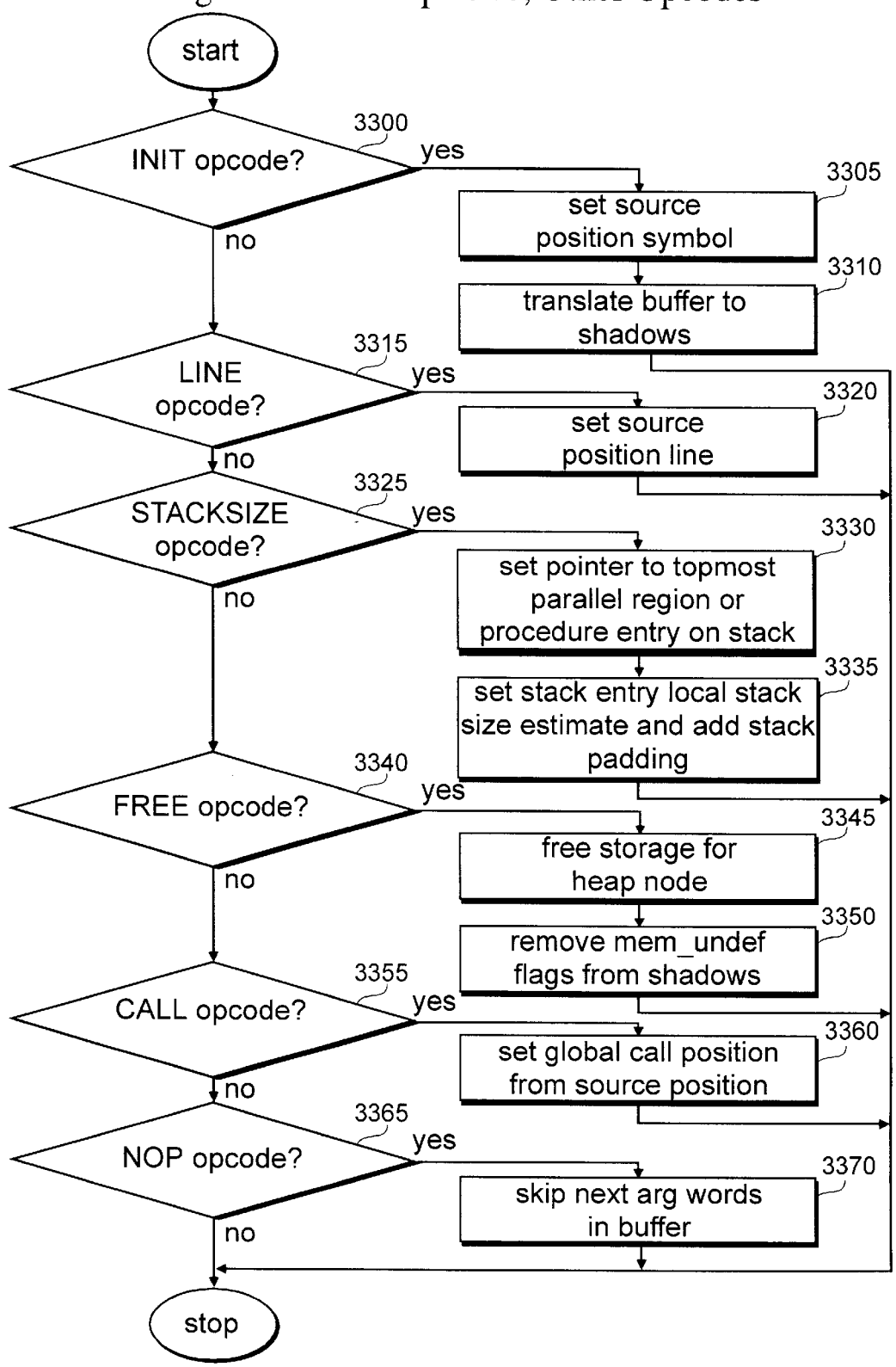

FIG. 34 - Translate Buffer to Shadows, Steps 1630, 1635, etc.
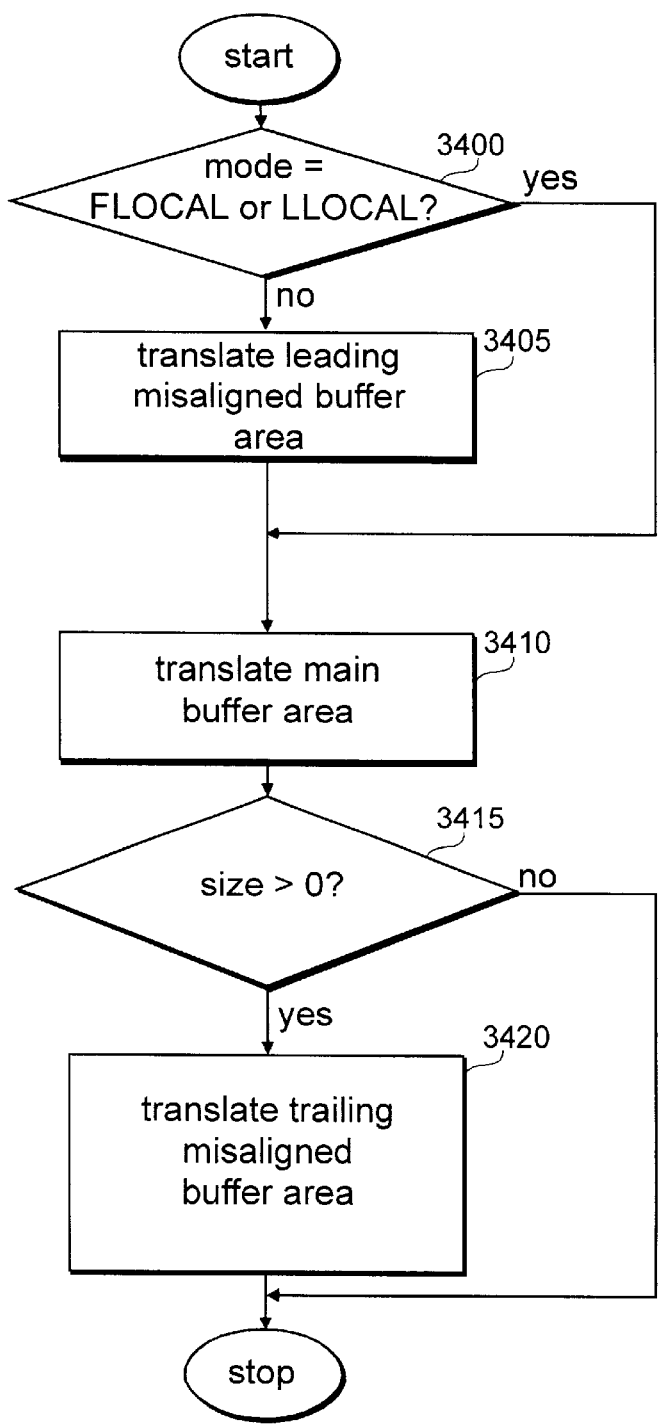

FIG. 35 - Translate Leading Buffer Area, Step 3405
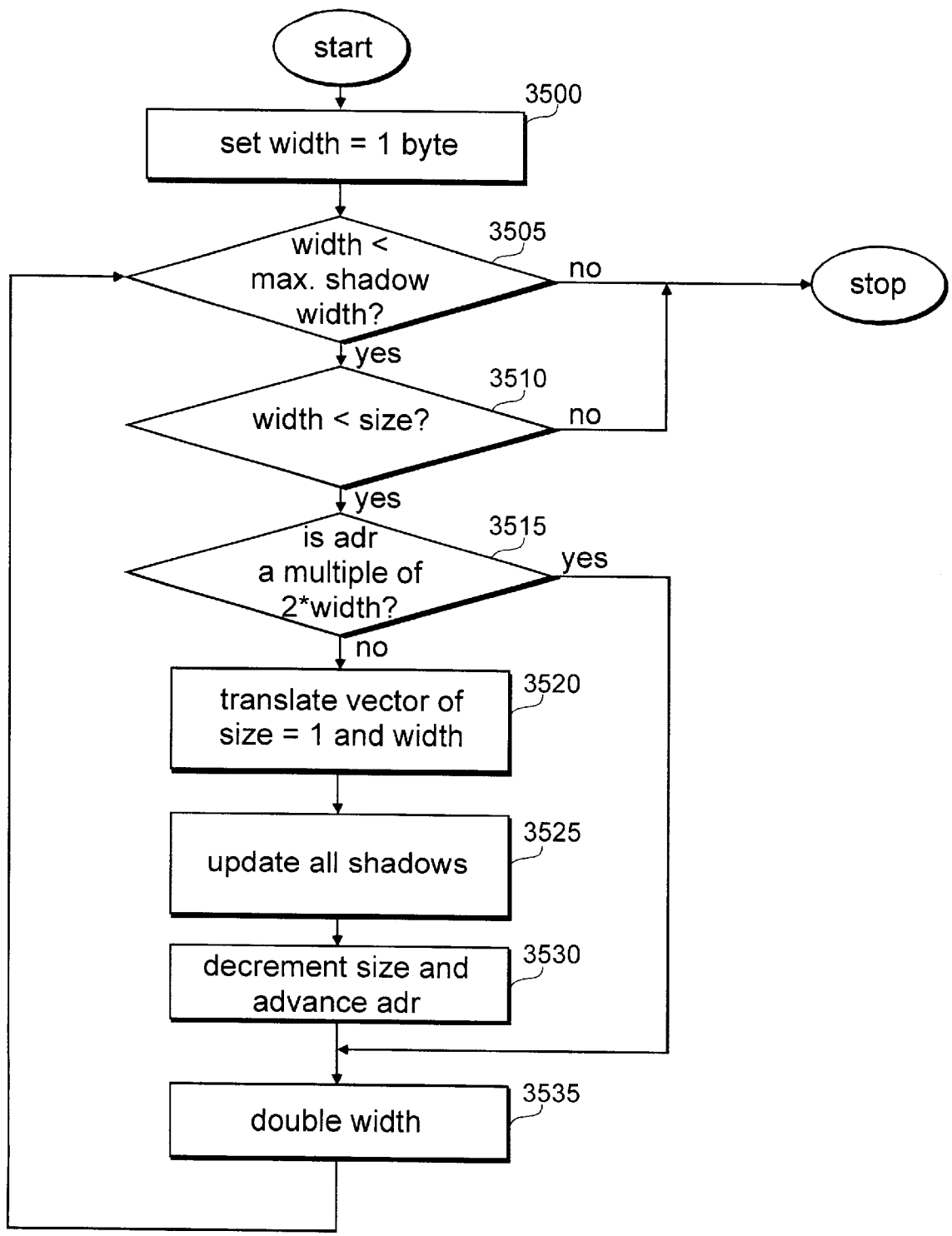

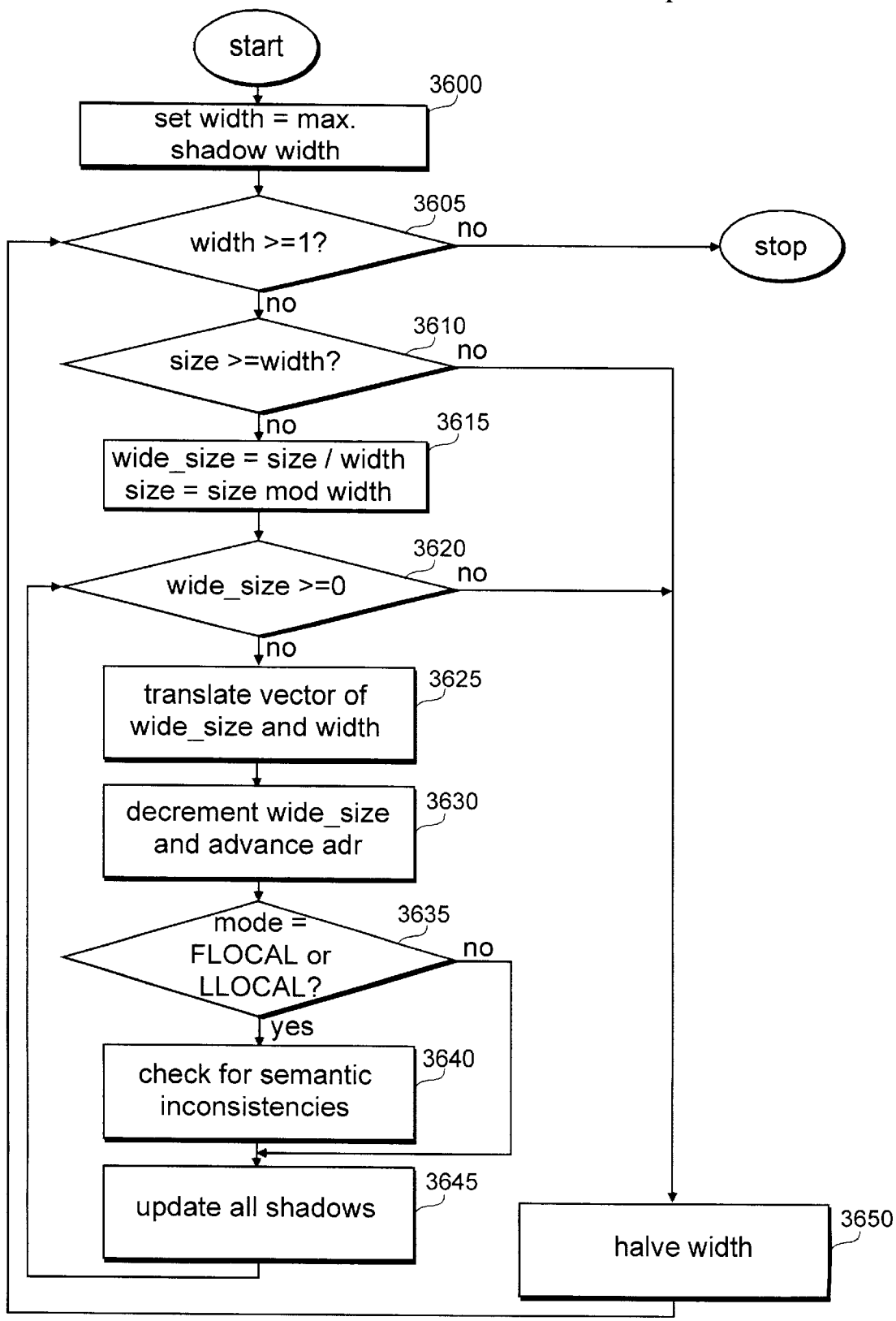
FIG. 36 - Translate Main Buffer Area, Step 3410

FIG. 37 - Translate Trailing buffer Area, Step 3420
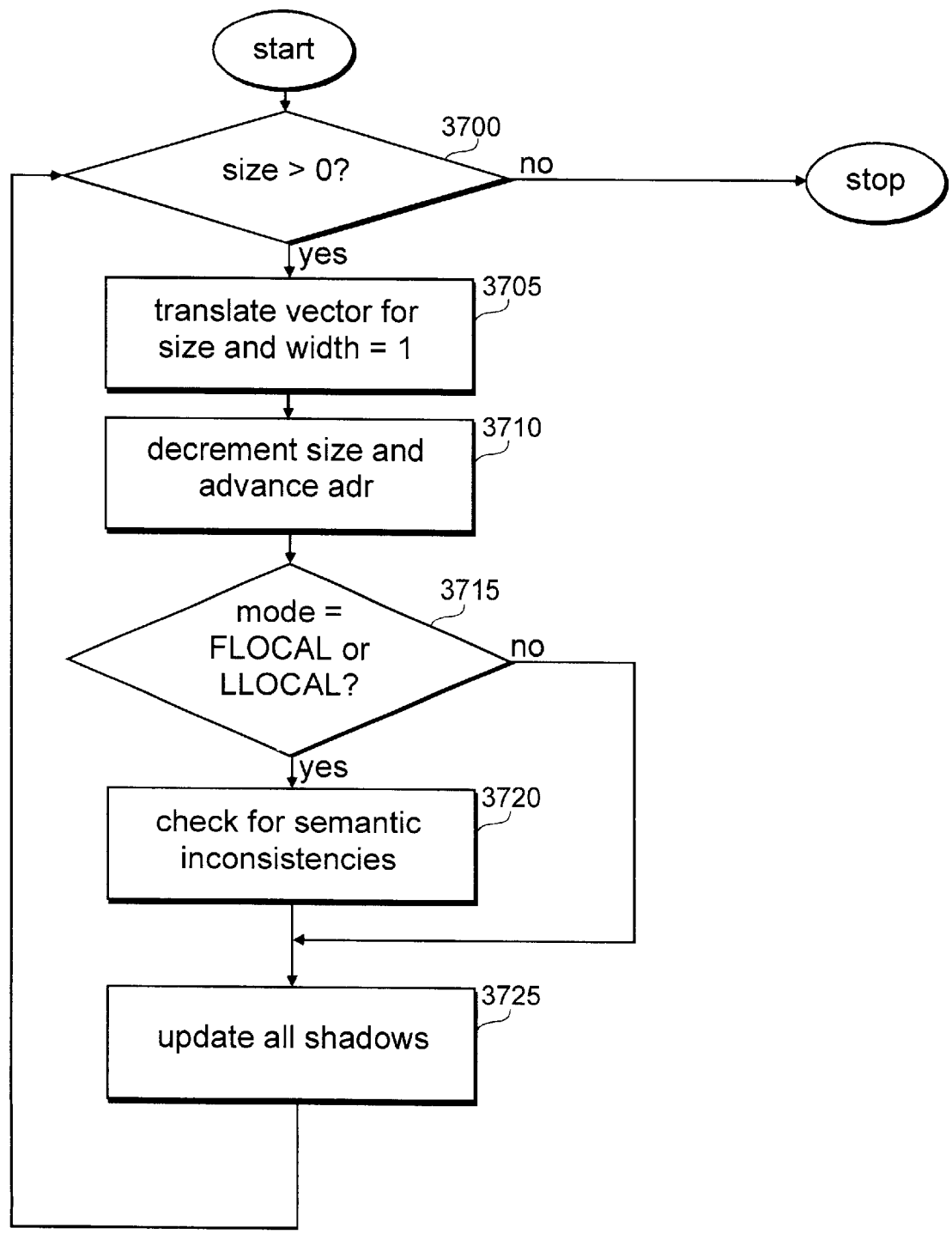

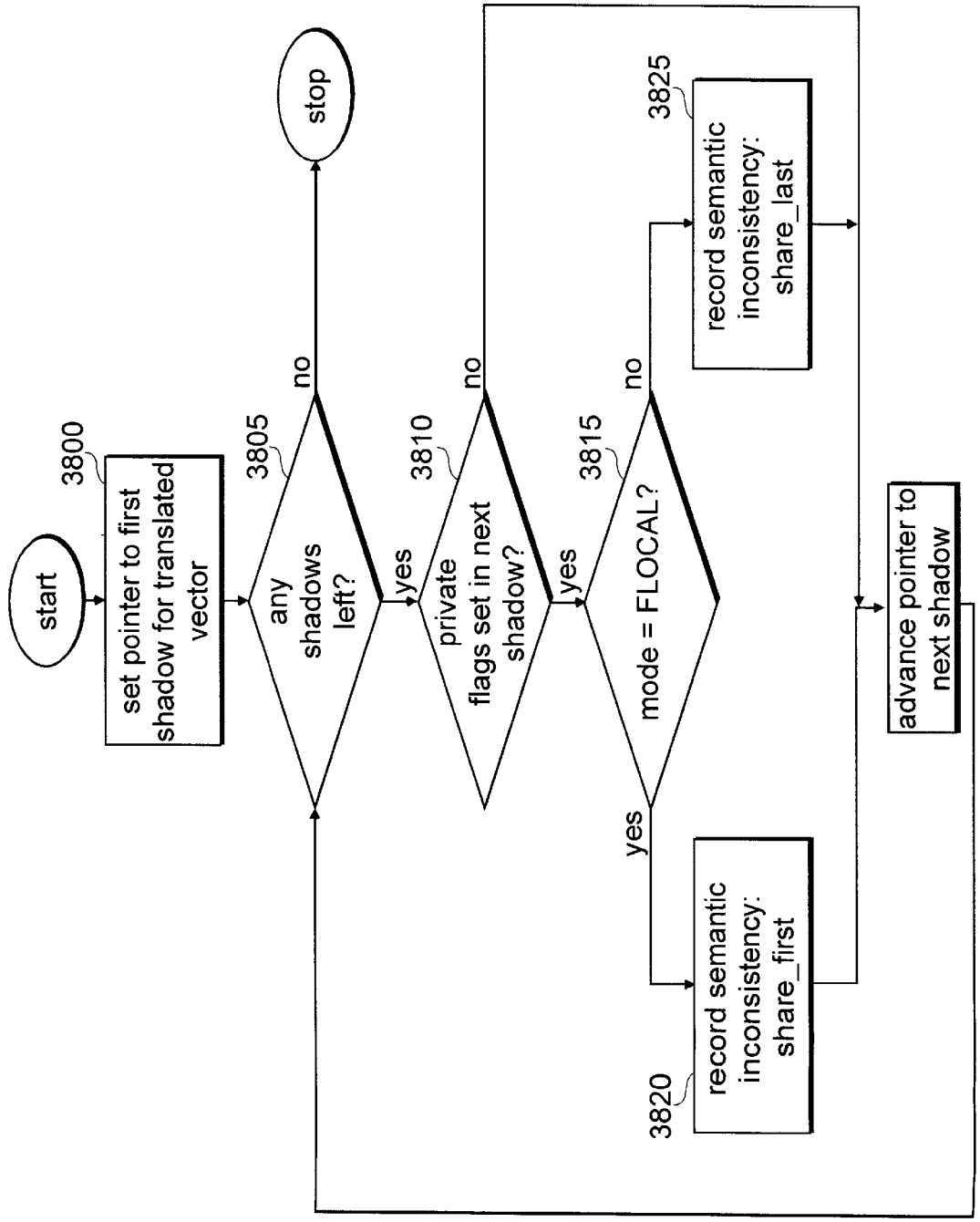
FIG. 38 – Check for Semantic Inconsistencies, Steps 3640, 3720

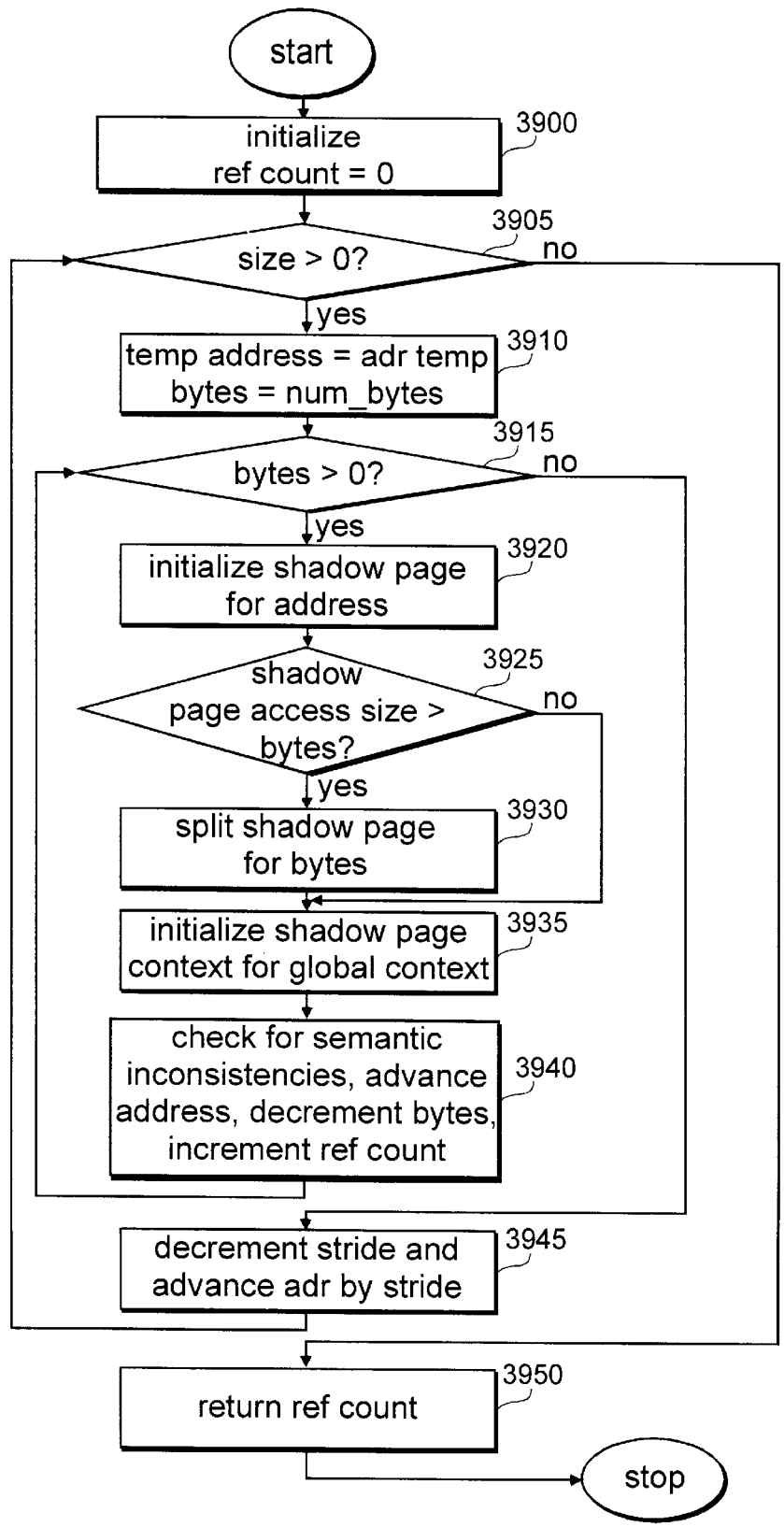
FIG. 39 - Translate Vector to Shadows, Steps 1410, 3520, etc.

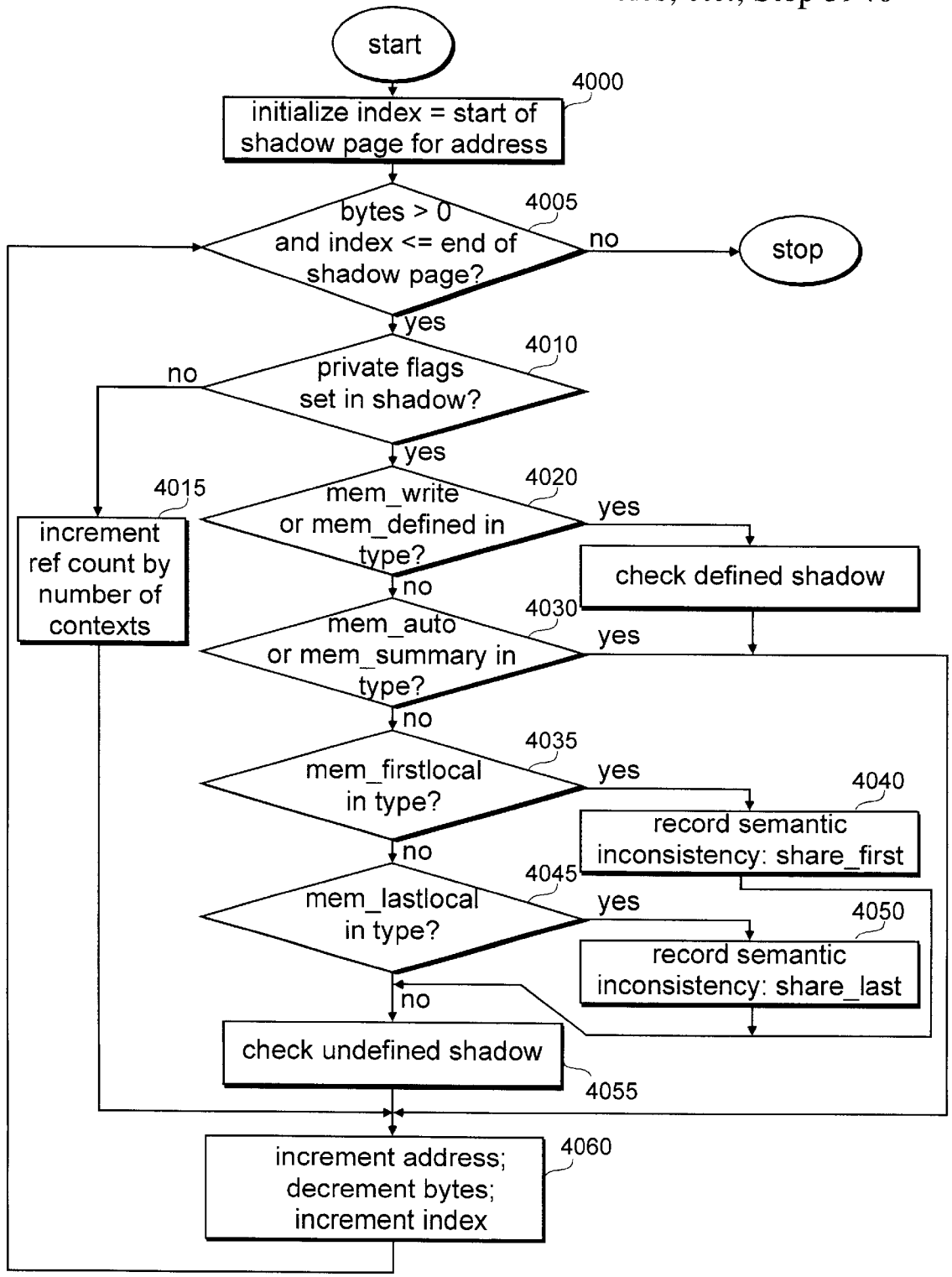
FIG. 40 - Check for Semantic Inconsistencies, etc., Step 3940

FIG. 41 - Fetch I/O Shadows, Step 1545
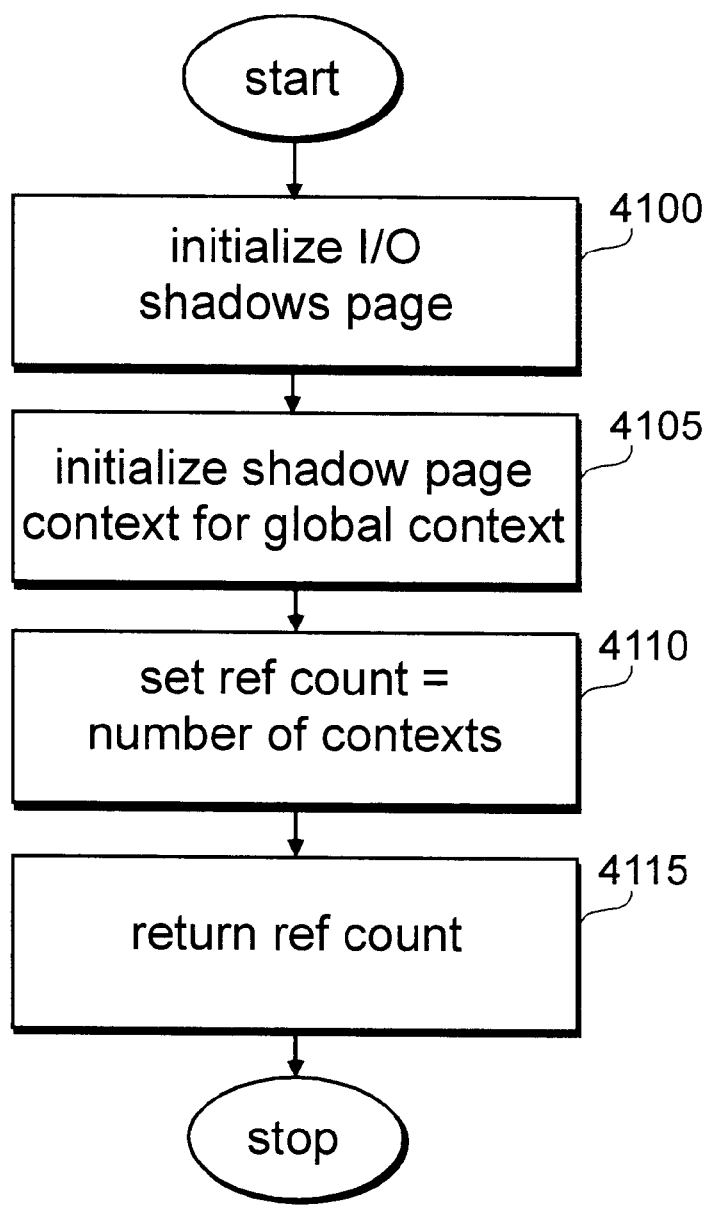

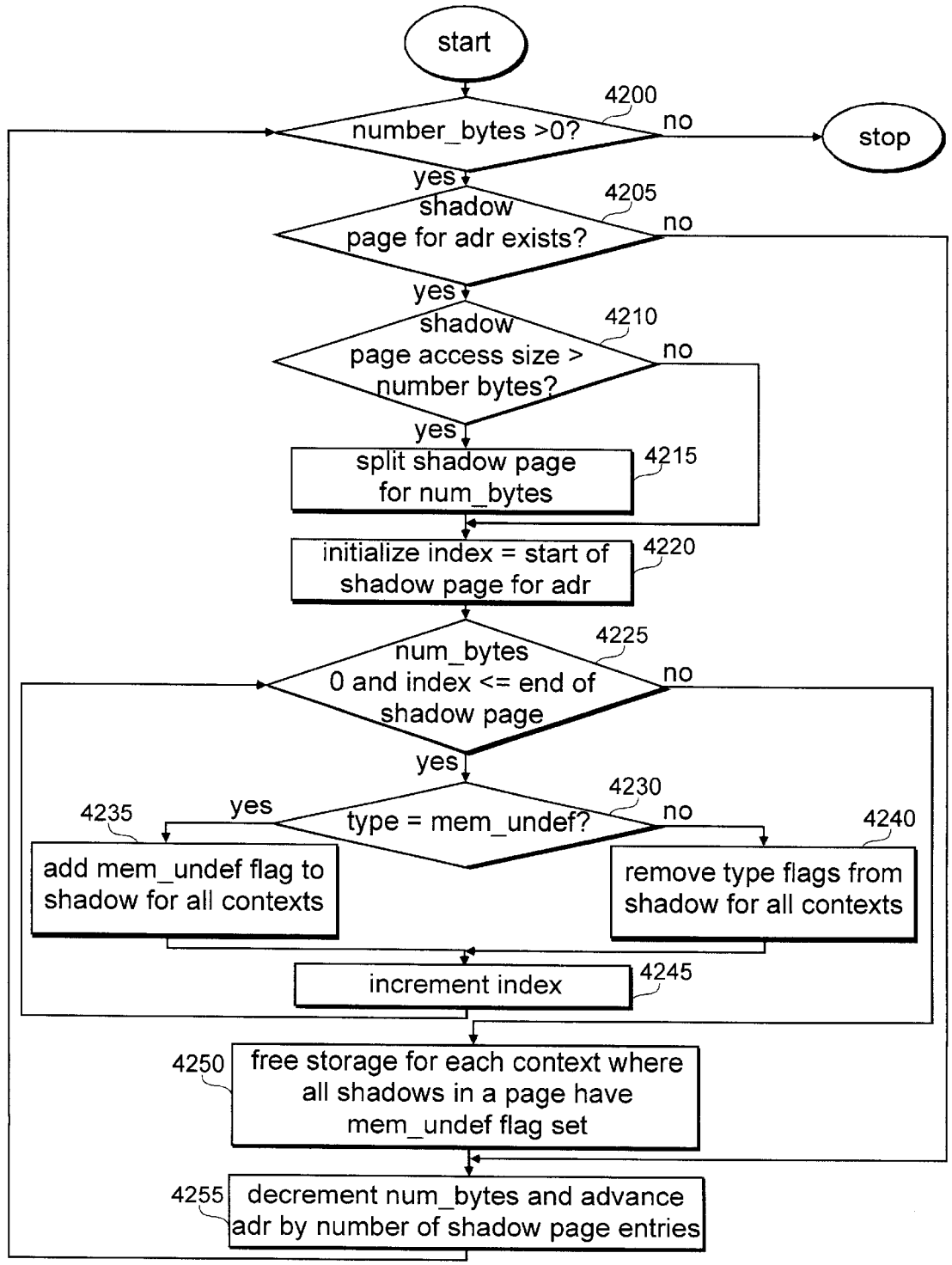
FIG. 42 - Remove Flags from Shadows, Steps 1605, 2810, etc.

FIG. 43A - Check Defined Shadow, Step 4025
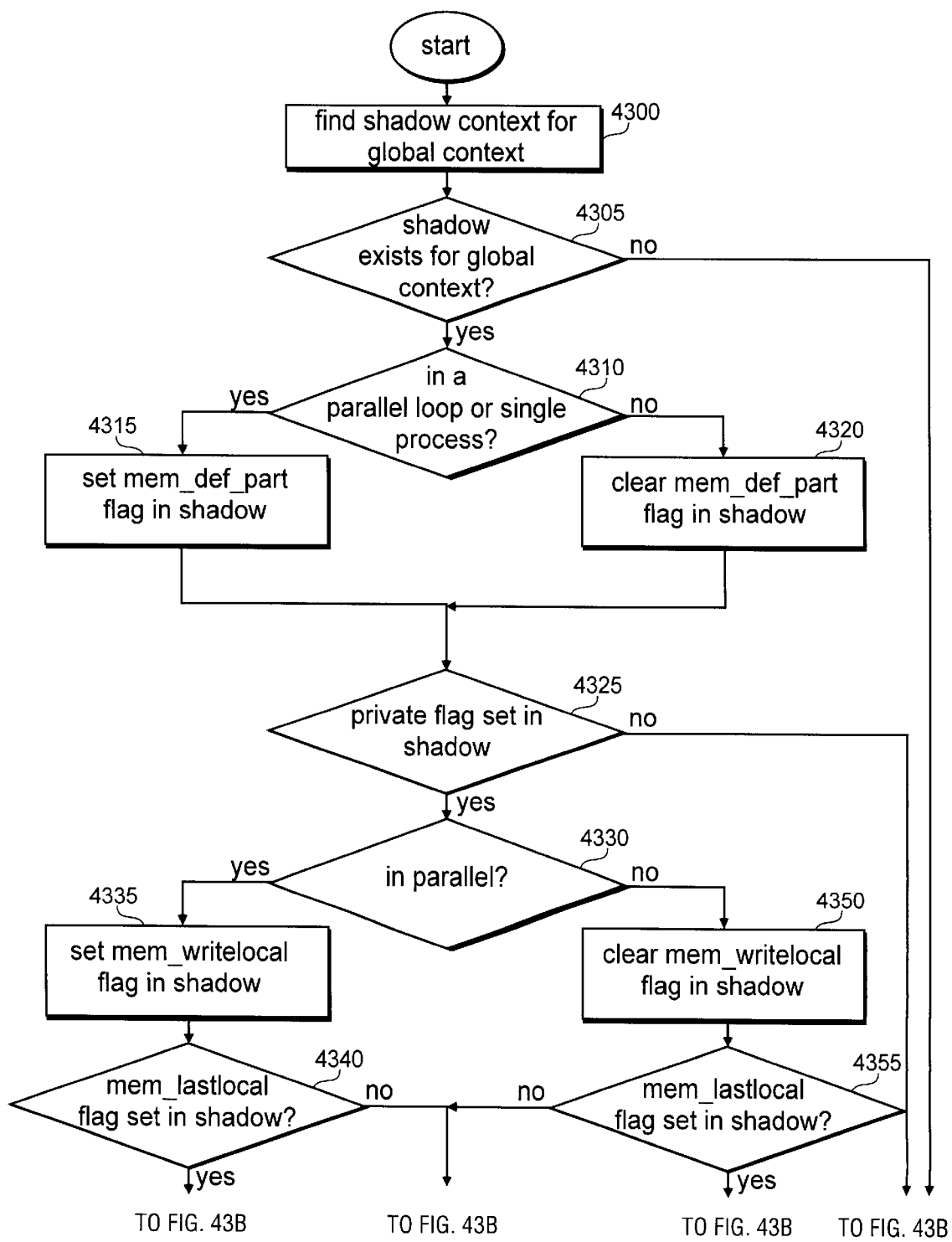

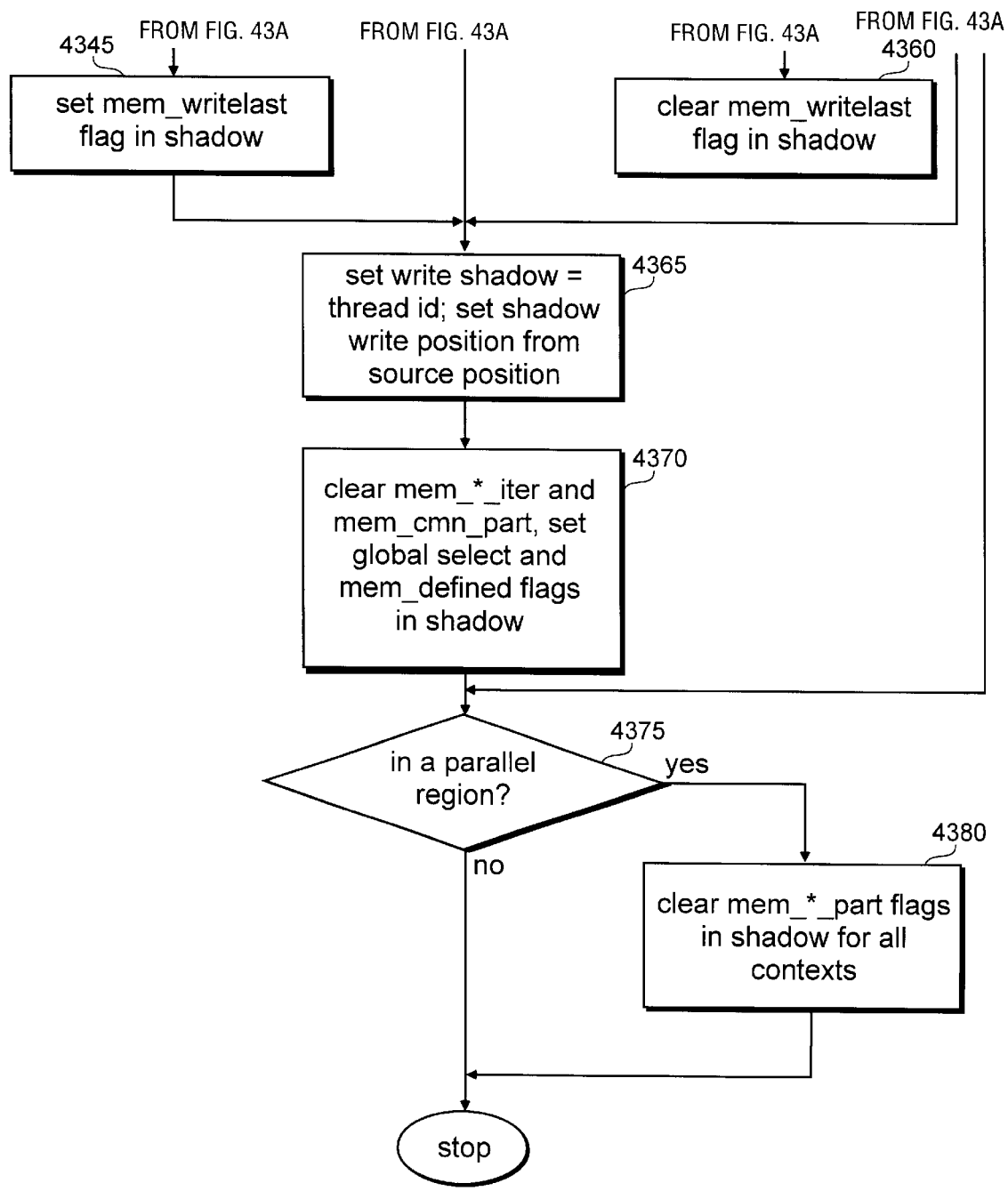

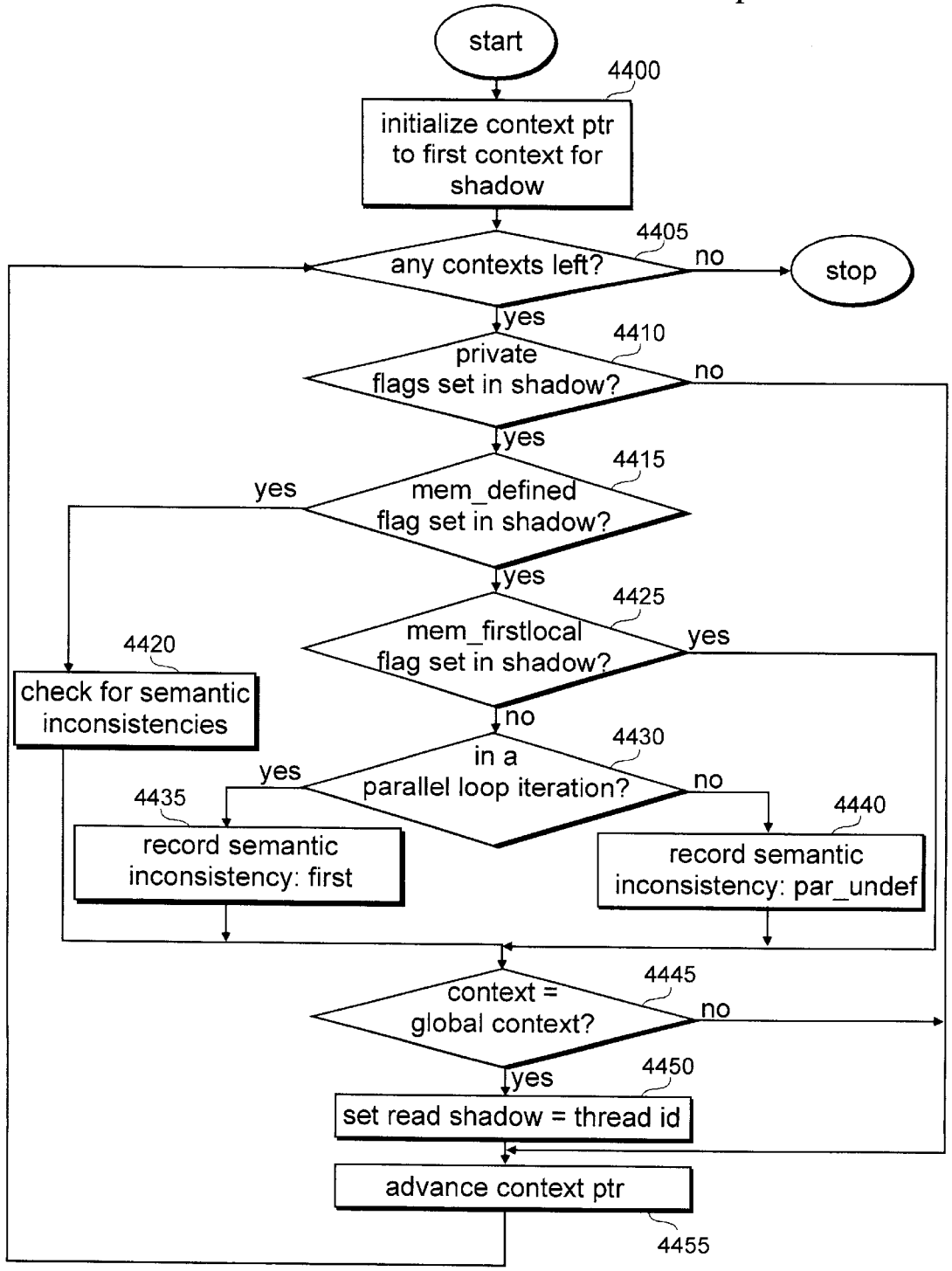
FIG. 44 - Check Undefined Shadow, Step 4055

FIG. 45 - Check for Semantic Inconsistencies, Step 4420
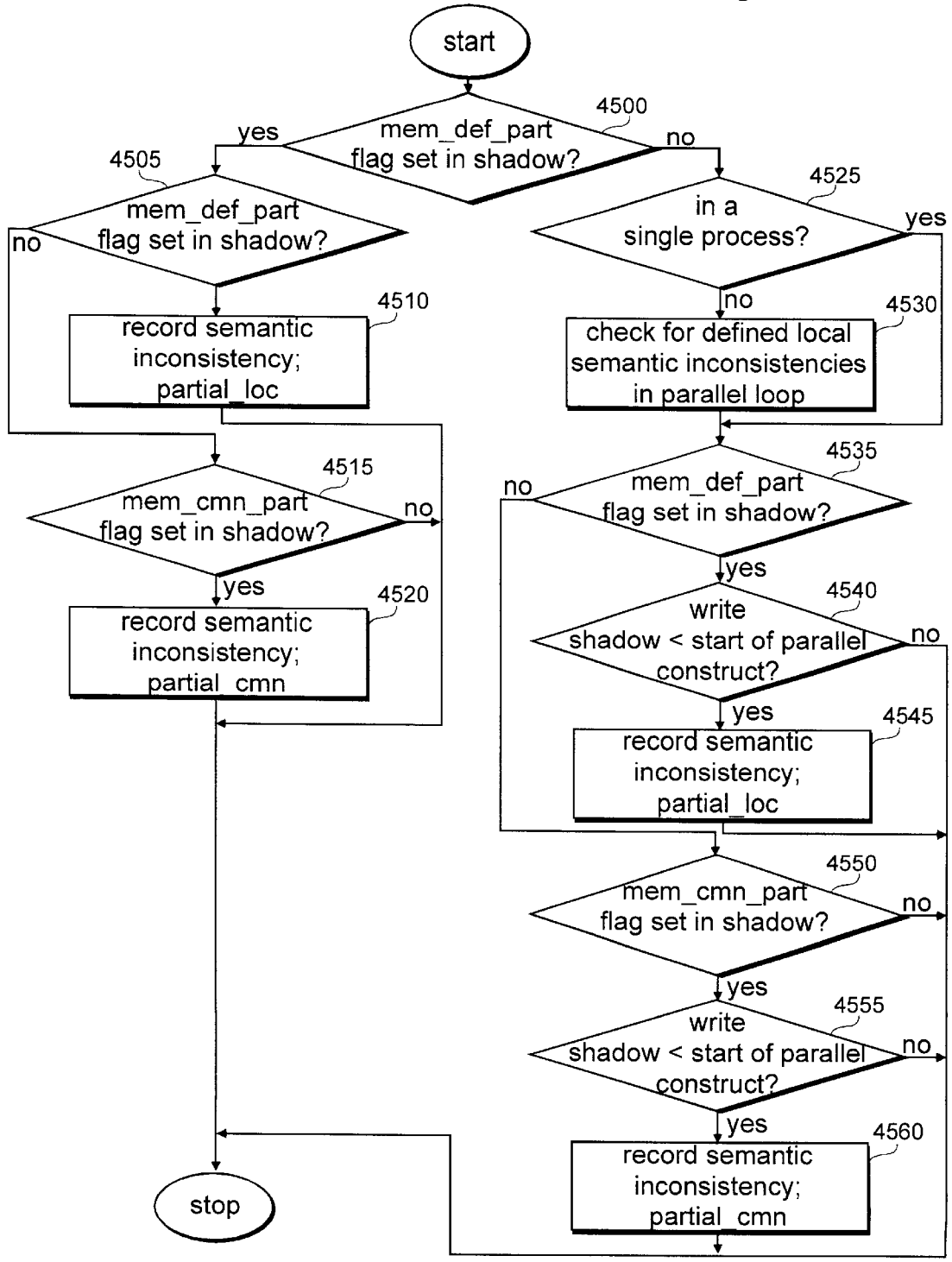

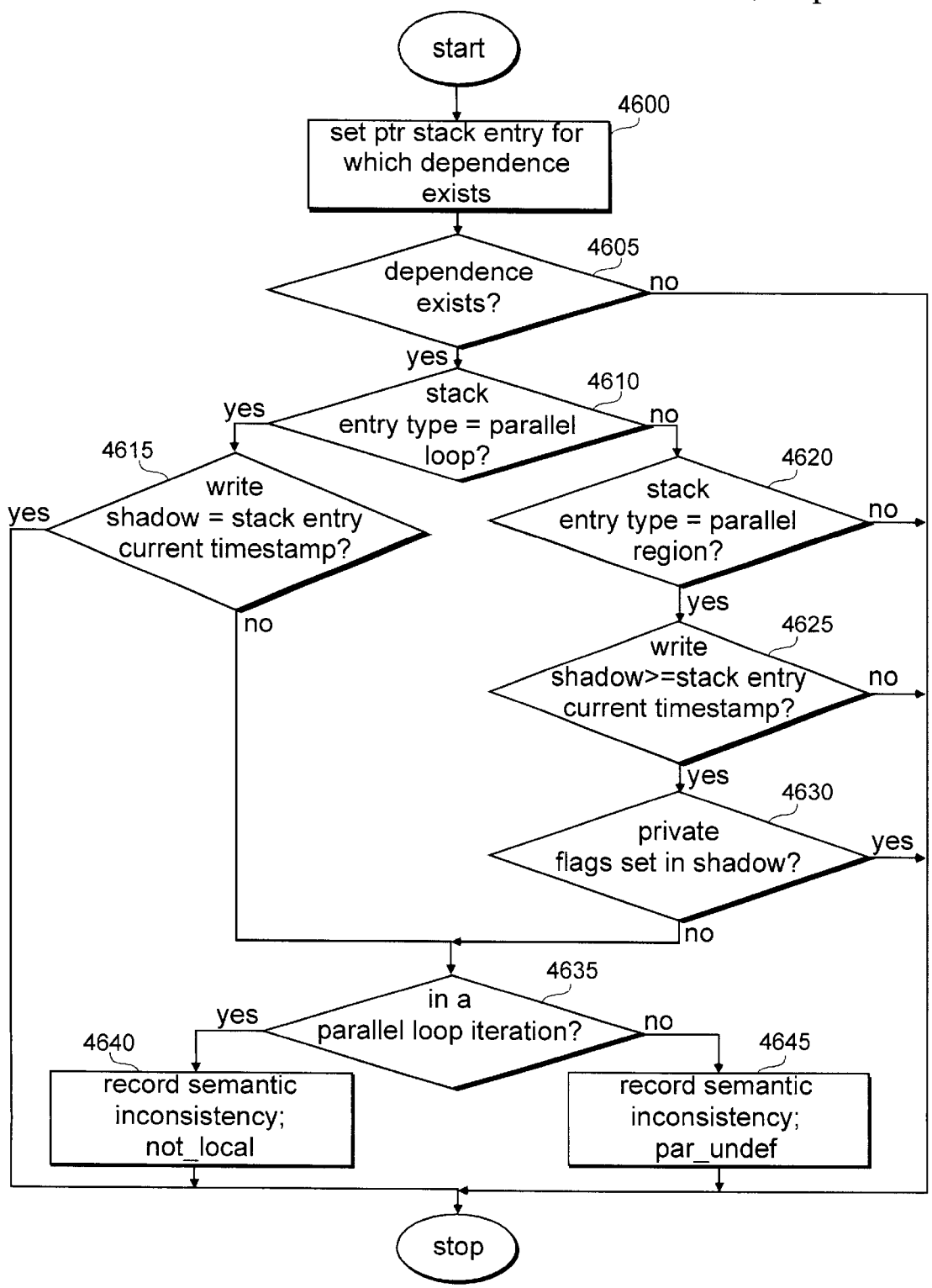
FIG. 46 - Check for Semantic Inconsistencies in PDO, Step 4530

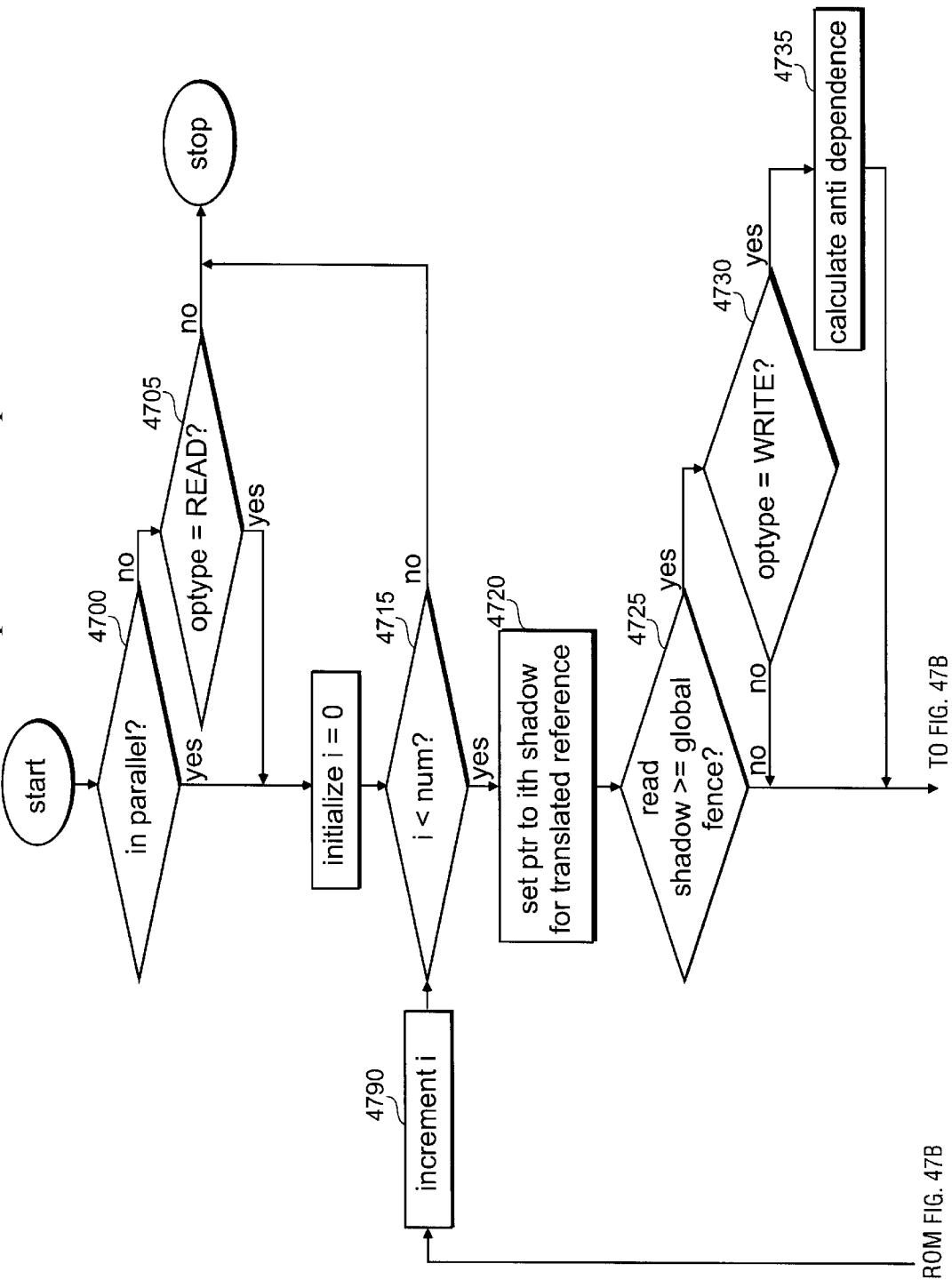
FIG. 47A - Calculate All Dependences, Steps 1420, 1550

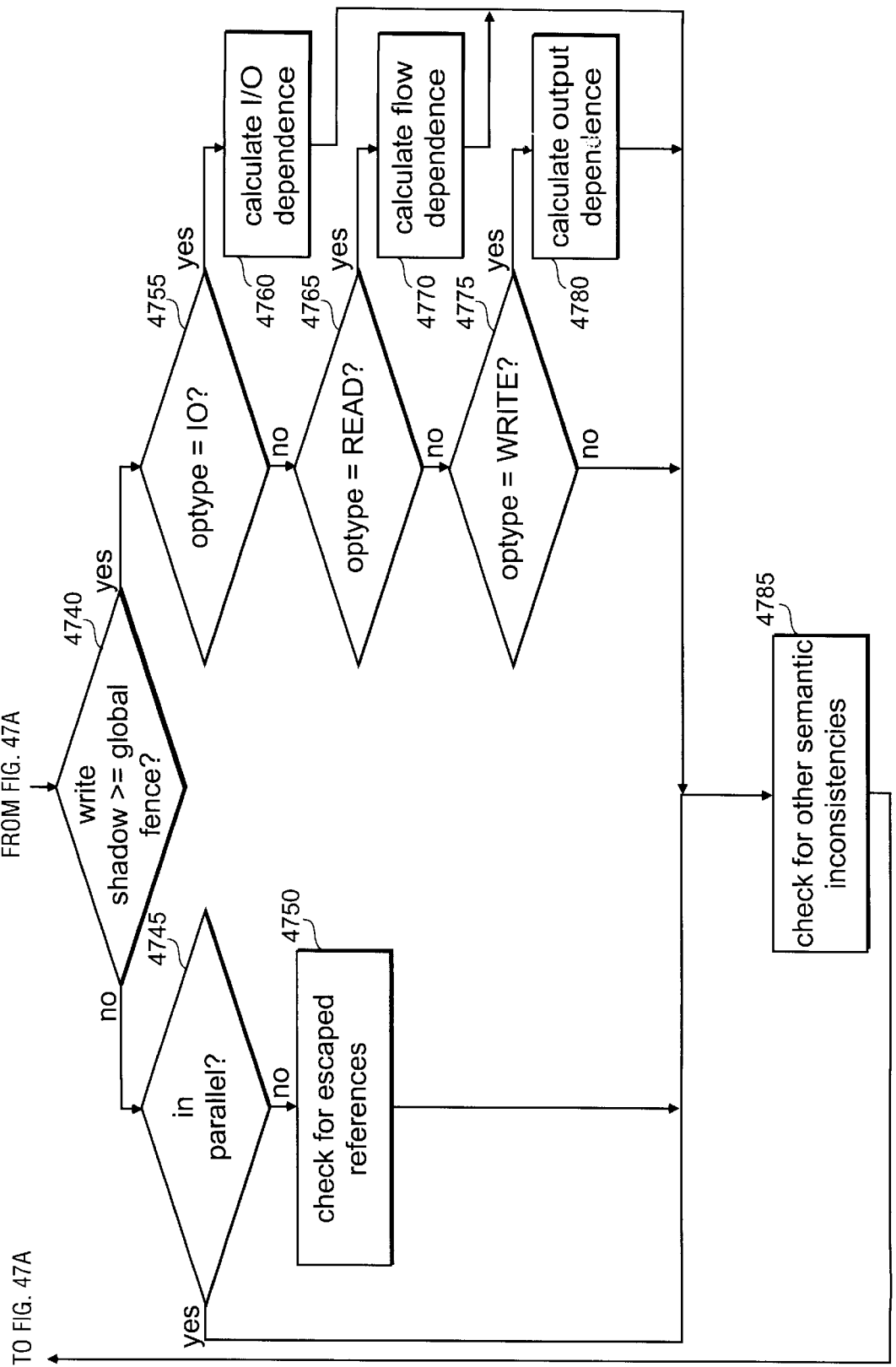
FIG. 47B - Calculate All Dependences, Steps 1420, 1550

FIG. 48 - Check for Other Semantic Inconsistencies, Step 4785
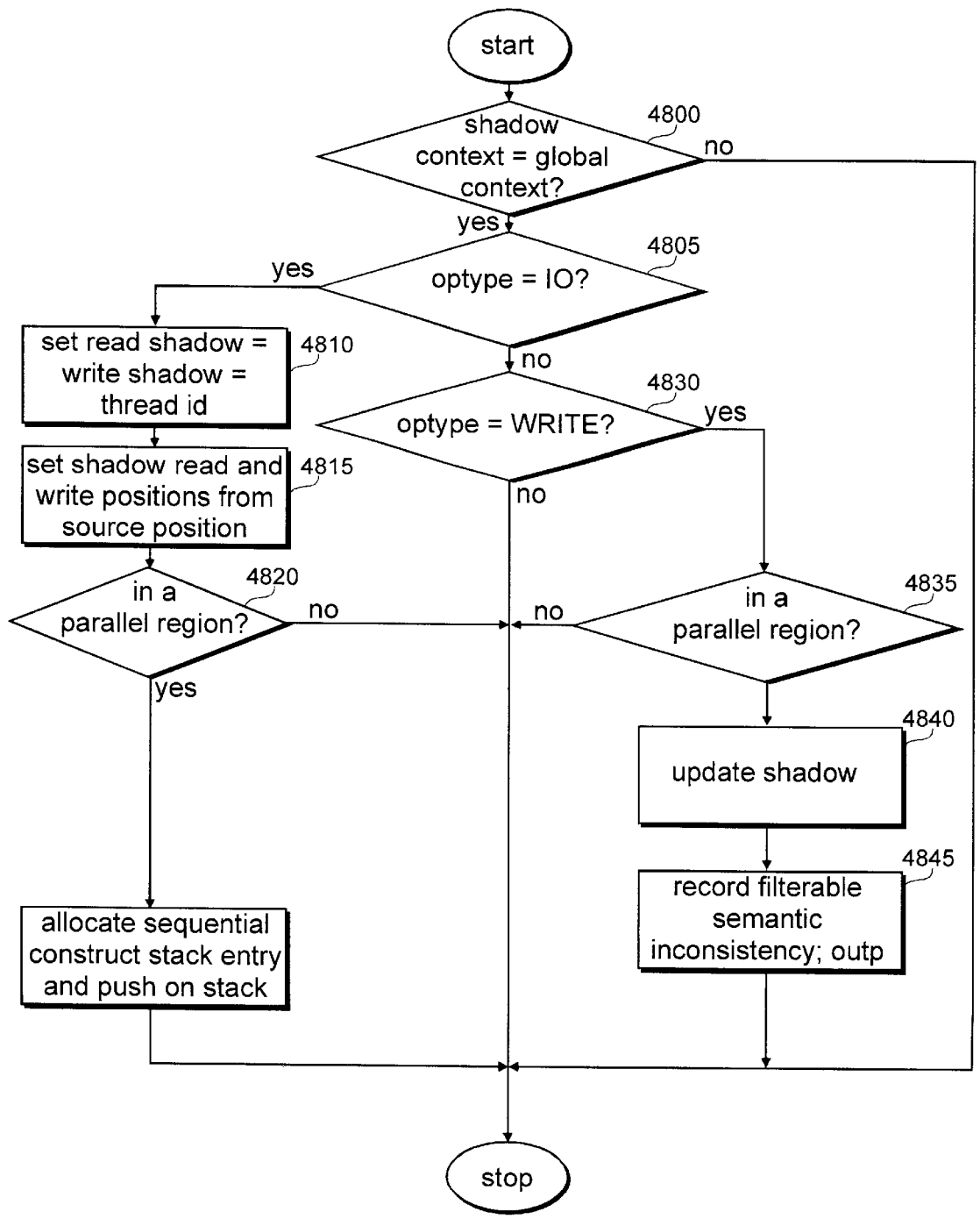

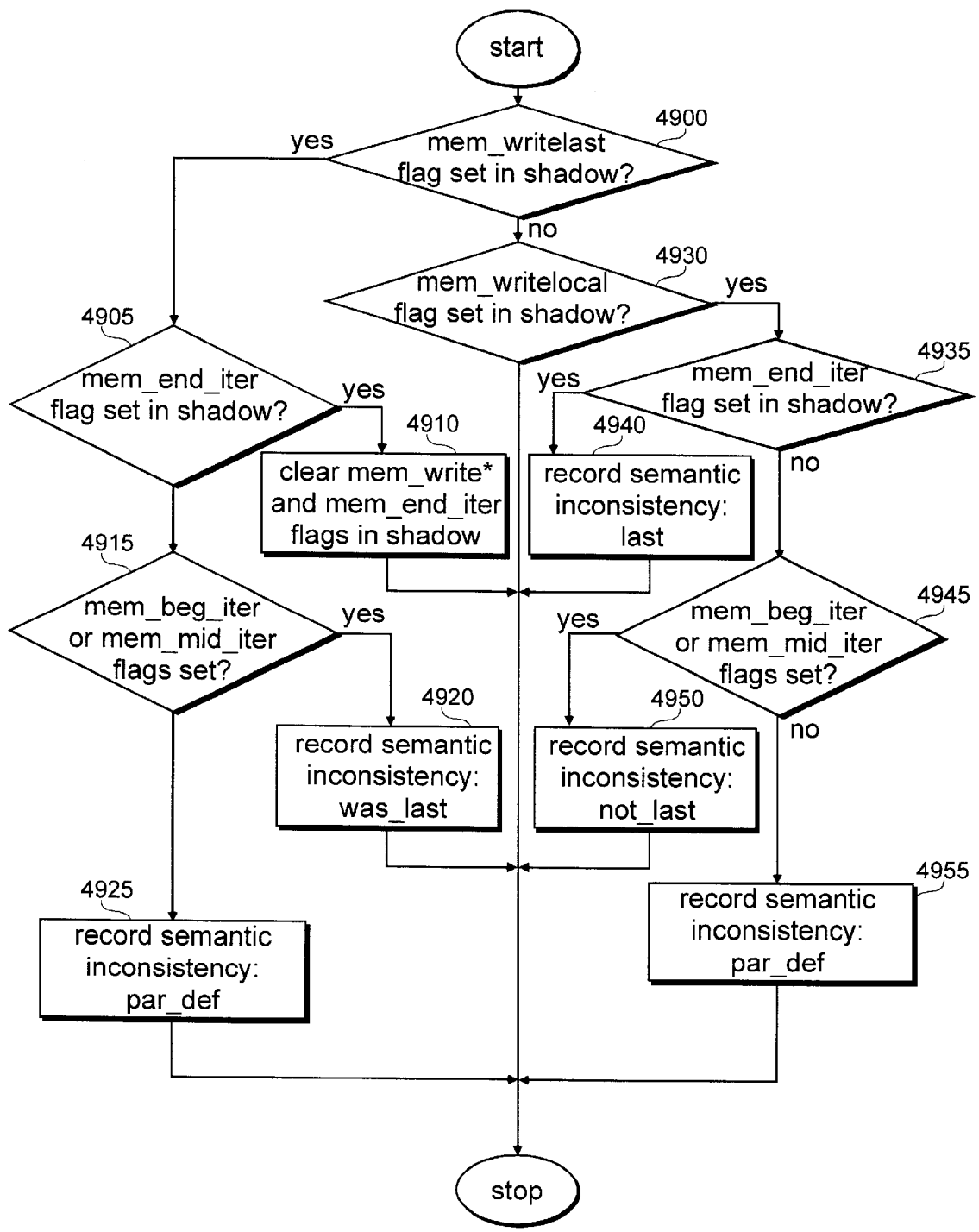
FIG. 49 - Check for Escaped References, Step 4750

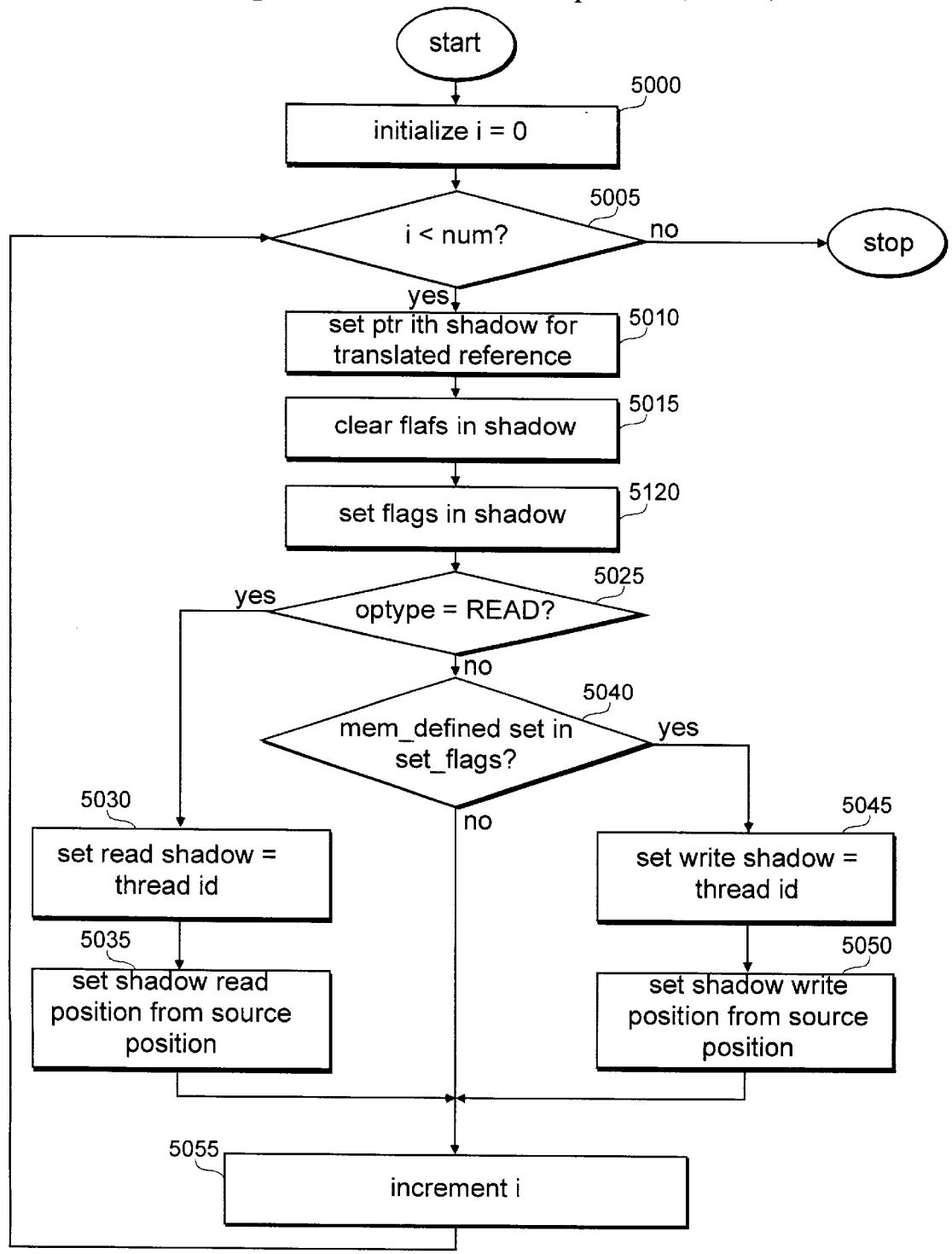
FIG. 50 - Update All Shadows, Steps 1425, 3525, etc.

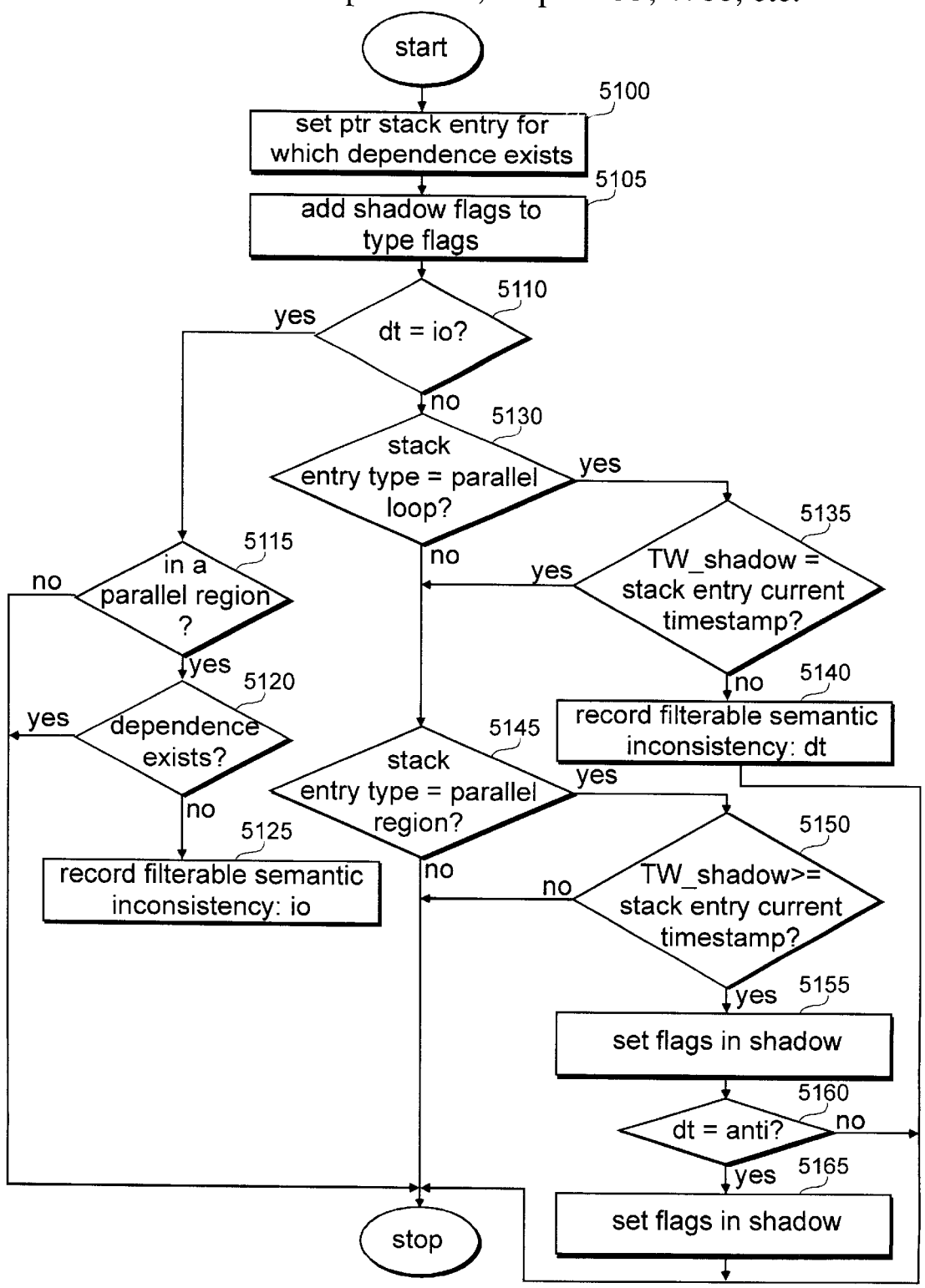
FIG. 51 - Calculate Dependence, Steps 4735, 4760, etc.

FIG. 52A Find Stack Entry for Dependence, Steps 4600, 5100
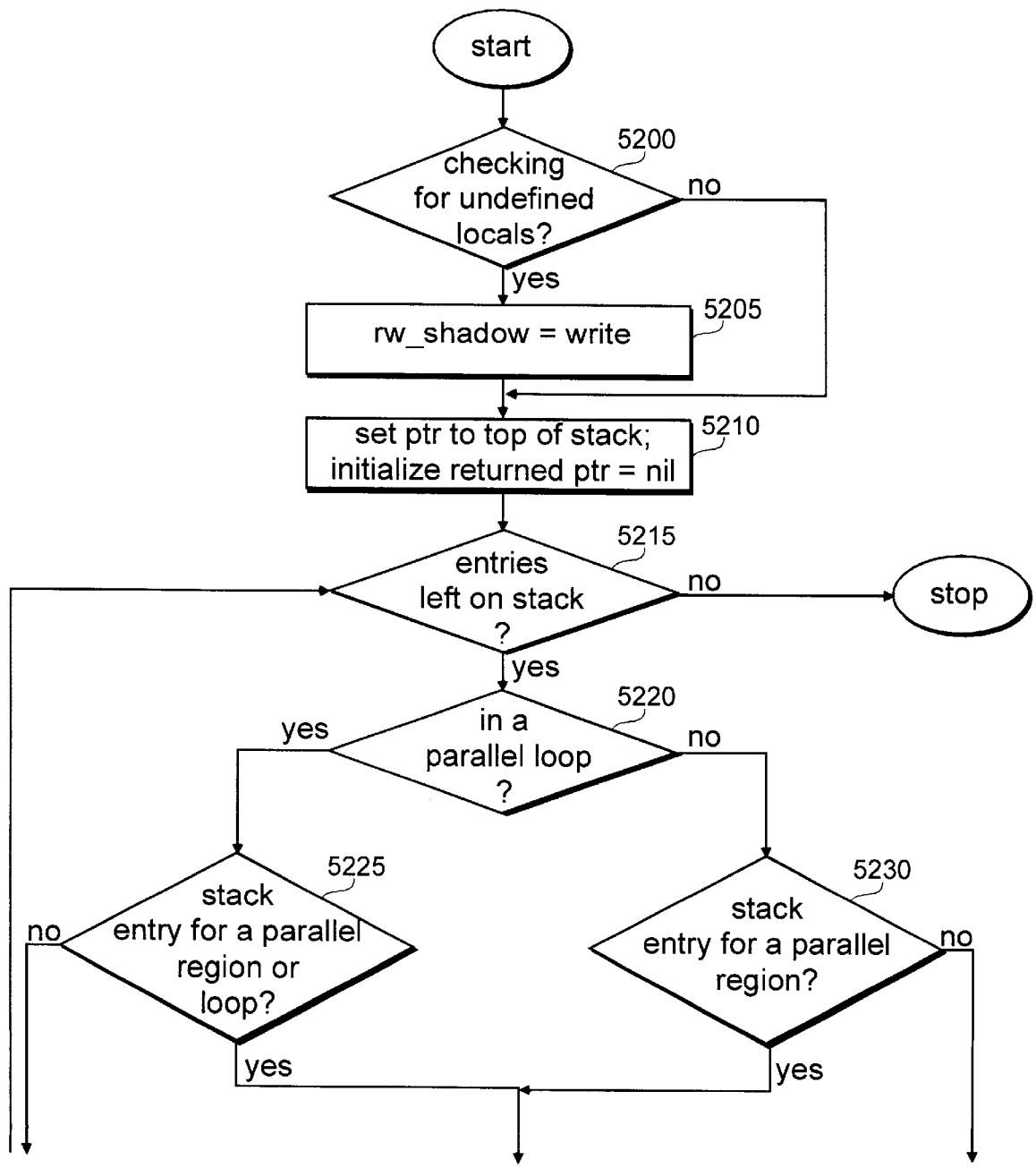

FIG. 52B Find Stack Entry for Dependence, Steps 4600, 5100
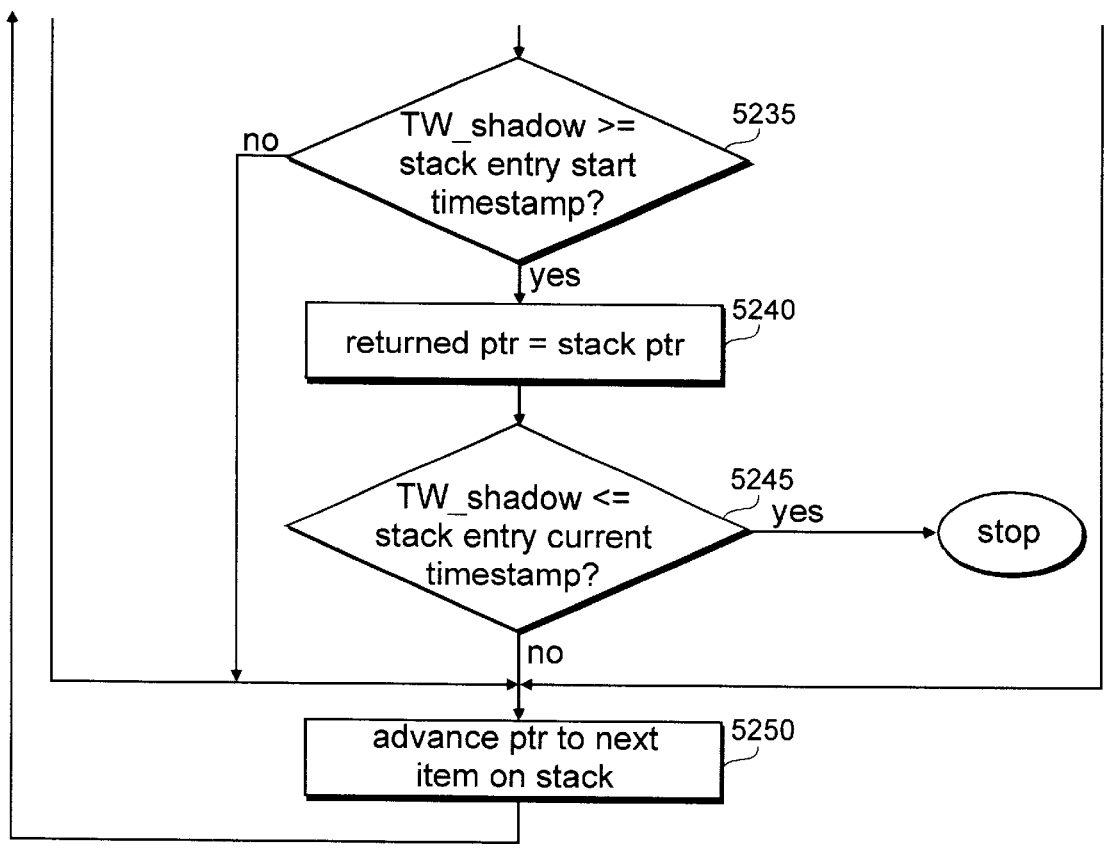

FIG. 53 - Record Semantic Inconsistency, Steps 2310, 2315, etc.
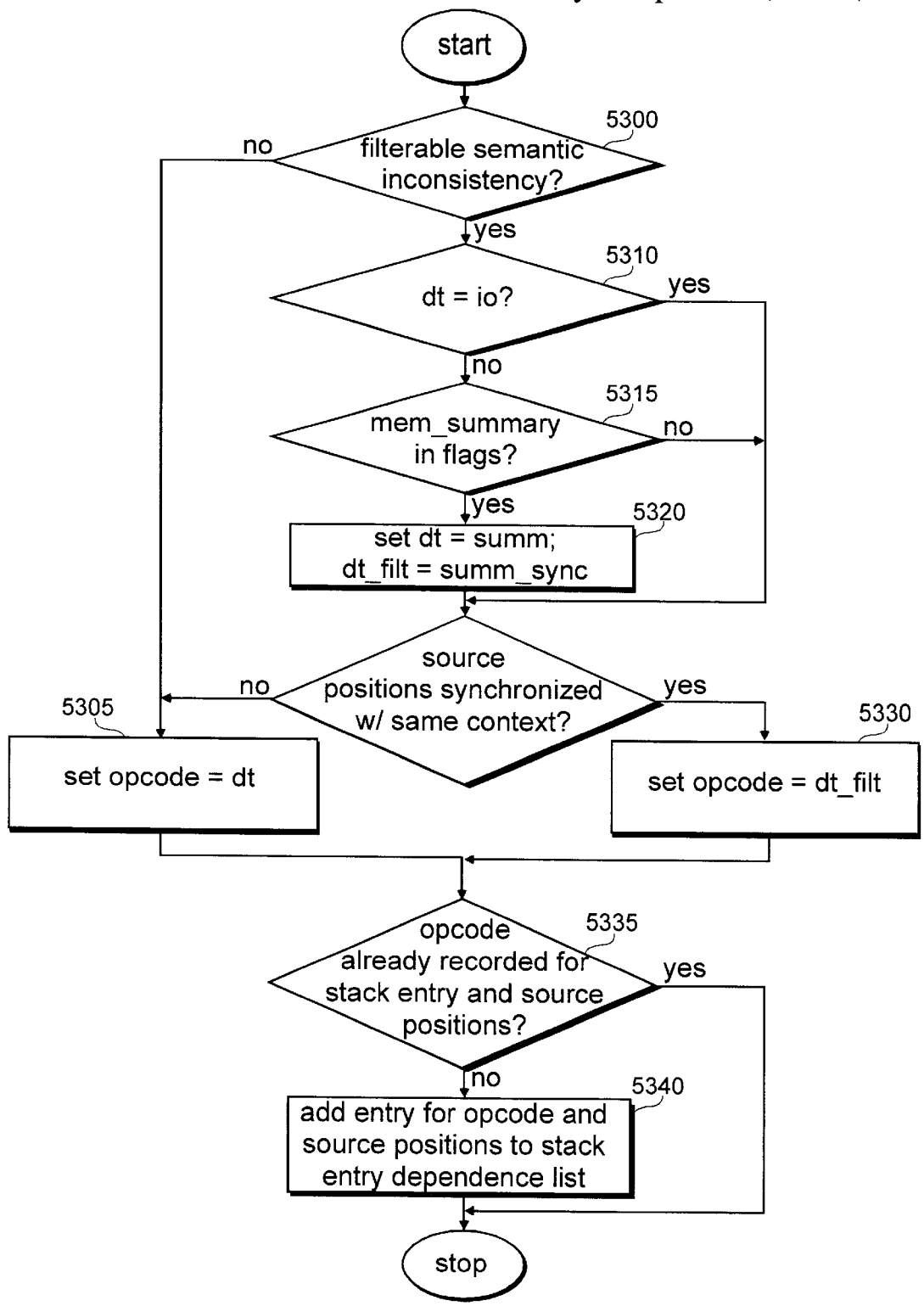

FIG. 54 - Algorithm for Termination Calls Inserted by Step 535
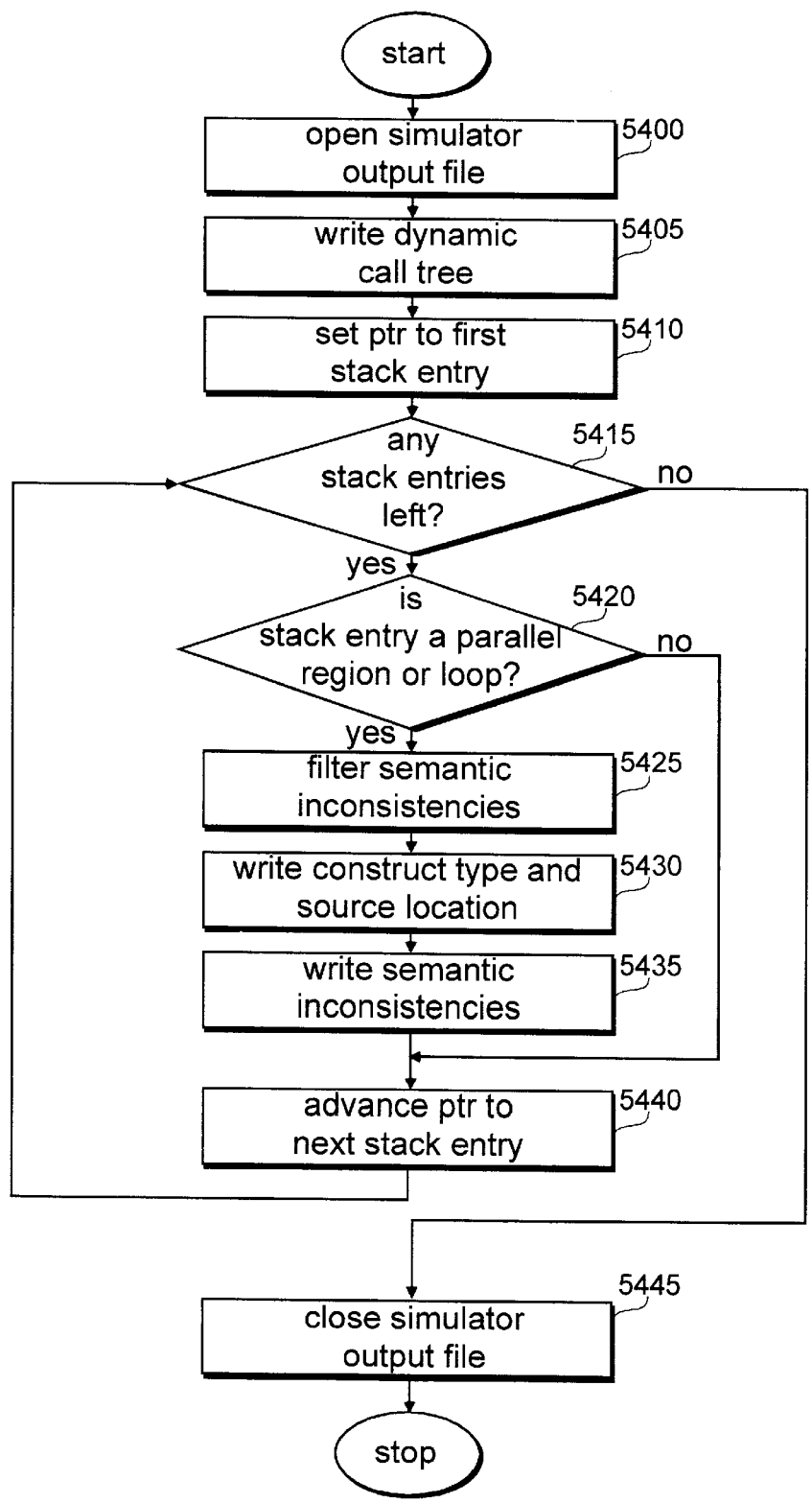

FIG. 55 - Filter Semantic Inconsistencies, Step 5425
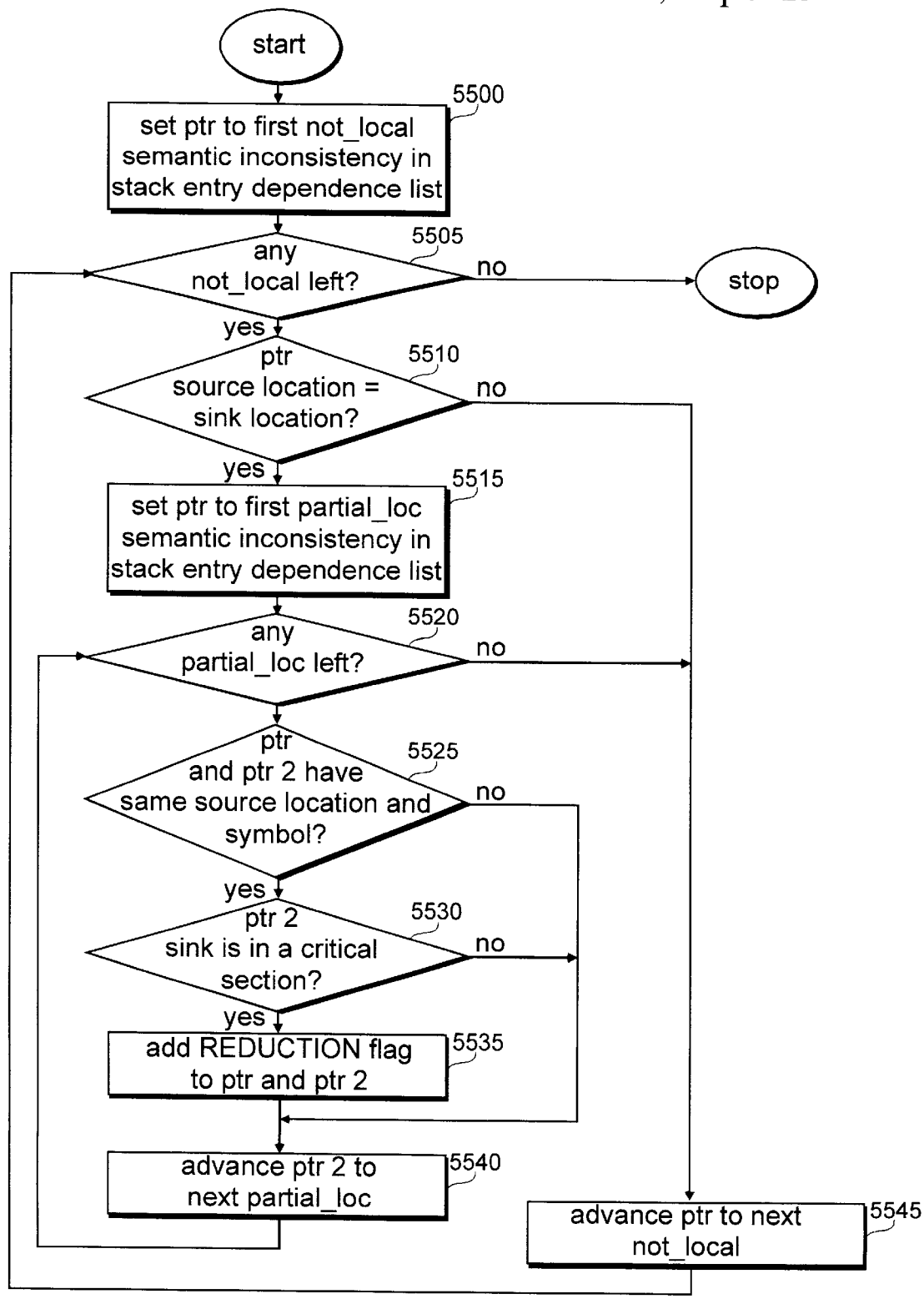

SOFTWARE IMPLEMENTED METHOD FOR AUTOMATICALLY VALIDATING THE CORRECTNESS OF PARALLEL COMPUTER PROGRAMS

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

MICROFICHE APPENDIX

A Microfiche Appendix of the presently conferred computer program source code is included and comprises five (5) sheets of fiche, having a total of 441 frames. The Microfiche Appendix is hereby expressly incorporated herein by reference, and contains material which is subject to copyright protection as set forth above.

FIELD OF THE INVENTION

The present invention relates to computer systems and to parallel computer programming, and, more particularly, to methods for automatically validating the correctness of parallel computer programs by identifying errors that could cause such programs to behave incorrectly or to produce incorrect results.

BACKGROUND OF THE INVENTION

Parallel computer programs are fundamentally more difficult to validate, test, and debug than sequential computer programs. While typical programs can exhibit traditional "sequential" errors, such as those caused by incorrect syntax, program logic, control flow, or rounding or truncation of numerical results, parallel programs can exhibit additional types of errors. Parallel programming errors can result from parallelizing a sequential program, wherein constraints on the ordering of operations in the original sequential program are relaxed in order to exploit parallelism, which results in unintended indeterminacy. In addition, errors can result from the incorrect application or use of parallel programming constructs; many of these errors are difficult or impossible to detect statically, especially without employing interprocedural analysis.

In many common parallel programming languages, a parallel program is constructed by starting with a sequential program and then forming its corresponding parallel version by annotating the sequential program, for example, with directives or language-extension statements. The traditional view of these annotations has been that they describe parallel programming constructs to be added to the sequential program. An alternative view, however, is that such annotations describe constraints in the sequential program to be relaxed to allow the exploitation of parallelism. This alternative view facilitates a broad definition of parallel program validation, wherein a parallel program is validated for correctness with respect to its corresponding sequential program, independent of timing, scheduling, or the number of processors or threads used to execute the parallel program. Validation should consider semantic inconsistencies caused by the incorrect use of parallel programming constructs as well as by unintended indeterminacy. Such semantic inconsistencies include not only dynamic dependencies but other errors caused by the modification of the sequential program.

The prior art has largely taken the traditional view in addressing parallel program debugging. Race detection and dynamic dependence analysis schemes have been described that detect errors caused by unintended indeterminacy during parallel execution. Little prior art exists, however, with respect to detecting errors caused by the incorrect use of parallel programming constructs or with respect to the general problem of parallel program validation as defined above.

Race detection schemes employ either static, post-mortem, and on-the-fly analysis methods. Static methods suffer the disadvantage of being overly conservative, even if aggressive interprocedural and symbolic analysis is used, since they do not resolve references that must be analyzed at runtime. Post-mortem methods require the production and storage of extremely large amounts of data in order to provide complete, accurate race analysis. Reducing the amount of data required results in correspondingly less accurate analysis. On-the-fly race analysis methods help eliminate the requirement of storing large amounts of post-mortem analysis data, without sacrificing the accuracy of dynamic analysis techniques. Most race detection schemes, however, require a parallel execution of the program being analyzed. These methods typically require a (particular) parallel machine on which to execute the parallel program, and thus can not analyze parallel programs with severe errors that prevent parallel execution or cause abnormal termination.

Dynamic dependence analysis methods detect data races that could potentially occur during execution of a parallel program via on-the-fly analysis of the corresponding sequential program. These methods do not require parallel execution, and they isolate the analysis from particular timings or interleavings of events, scheduling methods, or numbers of processors or threads used. Dynamic dependence analysis schemes, however, do not detect errors arising from incorrect parallel programming construct use, and do not fully support a complete parallel programming language or dialect.

Most race detection schemes, even those employing so-called sequential traces, are limited in several ways. First, they suffer all the disadvantages of dynamic methods that require parallel execution: the schemes are inherently less portable, and they cannot analyze parallel programs with catastrophic errors. Second, many of these schemes assume simplified parallel programming models, and most are not based on realistic, complete parallel programming languages or dialects. While these schemes address the issue of language generality, they still suffer the disadvantage of requiring parallel execution, which limits the classes of errors that can be analyzed, and the portability and applicability of the methods.

Other relative debugging techniques also suffer the disadvantages of most of the aforementioned schemes (e.g., requiring parallel execution, analyzing one particular parallel execution). Some degree of parallel execution is still required. The prior art, therefore, lacks the advantage of validating the correctness of a parallel computer program without the need for parallel execution.

SUMMARY OF THE INVENTION

The present invention is a software-implemented method for validating the correctness of parallel computer programs that were written in various programming languages. The validation method detects errors that could cause these parallel computer programs to behave incorrectly or to produce incorrect results. Validation is accomplished by transforming input parallel computer programs under computer control and sequentially executing the resulting transformed programs. The validation method is system-independent, is portable across various computer architectures and platforms, and requires no input program modification on the part of the programmer.

The input to the validation method is a parallel computer program. The parallel computer program results from annotating its corresponding sequential computer program according to a parallelism specification; the annotations describe constraints in the sequential program to be relaxed to allow the exploitation of parallelism. Validation is accomplished by detecting the semantic inconsistencies between the parallel computer program and its corresponding sequential computer program. The validation method itself translates the input parallel computer program into a second, sequential computer program such that the second sequential computer program, when executed, detects and reports the semantic inconsistencies between the parallel computer program and its corresponding sequential computer program.

In the preferred embodiment of the present invention, the validation method is implemented by performing a program transformation, under computer control, of the input parallel computer program into a second, sequential computer program. This program transformation comprises two steps. First, machine instructions are added to the input program so that, when the resulting program is executed sequentially, an event trace is generated that reflects the storage accesses, memory usage, and use of parallel programming constructs in the input program. Second, additional machine instructions are added that cause this event trace to be analyzed, during the aforementioned sequential execution, so that semantic inconsistencies between the input parallel computer program and its corresponding sequential computer program are detected and reported. The event trace analysis is implemented via an infrastructure that supports both dynamic dependence analysis and checking for other relevant types of semantic inconsistencies. Since dynamic, on-the-fly analysis methods can be used to detect semantic inconsistencies during sequential execution, the invention also realizes the previously described advantages of these techniques.

Accordingly, it is an object of the present invention to provide a mechanism for automatically validating the correctness of parallel computer programs by identifying semantic differences between parallel computer programs and their corresponding sequential programs that would cause the parallel computer programs to behave differently or to produce different results when compared to the corresponding sequential programs.

It is also an object an object of the present invention to provide a mechanism for validating the correctness of parallel computer programs that is independent of the particular timing or interleaving of events associated with particular parallel executions of programs or the number of threads used, that is portable across various types of computer systems, and that is independent of attributes of particular computer systems, including, but not limited to, hardware architecture or configuration, operating system, compiler, linker, or thread environment.

It is a further object of the present invention to provide a validation mechanism that analyzes a complete, parallel programming language dialect and is independent of the particular parallel programming language used.

It is yet another object of the present invention to provide a validation mechanism that reports semantic inconsistencies with respect to programmer-level constructs in the source code of parallel programs, and that supports separate compilation of the various procedures in these programs.

These and further objects and associated advantages of the present invention will become apparent from a consideration of the subsequent description of the presently preferred embodiments of the invention in conjunction with the accompanying drawings.

DRAWING FIGURES

FIG. 1 illustrates the overall structure and program flow of the present invention.

FIG. 2 illustrates the main algorithm performed by the translation means in FIG. 1.

FIG. 3 illustrates how procedure entries are processed in FIG. 2.

FIG. 4 illustrates how basic blocks and statements are processed in FIG. 2.

FIG. 5 illustrates how procedure exits are processed in FIG. 2.

FIG. 6 illustrates how C$PAR PARALLEL region entries are processed in FIG. 4.

FIG. 7 illustrates how ENDDO statements are processed in FIG. 4.

FIG. 8 illustrates how I/O statements are processed in FIG. 4.

FIG. 9 illustrates other statements shown in FIGS. 4, 7 and 8.

FIG. 10 illustrates how opcodes are added during statement processing in FIGS. 3–9.

FIG. 11 illustrates how buffer indexes for opcodes are allocated in FIG. 10.

FIG. 12 illustrates the main algorithm for the initialization runtime library procedure in FIG. 1.

FIG. 13 illustrates the main algorithm for the simulator runtime library procedure in FIG. 1.

FIG. 14 describes READ and WRITE (and related) opcode processing in FIG. 13.

FIG. 15 describes IO and POISON_IO opcode processing in FIG. 13.

FIG. 16 describes MALLOC opcode processing in FIG. 13.

FIG. 17 describes AUTO and LOCAL (and related) opcode processing in FIG. 13.

FIG. 18 describes private COMMON opcode processing in FIG. 13.

FIG. 19 describes ENTRY opcode processing in FIG. 13.

FIG. 20 describes EXIT and REXIT opcode processing in FIG. 13 .

FIG. 21 illustrates how stack size estimates are updated in FIG. 20.

FIG. 22 describes RENTRY opcode processing in FIG. 13.

FIG. 23 describes LENTRY and SENTRY opcode processing in FIG. 13.

FIG. 24 describes IENTRY and LAST_IENTRY opcode processing in FIG. 13.

FIG. 25 describes IEXIT opcode processing in FIG. 13.

FIG. 26 describes CENTRY and OENTRY (and related) opcode processing in FIG. 13.

FIG. 27 describes LEXIT, SEXIT, CEXIT, and OEXIT opcode processing in FIG. 13 .

FIG. 28 illustrates the algorithm used to free stack entry memory list storage in FIGS. 20 and 27.

FIG. 29 illustrates the algorithm used to free stack entry COMMON list storage in FIG. 20.

FIG. 30 illustrates the algorithm used to allocate thread ids in FIGS. 22 and 23.

FIG. 31 describes BARRIER and EXT_BARRIER opcode processing in FIG. 13.

FIG. 32 describes STOP opcode processing in FIG. 13.

FIG. 33 describes INIT, LINE, STACKSIZE, FREE, CALL and NOP opcode processing in FIG. 13.

FIG. 34 illustrates the algorithm used to translate a buffer to shadows in FIG. 13.

FIG. 35 illustrates the algorithm used to translate leading misaligned buffer areas in FIG. 34.

FIG. 36 illustrates the algorithm used to translate main buffer areas in FIG. 34.

FIG. 37 illustrates the algorithm used to translate trailing misaligned buffer areas in FIG. 34.

FIG. 38 illustrates the algorithm used to check for semantic inconsistencies in FIGS. 36 and 37.

FIG. 39 illustrates the algorithm used to translate a vector to shadows in FIG. 13.

FIG. 40 illustrates the algorithm used to check for semantic inconsistencies in FIG. 39.

FIG. 41 illustrates the algorithm used to fetch I/O shadows in FIG. 15.

FIG. 42 illustrates the algorithm used to remove flags from shadows in FIG. 13.

FIG. 43 illustrates the algorithm used to check an defined shadow in FIG. 40.

FIG. 44 illustrates the algorithm used to check an undefined shadow in FIG. 40.

FIG. 45 illustrates the algorithm used to check for semantic inconsistencies in FIG. 44.

FIG. 46 illustrates the algorithm used to check for semantic inconsistencies in loops in FIG. 45.

FIG. 47 illustrates the algorithm used to calculate all dependencies in FIG. 13.

FIG. 48 illustrates the algorithm used to check for other semantic inconsistencies in FIG. 47.

FIG. 49 illustrates the algorithm used to check for escaped references in FIG. 47.

FIG. 50 illustrates the algorithm used to update all shadows for various opcodes processed in FIG. 13.

FIG. 51 illustrates the algorithm used to calculate a single dependence in FIG. 47.

FIG. 52 illustrates the algorithm used to identify dependencies in FIGS. 46 and 51.

FIG. 53 illustrates the algorithm used to record a semantic inconsistency in FIG. 13.

FIG. 54 illustrates the main algorithm for the termination runtime library procedure in FIG. 1.

FIG. 55 illustrates the algorithm used to filter semantic inconsistencies in FIG. 54.

DETAILED DESCRIPTION OF THE PRESENTLY PREFERRED EMBODIMENTS

The preferred embodiment of the present invention takes as its input a parallel computer program, written in a common programming language, that comprises one or more procedures. Parallelism in the input program is expressed by annotating the corresponding sequential computer program with a parallelism specification. These annotations designate, among other things, parallel regions of execution that may be executed by one or more threads, as well as how storage for various program variables should be treated in parallel regions. In the presently preferred embodiment of the invention, the parallelism specification comprises a set of directives as defined below. As those skilled in the art will appreciate, a parallelism specification can also include extensions to a programming language or the like.

Sequential regions, between parallel regions, are executed by a single thread (referred to hereinafter as the sequential thread). The sequential thread is also used for execution in parallel regions, so that it remains utilized between sequential regions when it would otherwise remain idle. Typically, parallel regions execute different threads on different physical processors in a parallel computer system, with one thread per processor; however, multiple threads may execute on a single processor, or vice-versa. By using this general thread-based model of parallel execution, the preferred embodiment validates the input program regardless of the number of threads or physical processors used.

To facilitate the description of the structure and operation of the preferred embodiment, and only by way of an example, the input parallel computer program is assumed to be written in the Fortran 77 programming language. In the preferred embodiment, the parallelism specification appears in the form of KAP/Pro Parallel Directives, available from Kuck and Associates, Inc. (KAI), located in Champaign, Ill. As those skilled in the art will appreciate, the input parallel computer program can be written in any other computer language that supports parallelism and other forms of parallelism specifications can be employed, without departing from the spirit and scope of the invention.

Annotations to describe parallelism are made by applying directives to the corresponding sequential computer program to produce the input parallel computer program. In particular, the availability of the following particular directives is provided in the preferred embodiment:

1. C$PAR PARALLEL and C$PAR END PARALLEL, which delimit parallel regions and separate them from surrounding sequential regions (the C$PAR PARALLEL directive has a SHARED clause, which lists global, shared variables for a region, and a LOCAL clause, which lists local, private variables for a region);
2. C$PAR PDO and C$PAR END PDO, which delimit parallel DO loops (the C$PAR PDO directive has a FIRSTLOCAL clause, which specifies shared variables to be temporarily local inside the loop with local copies initialized from the shared variables, and a LASTLOCAL clause, which specifies shared variables to be temporarily local inside the loop with shared variables updated from the local copies on the last loop iteration);
3. C$PAR PDONE, which allows early exits from C$PAR PDO loops;
4. C$PAR SINGLE PROCESS and C$PAR END SINGLE PROCESS, which delimit sections of code to be executed only by a single processor;
5. C$PAR CRITICAL SECTION and C$PAR END CRITICAL SECTION, C$PAR ORDERED SECTION, and C$PAR END ORDERED SECTION, which delimit sections of code to be executed only by a single processor at a time;
6. C$PAR BARRIER, which denotes barrier synchronization among all threads at a particular point during execution in a parallel region; and
7. C$PAR INSTANCE TASK, C$PAR INSTANCE PARALLEL, C$PAR NEW, and C$PAR COPY NEW, which describe how COMMON blocks should be privatized in parallel regions.

In the following description, a worksharing construct refers to either a C$PAR PDO loop or a C$PAR SINGLE PROCESS section, and a synchronization construct refers to either a C$PAR CRITICAL SECTION or a C$PAR ORDERED SECTION. Directives are not necessarily restricted to appearing lexically enclosed within C$PAR PARALLEL regions in a single procedure (i.e., orphaned directives are allowed).

The following is a list and description of the particular types of semantic inconsistencies identified in the preferred embodiment of the present invention. Each type is denoted by an identifier that is also the simulator output opcode for that semantic inconsistency (see also the subsequent discussion of Table 4). Several of these have FILTERED variants; these filtered versions are issued when the references involved are consistently synchronized, e.g., within C$PAR CRITICAL SECTIONS with the same name; thus, these are not normally considered errors. They may be examined, however, to identify potential sources of round-off error due to lack of associativity in floating point arithmetic, to identify parallel I/O operations, or to identify performance bottlenecks due to synchronization and serialization.

Data and I/O Dependence

ANTI_DEPENDENCE[_FILTERED]—An anti dependence exists between a read and a write to a variable, wherein a read must occur before a write in order for the read to access the correct value. For example:

s1: a=b+c
s2: b=d+e

Here, s1 must execute before s2 in order for s1 to use the correct value for b, i.e., the value produced by some statement executed before s1, not the value produced by s2.

FLOW_DEPENDENCE[_FILTERED]—A flow dependence exists between a write and a read from a variable, wherein a write must occur before a read in order for the read to access the correct value. For example:

s1: a=b+c
s2: d=a+e

Here, s1 must execute before s2 in order for s2 to use the correct value for a, i.e., the value produced by s1.

OUTPUT_DEPENDENCE[_FILTERED]—An output dependence exists between two writes to a variable, wherein two writes must occur in a particular order so that subsequent reads will access the correct value. For example:

s1: a=b+c
s2: a=d+e

Here, s1 must execute before s2 in order for subsequent statements to use the correct value for a, i.e., the value produced by s2, not the value produced by s1.

FLOW_ANTI_DEPENDENCE[_FILTERED]—A flow or anti dependence exists between a write and a read from a variable, but the two cases cannot be distinguished because the accesses to the variable were summarized.

PARALLEL_IO[_FILTERED]—An I/O statement was executed in parallel without synchronization. This condition may be reported either with respect to a single I/O statement or in relation to two different I/O statements within the same parallel construct.

Last Local

LAST_LOCAL—A write of a LOCAL variable within a C$PAR PDO is followed by a read outside the loop; thus, the value read is undefined. The condition can be remedied by making the variable SHARED and placing it on the LAST LOCAL list of the C$PAR PDO.

LAST_COPY_OUT—Similar to LAST_LOCAL, a write of a LOCAL variable within a C$PAR PARALLEL region but outside a C$PAR PDO is followed by an uninitialized read. Since the write is not inside a C$PAR PDO, the condition cannot be remedied by placing the variable on the LAST LOCAL list.

NOT_LAST_LOCAL—Similar to LAST_LOCAL, a write of a LOCAL variable within a C$PAR PDO is followed by an uninitialized read; however, in this case, the write is not executed on the last loop iteration. Since the LAST LOCAL mechanism requires a write on the last iteration, the condition cannot be remedied by using this mechanism.

LAST_LOCAL_NOT_LAST_FILTER—A LAST LOCAL variable was not written on the last iteration of a C$PAR PDO; the LAST LOCAL mechanism requires a write on the last iteration.

LAST_LOCAL_NOT_SHARED—A variable on the LAST LOCAL list of a C$PAR PDO was not shared in the enclosing C$PAR PARALLEL region; the LAST LOCAL mechanism is used with shared variables.

First Local

FIRST_LOCAL—A read of a LOCAL variable within a C$PAR PDO is not preceded by a write inside the loop; thus, the value read is undefined. The condition can be remedied by making the variable SHARED and placing it on the FIRST LOCAL list of the C$PAR PDO.

FIRST_COPY_IN—Similar to FIRST_LOCAL, a read of a LOCAL variable within a C$PAR PARALLEL region but outside a C$PAR PDO is uninitialized. Since the read is not inside a C$PAR PDO, the condition cannot be remedied by placing the variable on the FIRST LOCAL list.

NOT_FIRST_LOCAL[_FILTERED]—Similar to FIRST_LOCAL, an uninitialized read of a LOCAL variable occurs within a C$PAR PDO, and a write follows inside the loop that causes a cross-iteration dependence. The condition cannot be remedied by placing the variable on the FIRST LOCAL list; the dependence must be removed. The FILTERED version is issued when it is likely due to a properly coded local reduction (i.e., per-processor accumulation into LOCAL variables followed by a global reduction within a C$PAR CRITICAL SECTION).

FIRST_LOCAL_NOT_SHARED—A variable on the FIRST LOCAL list of a C$PAR PDO was not shared in the enclosing C$PAR PARALLEL region; the FIRST LOCAL mechanism is used with shared variables.

Local Communication

LOCAL_VAR_COMM[_FILTERED]—A LOCAL variable is written in an iteration of a C$PAR PDO (or in a C$PAR SINGLE PROCESS) and is read in a subsequent iteration or worksharing construct in the enclosing C$PAR PARALLEL region. Differences in scheduling may result in different processors writing and reading the (various elements of the) variable. The FILTERED version is issued when it is likely due to a properly coded local reduction (i.e., per-processor accumulation into LOCAL variables followed by a global reduction within a C$PAR CRITICAL SECTION).

Example

```
C$PAR PARALLEL SHARED(Y,Z) LOCAL(X)
C$PAR PDO STATIC
    DO I = 1, N
        X(I) = Y(I)
    END DO
C$PAR PDO DYNAMIC
    DO I = 1, N
        Z(I) = X(I)
    END DO
C$PAR END PARALLEL
```

LOCAL_VAR_COMM_PRVCOM—Similar to LOCAL_VAR_COMM except for private COMMON variables instead of LOCAL variables.

Construct Nesting

ORDERED_TWICE—A C$PAR ORDERED SECTION was executed more than once in a particular iteration of a C$PAR PDO.

ORDERED_MISSED_ONE—A C$PAR ORDERED SECTION was not executed in all iterations of a C$PAR PDO.

NESTED_WORKSHARING—An attempt was made to execute a C$PAR PDO or C$PAR SINGLE PROCESS when one was already active.

BARRIER_IN_WORKSHARING—An attempt was made to execute a C$PAR BARRIER when a C$PAR PDO or C$PAR SINGLE PROCESS was already active.

WS_OR_BAR_IN_SYNC—An attempt was made to execute a C$PAR PDO, C$PAR SINGLE PROCESS, or C$PAR BARRIER within an active C$PAR CRITICAL SECTION or C$PAR ORDERED SECTION.

I. Overall Structure

FIG. 1 illustrates the overall structure of the preferred method of the present invention. The primary input is a parallel computer program 100, which results from annotating its corresponding sequential computer program with a parallelism specification. In addition, input is also taken from a program database 105, which comprises information about the structure, procedures, and variables of input program 100. Input program 100 is augmented via a translation means 110 to produce an instrumented, sequential computer program 115. In the preferred embodiment, translation means 110 performs a source-to-source transformation of input program 100 to produce instrumented program 115, and is implemented by a general purpose computer having a memory and operating under the control of a computer program. Translation means 110 also causes information about input program 100 to be fed back into program database 105.

Instrumented program 115 is linked with a runtime support library 120 by a general purpose computer's linker 125 to produce an executable, sequential computer program 130. Sequential execution (135) of executable program 130 on a general purpose computer produces a simulator output 140. Simulator output 140 is processed by a postprocessor 145, with additional input from program database 105, and produces a semantic inconsistency report 150. Report 150 describes the semantic inconsistencies between input program 100 and its corresponding sequential computer program.

II. Program Database

Program database 105 stores information about the various procedures in input program 100. Postprocessor 145 uses this information to translate simulator output 140 into report 150 so that semantic inconsistencies are reported in a useful, readable format. In the preferred embodiment, program database 105 is implemented as a disk-based persistent store with a hierarchical, directory/file structure that is organized into global and per-procedure information areas.

Runtime library 120 represents procedure names, symbol (variable) names, names of COMMON blocks, names of C$PAR CRITICAL SECTIONs, names of C$PAR ORDERED SECTIONs, and other names associated with identifiers in input program 100 as symbol numbers. Symbol numbers are integers that uniquely identify these names (on a per-procedure basis, except for global names such as procedure or COMMON block names). The correspondence between these names and numbers is stored and kept up-to-date in program database 105. Similarly, the parallel programming constructs in each procedure are assigned construct numbers by translation means 110. These construct numbers are stored in program database 105; runtime library 120 represents particular instances of constructs in input program 100 via their construct numbers.

III. Translation Means

Translation means 110 produces instrumented program 115 via a source-to-source translation of input program 100. In the preferred embodiment of the present invention, translation means 110 inserts calls to runtime library 120 to process a stream of simulator input opcodes generated by instrumented program 115. This opcode stream is presented to the runtime library by adding instructions to instrumented program 115 that store simulator input opcodes in an opcode buffer, and by inserting runtime library calls that pass this buffer as an argument at the appropriate points in input program 110.

Simulator input opcodes: Table 1 presents a list of simulator input opcodes that are introduced by translation means 110 and processed by runtime library 120. Many of the opcodes correspond directly to particular C$PAR directives. This list defines the set of program events recognized during simulation and required in order to identify semantic inconsistencies in input program 100.

Table 2 illustrates the operands that are associated with each of the simulator input opcodes listed in Table 1. Opcodes and their arguments are encoded into words in an opcode buffer, for presentation to runtime library 120, in one of two forms. In form A, an opcode and up to two small-valued arguments are encoded in the first buffer word. In form B, an opcode and one larger-valued argument are encoded in the first buffer word. In either form, subsequent, extra buffer words are used for additional or larger-valued arguments. For the READn, WRITEn, S_READn, and S_WRITEn opcodes in Table 2, n is a non-negative integer, the size is the number of elements being read or written, the element size is $2^n$ bytes, and the stride is the number of bytes between successive elements. For scalar operations such as READ, size=1 and stride=1 are implied.

FIG. 2 is a flowchart of the algorithm performed by translation means 110 for each procedure in input program 100. Step 200 allocates and initializes global data structures to be used in the translation of the current procedure. Step 205 performs several program transformations on the procedure to facilitate the translation process, including:

converting ELSEIF statements into ELSE clauses containing IF statements;

restructuring multiple ENTRY points into a single entry combined with branches back to the original ENTRY points; and splitting function calls out of statement expressions and storing their return values in temporary variables.

Step 210 divides the procedure into basic blocks. Steps 215 and 220 insert a initialization library call into the main program with an argument that specifies the name of program database 105. Step 225 processes all the procedure's ENTRY points, step 230 processes all the statements in each of the procedure's basic blocks (as determined by step 210), and step 235 processes each of the procedure's exit or return points. Step 240 inserts a declaration for the opcode buffer used in steps 225–235. In the preferred embodiment, this buffer is an array of words, the size of which is determined by a buffer size computed in steps 225–235; the buffer is placed in a COMMON block so that it may be used in multiple procedures.

TABLE 1

| opcode | meaning |
|---|---|
| Simulator Input Opcodes (part 1 of 2) | |
| CALL | procedure call describes call site in calling procedure |
| ENTRY | procedure entry, beginning of called procedure |
| EXIT | procedure exit, end of called procedure |
| STACKSIZE | estimates local stack size requirements |
| STOP | end of main program, STOP statement, etc. |
| IO | I/O statement |
| POISON_IO | incompletely-analyzed I/O statement (e.g., with implied DO) |
| MALLOC | ALLOCATE statement |
| FREE | FREE statement |
| LINE | source position change |
| NOP | no-operation |
| RENTRY | C$PAR PARALLEL |
| REXIT | C$PAR END PARALLEL |
| LENTRY | C$PAR PDO |
| LEXIT | C$PAR END PDO |
| IENTRY | beginning of parallel loop iteration |
| LAST_IENTRY | beginning of last parallel loop iteration |
| IEXIT | end of parallel loop iteration |
| SENTRY | C$PAR SINGLE PROCESS |
| SEXIT | C$PAR END SINGLE PROCESS |
| CENTRY | C$PAR CRITICAL SECTION |
| CEXIT | C$PAR END CRITICAL SECTION |
| Simulator Input Opcodes (part 2 of 2) | |
| OENTRY | C$PAR ORDERED SECTION |
| OEXIT | C$PAR END ORDERED SECTION |
| BARRIER | C$PAR BARRIER |
| EXT_LOCK | CALL LOCK |
| EXT_UNLOCK | CALL UNLOCK |
| EXT_BARRIER | CALL BARRIER |
| INIT | write variable but ignore semantic inconsistencies |
| AUTO | declaration of stack-allocated local variable |
| LOCAL | C$PAR PARALLEL, LOCAL declaration |
| FIRST_LOCAL | C$PAR PDO, FIRSTLOCAL declaration |
| LAST_LOCAL | C$PAR PDO, LASTLOCAL declaration |
| IP_NEW | C$PAR NEW for C$PAR INSTANCE TASK |
| TC_NEW | or for C$PAR INSTANCE PARALLEL |
| IP_COPYNEW | C$PAR COPY NEW for C$PAR INSTANCE TASK |
| TC_COPYNEW | or for C$PAR INSTANCE PARALLEL |
| READ | read variable |
| WRITE | write variable |
| PDO_WRITE | write C$PAR PD6 loop index variable |
| READn | read vector with stride, vectorized loop |
| WRITEn | write vector with stride, vectorized loop |
| S_READn | read vector with stride, summarized loop |
| S_WRITEn | write vector with stride, summarized loop |

TABLE 2

Operand Decoding for Various Simulator Input Opcodes in Table 1

| opcode | form | argument(s) | extra word(s) |
|---|---|---|---|
| EXIT, CALL, IO, POISON_IO | A, B | | |
| NOP, STOP, LINE, BARRIER, EXT_BARRIER, EXT_LOCK, EXT_UNLOCK | A, B | arg | |
| STACKSIZE | A, B | | size |
| ENTRY | A | num_blocks, scope | sym, line |
| | B | num_blocks | scope, sym, line |
| RENTRY, REXIT, LENTRY, LEXIT, IENTRY, LAST_IENTRY, IEXIT, SENTRY, SEXIT | A | loc, line | |
| | B | loc | line |
| CENTRY, CEXIT, OENTRY, OEXIT | A | loc, line | sym |
| | B | loc | line, sym |
| MALLOC | A, B | | size, adr |
| FREE | A, B | | adr |
| READ, WRITE, PDO_WRITE, INIT, AUTO, LOCAL, FIRST_LOCAL, LAST_LOCAL, IP_NEW, TC_NEW, IP_COPYNEW, TC_COPYNEW | A | bytes, sym (size = 1, stride = 1) | adr |
| | B | sym (size = 1, stride = 1) | bytes, adr |
| READn, WRITEn, S_READn, S_WRITEn | A | size, sym | stride, adr |
| | B | sym | size, stride, adr |

Global data structures: The following data structures are allocated and initialized in step 200. The symbol sets store sets of variables for a procedure, ENTRY point, C$PAR PARALLEL region, or C$PAR PDO with the properties specified below.

Opcode Buffer buffer index—initially zero, the most recently filled position in the opcode buffer for a particular basic block buffer size—initially zero, the maximum value of the buffer index over all basic blocks, for step 240

Procedure Symbol Sets procedure AUTOs—all stack-allocated or AUTOMATIC variables procedure globals—all global variables accessible by the procedure procedure instance task COMMONs—all variables in C$PAR INSTANCE TASK private COMMON blocks procedure newed private COMMONs—all variables in C$PAR INSTANCE TASK or C$PAR INSTANCE PARALLEL private COMMON blocks that have C$PAR NEW specified in the procedure's declarations procedure copy newed private COMMONs—all variables in C$PAR INSTANCE TASK or C$PAR INSTANCE PARALLEL private COMMON blocks that have C$PAR COPY NEW specified in the procedure's declarations

ENTRY Symbol Sets this entry formals—all formal parameters for a particular ENTRY point C$PAR PARALLEL region symbol sets:

region privates—all variables on the region's LOCAL list region escaped privates—subset of region privates that are passed off as actual parameters in calls to other procedures within the region region newed private COMMONs—all variables in C$PAR INSTANCE TASK or C$PAR INSTANCE PARALLEL private COMMON blocks that have C$PAR NEW specified for the region region copy newed private COMMONs—all variables in C$PAR INSTANCE TASK or C$PAR INSTANCE PARALLEL private COMMON blocks that have C$PAR COPY NEW specified for the region C$PAR PDO Symbol Sets PDO first locals—all variables on the PDO's FIRSTLOCAL list PDO last locals—all variables on the PDO's LASTLOCAL list Procedure entries: FIG. 3 is a flowchart of the algorithm performed by step 225 to process procedure entries. Step 300 determines if there are any ENTRY points left to process; if not, the algorithm terminates. Step 305 initializes the set of this entry formals for the current ENTRY point. Steps 310–330 add opcodes to the opcode buffer at the ENTRY. Steps 310 and 315 add the LINE and ENTRY opcodes. Step 320 adds TC_NEW opcodes for the set of procedure instance task COMMONs, TC_NEW and IP_NEW opcodes for the set of procedure newed private COMMONs, and TC_COPYNEW and IP_COPYNEW opcodes for the set of procedure copy newed private COMMONs. Step 325 adds AUTO opcodes for the set of procedure AUTOs, and READ opcodes for all variables, found in the bounds expressions of the declarations for the set of this entry fornals, that are in the set of procedure globals or the set of this entry formals. Step 330 adds a STACKSIZE opcode with an argument that specifies the total size of all variables in the set of procedure AUTOs. Step 335 inserts a simulator library call, with arguments that specify the opcode buffer and current buffer index, and resets the buffer index to zero.

Basic blocks: FIG. 4 is a flowchart of the algorithm performed by step 230 to process basic blocks. Step 400 determines if there are any basic blocks left to process; if not, the algorithm terminates. Step 405 determines if there are any statements left to process in the next basic block; if so, step 410 adds a LINE opcode for the next statement. Step 415 determines if the statement is a C$PAR directive or a program statement. For directives, step 420 adds a directive opcode (RENTRY, REXIT, LENTRY, LEXIT, SENTRY, SEXIT, CENTRY, CEXIT, OENTRY, OEXIT, or BARRIER) corresponding to the directive. Steps 425 and 430 handle C$PAR PARALLEL region entry directives, steps 435 and 440 handle C$PAR PDO directives by adding FIRST_LOCAL opcodes for the set of PDO first locals, and steps 445 and 450 handle C$PAR END PDO directives by adding LAST_LOCAL opcodes for the set of PDO last locals. For program statements, steps 455 and 460 handle the beginning of loop iterations by adding IENTRY opcodes, steps 465 and 470 handle the end of loop iterations by processing ENDDO statements, steps 475 and 480 handle I/O statements, and step 485 handles the remaining types of statements. Step 490 inserts a simulator call as in step 335.

Procedure exits: FIG. 5 is a flowchart of the algorithm performed by step 235 to process procedure exits. Step 500 determines if there are any exit or return points left to process; if not, the algorithm terminates. If steps 505 and 510 determine that the exit point is not a program exit, step 515 adds an EXIT opcode denoting the end of the procedure and step 520 inserts a simulator call as in step 335. For program exits, step 525 adds a STOP opcode, step 530 inserts a simulator call as in step 335, and step 535 inserts a termination library call.

Directives and statements: FIG. 6 is a flowchart of the algorithm performed by step 430 to process a C$PAR PARALLEL region entry. Step 600 adds private COMMON opcodes as in step 320: TC_NEW opcodes for the set of procedure instance task COMMONs, TC_NEW and IP_NEW opcodes for the set of region newed private COMMONs, and TC_COPYNEW and IP_COPYNEW opcodes for the set of region copy newed private COMMONs. Step 605 adds LOCAL and READ opcodes as in step 325: LOCAL opcodes for the set of region privates and the set of region escaped privates, and READ opcodes for all variables found in the bounds expressions of the declarations for the set of region privates. Step 610 adds a STACKSIZE opcode, as in step 330, with an argument that specifies the total size of all variables in the set of region privates plus the set of PDO first locals and the set of PDO last locals for each C$PAR PDO within the C$PAR PARALLEL region.

FIG. 7 is a flowchart of the algorithm performed by step 470 to process an ENDDO statement. Step 700 performs processing as if step 485 had processed a DO statement. Steps 705 and 710 add an IEXIT opcode if the ENDDO is associated with a C$PAR END PDO directive.

FIG. 8 is a flowchart of the algorithm performed by step 480 to process an I/O statement. Step 800 determines if any implied DO loops or function calls appear in the statement; if not, step 805 adds an IO opcode and step 810 performs processing as if step 485 had processed the I/O statement. Otherwise, step 815 inserts a simulator call as in step 335, and step 820 adds a POISON_IO opcode.

Statements and opcodes: FIG. 9 is a flowchart of the algorithm performed by steps 485, 700, and 810 to process the variable references in a statement. The algorithm traverses the items in the statement's expression in operator and operand precedence order. Step 900 determines if there are any items left to process during this traversal; if not, the algorithm terminates. Steps 905 and 910 handle ALLOCATE statements and MALLOC calls by adding MALLOC opcodes. Steps 915 and 920 handle DEALLOCATE statements and FREE calls by adding FREE opcodes. Step 925 determines if the item is a symbol (variable) reference; if so, step 930 determines if the variable is being read or written. For reads, step 935 adds a READ opcode; otherwise, step 940 determines if the write is for a C$PAR PDO loop index variable. If not, step 945 adds a WRITE opcode; otherwise, step 950 adds a PDO_WRITE opcode.

FIG. 10 is a flowchart of the algorithm performed by steps 310–330, 410, 420, 440, 450, 460, 515, 525, 600–610, 710, 805, 820, 910, 920, 935, 945, and 950 to add the specified simulator input opcode (see Table 1) to the opcode buffer in preparation for adding a simulator call (as in step 335). Step 1000 allocates a new buffer index for which the opcode will be stored. Step 1005 encodes the opcode word (see Table 2 and its associated explanation of opcode encoding forms A and B). Step 1010 determines if the opcode is IENTRY; if so, step 1015 encodes a second word with a LAST_IENTRY opcode, and step 1020 inserts statements to store either the IENTRY word or the LAST_IENTRY word in the buffer depending on whether the enclosing loop is in its last iteration. For most opcodes, step 1025 inserts a statement to store the encoded opcode word in the buffer. Step 1030 determines if any additional arguments need to be stored in subsequent words following the opcode word in the buffer (see Table 2 for additional arguments for each opcode). If not, the algorithm terminates; otherwise, step 1035 allocates a new buffer index, and step 1040 inserts a statement to store the next argument word in the buffer.

FIG. 11 is a flowchart of the algorithm performed by steps 1000 and 1035 to allocate a new buffer index. Step 1100 increments the buffer index, and steps 1105 and 1110 set the buffer size to the maximum of the current buffer size and the new buffer index.

IV. Runtime Library: A. Introduction, Data Structures, Initialization

In the preferred embodiment of the present invention, calls to procedures in runtime library 120 are inserted by translation means 110 that are executed during step 135 to generate simulator output 140. This description of the runtime library is organized into several parts:

A. This introduction, including descriptions of the global data structures and the initialization procedure.
B. A description of how each of the various semantic inconsistencies in the preceding list is identified by the runtime library by using the global data structures.
C. Description of the main simulator entry point, including how the various simulator input opcodes are processed.
D. A description of low-level procedures used to facilitate opcode processing.
E. A description of the termination and simulator output generation procedure.

Global data structures: The following data structures are maintained and used by the various procedures in runtime library 120. Several global data structures are used to maintain and manipulate the state of executable program 130; this state comprises several major parts:

The parallel constructs that have been executed. This is represented by a set of stack entries, one for each dynamic instance of each construct. A stack describes the current set (and nesting) of active constructs during any particular point in sequential execution (step 135). Stack entries are retained after being popped off this stack for use in associating semantic inconsistencies with particular constructs for generating simulator output 140.

The dynamic call tree. Like stack entries, dynamic call tree nodes are retained for use in generating simulator output 140.

The context in which a particular operation occurs. A context is defined by the set of C$PAR CRITICAL SECTIONs and C$PAR ORDERED SECTIONs that are held at the time of the operation.

The state of memory. This state is represented by a shadow space in memory. The shadow space is divided into shadow pages, each of which contains a number of shadow variables. A shadow variable keeps track of accesses to a particular memory location at a particular access size. The shadow access size is kept as large as possible given the sequence and type of accesses to that memory location. Multiple shadow pages exist for each context in which memory accesses to the shadowed memory occur.

Shadow variables are used to check for semantic inconsistencies such as those identified by using dynamic dependence analysis techniques known in the art. Each shadow variable contains a read timestamp (or read shadow) and a write timestamp (or write shadow) which indicate the time of the most recent read or write to the corresponding memory location. These timestamps do not store values of (simulated) execution time; rather, they store integer values, called thread ids, that represent the different threads of execution within a parallel program. A new thread id is allocated by incrementing a global thread id counter and then assigning the new thread id from the global counter; thread ids are allocated for each thread within worksharing constructs and at global program synchronization points.

The following paragraphs describe the structure and content of the global data structures in more detail. In this description, procedure names, symbol (variable) names, names of COMMON blocks, names of C$PAR CRITICAL SECTIONs, names of C$PAR ORDERED SECTIONS, and other names associated with identifiers in the source code are represented by symbol numbers; the correspondence between the various names and symbol numbers is stored in program database 105. Hash tables store the addresses of structures that must be saved for simulator output generation or that are associated with particular instances of constructs.

Source position: Describes a particular static location in input program 100 that corresponds to a particular point during dynamic execution. A source position is stored as a structure (record) that comprises the following fields:
procedure name
source line number
symbol name (if the particular point in dynamic execution pertains to a variable access)
context (indexes a sync node, to be described subsequently)

Shadow variable (mem__) flags: Describe particular types of memory accesses and other states and conditions. Table 3 lists the various mem__flags and their meanings; many of the flags correspond to particular simulator input opcodes (see Table 1). An abbreviation for each flag is given that is used in subsequent tables. Private flags refer to any of the mem__flags that denote private, as opposed to shared, memory accesses.

Shadow variable: The shadow storage for a single memory location and context. A shadow variable is stored as a structure that comprises the following fields:
read shadow (holds a thread id)
write shadow (holds a thread id)
read source position
write source position
set of mem__flags (see Table 3)

Shadow page: The shadows for a particular shadow page and a single context. A linked list of shadow pages stores the shadows for all relevant contexts. A pointer to each shadow page is saved in a hash table. A shadow page is stored as a structure that comprises the following fields:
pointer to the next shadow page (for the next context)
access shadow (latest read or write shadow for this context)
context (indexes a sync node, to be described subsequently)
shadow access size (in bytes)
number of shadow variables in this shadow page
variable-sized array of shadow variables for this context Osec node: A descriptor for a particular dynamic instance of a C$PAR ORDERED SECTION. A pointer to each osec node is saved in a hash table. An osec node is stored as a structure that comprises the following fields:
source position
ordered section name

TABLE 3

Shadow Variable Flags and Abbreviations

| flag (abbreviation) | meaning |
|---|---|
| mem__undef (u) | variable not currently defined |
| mem__defined (d) | variable has been defined |
| mem__summary (s) | S__READn, S__WRITEn opcodes |

TABLE 3-continued

Shadow Variable Flags and Abbreviations

| flag (abbreviation) | meaning |
|---|---|
| mem_auto (a) | AUTO opcode |
| mem_local (l) | LOCAL opcode |
| mem_ip_new (pn) | IP_NEW opcode |
| mem_ip_copynew (pc) | IP_COPYNEW opcode |
| mem_tc_new (tn) | TC_NEW opcode |
| mem_tc_copynew (tc) | TC_COPYNEW opcode |
| mem_read (r) | read operation |
| mem_write (w) | write operation |
| mem_heap (h) | allocated from global heap, shared storage |
| mem_thread (t) | allocated from local stack, private storage |
| mem_firstlocal (fl) | FIRST_LOCAL opcode |
| mem_lastlocal (ll) | LAST_LOCAL opcode |
| mem_writelocal (wo) | parallel write of LOCAL variable |
| mem_writelast (wa) | parallel write of LASTLOCAL variable |
| mem_beg_iter (b) | last access in first iteration of C$PAR PDO |
| mem_mid_iter (m) | last access in middle iteration of C$PAR PDO |
| mem_end_iter (e) | last access in last iteration of C$PAR PDO |
| mem_def_part (dp) | for partial_loc semantic inconsistency check |
| mem_cmn_part (cp) | for partial_cmn semantic inconsistency check |

Notes:
1 "Private flags" refer to any of the a, t, l, fl, ll, pn, pc, tn, or tc flags.

Simulator internal opcodes: Define the various types of semantic inconsistencies that can be identified during execution. For each type of semantic inconsistency described previously (simulator output opcode, see also the preceding list of semantic inconsistencies identified), that condition is represented internally by the internal opcode given in the right column of Table 4. Some conditions are further represented by the presence of absence of a REDUCTION flag. The presence of this flag indicates a probable reduction operation that is typically not a semantic inconsistency; the subsequent discussion of FIG. 54–FIG. 55 elaborates on the meaning and use of the REDUCTION flag.

Dependence node: Used to store a particular semantic inconsistency; lists of these store the semantic inconsistencies associated with a particular parallel construct. A dependence node is stored as a structure that comprises the following fields:

pointer to the next dependence node in a list
  semantic inconsistency type (simulator internal opcode; see Table 4)
  source position 1 (e.g., source)
  source position 2 (e.g., sink)

Memory node: Describes the memory accessed by a particular simulator input opcode; lists of these describe the memory usage associated with particular constructs. A memory node is stored as a structure that comprises the following fields:

pointer to the next memory node in a list
  type (a single mem_flag; see Table 3)
  base address
  size (of access in bytes)
  symbol name being accessed

TABLE 4

Simulator Output vs. Internal Opcodes

| semantic inconsistency (output opcode) | simulator internal opcode |
|---|---|
| ANTI_DEPENDENCE | anti |
| ANTI_DEPENDENCE_FILTERED | anti_sync |
| FLOW_DEPENDENCE | flow |
| FLOW_DEPENDENCE_FILTERED | flow_sync |
| OUTPUT_DEPENDENCE | outp |
| OUTPUT_DEPENDENCE_FILTERED | outp_sync |
| FLOW_ANTI_DEPENDENCE | summ |
| FLOW_ANTI_DEPENDENCE_FILTERED | summ_sync |
| PARALLEL_IO | io |
| PARALLEL_IO_FILTERED | io_sync |
| LAST_LOCAL | last |
| LAST_COPY_OUT | par_def |
| NOT_LAST_LOCAL | not_last |
| LAST_LOCAL_NOT_LAST_ITER | was_last |
| LAST_LOCAL_NOT_SHARED | share_last |
| FIRST_LOCAL | first |
| FIRST_COPY_IN | par_undef |
| NOT_FIRST_LOCAL | not_local |
| NOT_FIRST_LOCAL_FILTERED | not_local & REDUCTION |
| FIRST_LOCAL_NOT_SHARED | share_first |
| LOCAL_VAR_COMM | partial_loc |
| LOCAL_VAR_COMM_FILTERED | partial_loc & REDUCTION |
| LOCAL_VAR_COMM_PRVCOM | partial_cmn |
| ORDERED_TWICE | osec_many |
| ORDERED_MISSED_ONE | osec_skip |
| NESTED_WORKSHARING | nested_ws |
| BARRIER_IN_WORKSHARING | ws_barrier |
| WS_OR_BAR_IN_SYNC | sync_ws |

COMMON node: Describes the COMMON memory accessed by a particular simulator input opcode; lists of these describe the COMMON memory usage associated with particular constructs. A pointer to each COMMON node is saved in a hash table. A COMMON node is stored as a structure that comprises the following fields:

pointer to the next COMMON node in a list
  type (regular COMMON vs. C$PAR INSTANCE TASK vs. C$PAR INSTANCE PARALLEL)
  base address of COMMON block
  size of COMMON block (in bytes)
  COMMON block name
  new flag (boolean) specifying whether C$PAR NEW or C$PAR COPY NEW has occurred Heap node: Describes the heap memory allocated for a MALLOC opcode; lists of these describe the heap memory usage associated with particular constructs. A pointer to each heap node is saved in a hash table. A heap node is stored as a structure that comprises the following fields:

pointer to the next heap node in a list
  base address
  size of allocated area (in bytes)

Sync node: Defines a context in which an operation occurs; lists of these describe the contexts associated with a particular construct. A pointer to each sync node is saved in a hash table. A sync node is stored as a structure that comprises the following fields:

pointer to the next sync node in a list
  source position
  set of C$PAR CRITICAL SECTIONs (names) held
  set of C$PAR ORDERED SECTIONS (names) held
  C$PAR SINGLE PROCESS held flag (boolean)

Stack entry: Describes a particular dynamic instance of a particular construct; a stack of these describes the current set (and nesting) of active constructs during some point in dynamic execution. The semantic inconsistencies and memory usage associated with a particular construct are bound to the construct via lists of nodes whose heads are stored here. A stack entry is stored as a record and comprises the following fields:

source position (of the start of the construct)
    construct type (ENTRY, RENTRY, LENTRY (possibly serialized), IENTRY (possibly serialized), SENTRY (possibly serialized), CENTRY, or OENTRY)
    pointer to head of list of dependence nodes
    pointer to head of list of memory nodes
    pointer to head of list of COMMON nodes
    name of C$PAR CRITICAL SECTION or C$PAR ORDERED SECTION for these construct types
    start timestamp (holds a thread id)
    current timestamp (holds a thread id)
    saved thread id
    saved context (indexes a sync node)
    local stack size estimate (for this construct only)
    global stack size estimate (for this construct and the constructs within it)

Dynamic call tree node: Describes a particular procedure in the dynamic call tree, the call site in the calling procedure that called it, and the list of its call sites and called procedures. A pointer to each dynamic call tree node is saved in a hash table. A dynamic call tree node is stored as a structure that comprises the following fields:

pointer to parent dynamic call tree node (for calling procedure)
    pointer to next child dynamic call tree node (for next call site from current procedure to subsequent called procedures)
    source position (of current procedure)
    call site source position (in calling procedure)
    procedure name (of current procedure)
    variable-sized array of stack entries for the constructs in the current procedure Global variables: The following are additional global variables used in runtime library 120:

in parallel—boolean flag indicating whether execution is currently in a C$PAR PARALLEL region
    thread id—urrent, most recently allocated, thread id
    global thread id—thread id sequence number used to allocate new thread ids
    global fence—thread id of the most recent global synchronization point (e.g., C$PAR BARRIER, C$PAR END PDO)
    global context—current context (indexes a sync node)
    global select—set of mem_flags (see Table 3), used to keep track of the current state of the mem_beg_iter, mem_mid_iter, and mem_end_iter flags
    global locks—set of C$PAR CRITICAL SECTIONS and C$PAR ORDERED SECTIONS that are currently held
    global ordered seen—set of C$PAR ORDERED SECTIONs that have been seen in a C$PAR PDO thus far
    global ordered used—set of C$PAR ORDERED SECTIONs that have been used in a C$PAR PDO iteration thus far
    stack, top of stack—array of pointers to stack entries that describes the current set (and nesting) of active constructs In addition, a separate hash table is used to store the addresses of each one of each of the following types of nodes: shadow pages, dynamic call tree nodes, sync nodes, osec nodes, COMMON nodes, and heap nodes.

Initialization procedure: FIG. 12 is a flowchart of the algorithm performed when calls inserted by step 220 are executed during step 135. An argument for this algorithm is the name of program database 105. Step 1200 reads the state of pertinent user settings from the environment. In particular, the state of the KDD_MALLOC variable is determined for use in processing MALLOC opcodes. Step 1205 sets the name of the simulator output file; a filename analogous to that of program database 105 is used. Step 1210 initializes global data structures before opcode processing begins.

V. Runtime Library: B. Identification of Semantic Inconsistencies

Semantic inconsistencies are identified by runtime library 120 by examining and manipulating the previously-described global data structures. This fimctional description is expressed in terms of these data structures and the simulator internal opcodes listed in Table 4. The subsequent discussion of structure and operation will describe the implementations of these checks in more detail. Several of the semantic inconsistencies have_sync variants; filterable semantic inconsistencies are identified when the references involved are consistently synchronized, e.g., within C$PAR CRITICAL SECTIONs or C$PAR ORDERED SECTIONS with the same name.

Data and I/O Dependence anti, anti_sync—Identified on a WRITE operation: in a C$PAR PDO, an anti dependence exists if the read shadow is not equal to the current timestamp and is less than the global fence; in a C$PAR PARALLEL region (not in a C$PAR PDO or C$PAR SINGLE PROCESS), if the read shadow is equal to the current timestamp. In the latter case, a (reverse) flow semantic inconsistency is also identified.
    flow, flow_sync—Identified on a READ operation: in a C$PAR PDO, a flow dependence exists if the write shadow is not equal to the current timestamp and is less than the global fence; in a C$PAR PARALLEL region, if the write shadow is equal to the current timestanp. In the latter case, a (reverse) anti semantic inconsistency is also identified.
    outp, outp_sync—Identified on a WRITE operation: in a C$PAR PDO, an output dependence exists if the write shadow is not equal to the current timestamp and is less than the global fence; in a C$PAR PARALLEL region, if the write shadow is equal to the current timestamp.
    summ, summ_sync—Identified on a S_READn or S_WRITEn operation in a summarized loop where the mem_summary flag is set in the shadow. A summarized loop may effectively change the order of reads and writes. In these cases, flow and anti semantic inconsistencies cannot reliably be distinguished so they are both identified as summ semantic inconsistencies. For a S_READn operation in a C$PAR PDO, a dependence exists if the write shadow is not equal to the current timestamp and is less than the global fence; for a S_WRITEn operation in a C$PAR PDO, if the read shadow is not equal to the current timestamp and is less than the global fence; for a S_READn operation in a C$PAR PARALLEL region, if the write shadow is equal to the current timestamp; for a S_WRITEn operation in a C$PAR PARALLEL region, if the read shadow is equal to the current timestamp.

io, io_sync—Identified on an IO operation: in a C$PAR PDO, a semantic inconsistency exists if the (write) shadow is not equal to the current timestamp and is less than the global fence; in a C$PAR PARALLEL region, if the (write) shadow is equal to the current timestamp. The write shadow keeps track of the last read or write to a given I/O unit (or stream, file descriptor, etc.). The preferred embodiment assumes a non-reentrant I/O library implementation (which is typically found in current practice), and so treats accesses to all I/O units as equivalent.

Last Local last—Identified on a READ operation after a C$PAR PARALLEL region for a LOCAL (not LAST_LOCAL) variable that was written in the last iteration of a C$PAR PDO (the mem_end_iter flag is set in the shadow).

par_def—Identified on a READ operation after a C$PAR PARALLEL region for a LOCAL variable that was written inside of a C$PAR PARALLEL region (not in a C$PAR PDO).

not_last—Identified on a READ operation after a C$PAR PARALLEL region for a LOCAL (not LAST_LOCAL) variable that was written other than in the last iteration of a C$PAR PDO (the mem_end_iter flag is not set in the shadow).

was_last—Identified on a READ operation after a C$PAR PARALLEL region for a LAST_LOCAL variable that was written other than in the last iteration of a C$PAR PDO (the mem_end_iter flag is not set in the shadow).

share_last—Identified on a LAST_LOCAL operation for a LOCAL variable.

First Local first—Identified on a READ operation inside of a C$PAR PDO for which the corresponding shadow variable does not exist or has the mem_undef flag set.

par_undef—Identified on a READ operation inside of a C$PAR PARALLEL region (not in a C$PAR PDO) for which the corresponding shadow variable does not exist or has the mem_undef flag set.

not_local—Same as a flow dependence except that the mem_local flag is set in the shadow.

share_first—Identified on a FIRST_LOCAL operation for a LOCAL variable.

Local Communication partial_loc—Identified on a READ operation for a LOCAL variable that was written inside of a worksharing construct and then read outside (the same iteration of) that construct.

partial_cmn—Same as partial_loc except for a private COMMON variable.

Construct Nesting osec_many—Identified on an OENTRY operation if the C$PAR ORDERED SECTION being entered has already been entered in the current C$PAR PDO iteration.

osec_skip—Identified on an IEXIT operation if the set of ordered sections used in the C$PAR PDO iteration just being exited is not equal to the set of ordered sections seen in previous loop iterations.

nested_ws—Identified on an LENTRY or SENTRY operation if a previous LENTRY or SENTRY operation indicates that a C$PAR PDO or C$PAR SINGLE PROCESS is already active.

ws_barrier—Identified on a BARRIER operation if a previous LENTRY or SENTRY operation indicates that a C$PAR PDO or C$PAR SINGLE PROCESS is already active.

sync_ws—Identified on an LENTRY, SENTRY, or BARRIER operation if a previous CENTRY or OENTRY operation indicates that a C$PAR CRITICAL SECTION or C$PAR ORDERED SECTION is already active.

VI. Runtime Library: C. Main Simulator Entry Point, Opcode Processing

Main simulator entry point: FIG. 13 is a flowchart of the algorithm performed when calls inserted by steps 335, 490, 520, 530, and 815 are executed during step 135. The argument for this algorithm is a buffer of words containing simulator input opcodes and their associated arguments (see Table 1 and Table 2) produced by the execution of instructions, added by translation means 110, during sequential execution 135. Step 1300 determines if there are words left in the buffer to decode and process. If not, the algorithm terminates; otherwise, step 1305 retrieves the next opcode word from the buffer. Step 1310 decodes this opcode word and determines the opcode and the argument encoding form. Step 1315 retrieves zero or more additional argument words and decodes arguments based on the opcode and form determined in step 1310, according to Table 2, and step 1320 processes the opcode and arguments to check for semantic inconsistencies.

Read and write opcodes: FIG. 14 is a flowchart of the algorithm performed by step 1320 when step 1310 decodes a READ, WRITE, PDO_WRITE, READn, WRITEn, S_READn, or S_WRITEn opcode. Each opcode describes a reference vector of one or more elements being read or written. The arguments for these opcodes are given in Table 2; bytes is the size of an element, sym denotes the symbol (i.e., variable in input program 100) name being accessed, size is the number of elements being accessed, adr is the address of the first element, and stride is the distance between elements. Step 1400 sets the current source position symbol from sym. Step 1405 determines if there are any elements left to process. If not, the algorithm terminates; otherwise, step 1410 translates the next portion of the reference vector into shadow variable space and checks for some types of semantic inconsistencies. Step 1415 decrements size and advances adr to account for the portion of the reference vector translated in step 1410. For this translated portion of the reference vector, step 1420 determines if any data dependences arise, and step 1425 updates the corresponding shadow variables, for these references.

I/O opcodes: FIG. 15 is a flowchart of the algorithm performed by step 1320 when step 1310 decodes an IO or POISON_IO opcode. Step 1500 determines if the opcode denotes poison I/O. If so, steps 1505–1535 set poison I/O flags for constructs on the stack; otherwise, the algorithm continues at step 1540. Step 1505 sets a pointer to the top of the stack. Step 1510 determines if there are any entries left on the stack to consider; if not, the algorithm continues at step 1540. Step 1515 determines if execution is currently in a C$PAR PARALLEL region. If so, step 1520 sets the parallel poison I/O flag in the current stack entry; otherwise, step 1525 sets the sequential poison I/O flag in the current stack entry. Step 1530 determines if the current stack entry is for a C$PAR PARALLEL region; if so, the algorithm continues at step 1540. Step 1535 advances the pointer to the next stack entry and returns to step 1510. Step 1540 determines if execution is currently in a C$PAR PARALLEL region; if not, the algorithm terminates. Step 1545 fetches the appropriate I/O shadow variables, and step 1550 determines if any data dependences arise.

Storage allocation opcodes: FIG. 16 is a flowchart of the algorithm performed by step 1320 when step 1310 decodes a MALLOC opcode. The arguments for this opcode are given in Table 2; adr and size describe the base address and size of the area being allocated. Step 1600 creates a heap node, if it does not already exist, for adr and size. Step 1605 removes mem__undef flags from the shadow variable space entries corresponding to adr and stride. Steps 1610–1625 determine if private or shared storage is being allocated. Step 1610 determines if execution is currently in a C$PAR PARALLEL region; if not, shared storage is being allocated. Step 1615 determines if the most recently entered parallel construct is C$PAR SINGLE PROCESS; if so, shared storage is being allocated. Step 1620 determines if the most recently entered parallel construct is C$PAR PDO; if so, shared storage is being allocated. Step 1625 determines if private or shared storage for memory allocated within a C$PAR PARALLEL region, but outside of a worksharing construct, is being allocated. If the KDD_MALLOC variable, whose state was determined in step 1200, is set, shared storage is allocated. Steps 1630 and 1635 translate the allocated area for adr and size into shadow variable space and check for semantic inconsistencies; step 1630 is used when private storage is being allocated and step 1635 is used when shared storage is being allocated.

FIG. 17 is a flowchart of the algorithm performed by step 1320 when step 1310 decodes an AUTO, LOCAL, FIRST_LOCAL, or LAST_LOCAL opcode. The arguments for these opcodes are given in Table 2 and are similar to those for READ opcodes, as discussed in the description of FIG. 14. Steps 1700 and 1705 determine if an AUTO opcode is being processed when not executing in a C$PAR PARALLEL region; if so, step 1710 is executed, otherwise step 1715 is executed. Steps 1710 and 1715 translate the declared area for adr and size into shadow variable space and check for semantic inconsistencies; step 1710 is used for AUTO opcodes when not executing in a C$PAR PARALLEL region and step 1715 is used otherwise. In both cases, step 1720 creates a memory node for sym, adr, and size, and adds this node to the head of the memory linked list for the parallel construct on the top of the stack.

Private COMMON opcodes: FIG. 18 is a flowchart of the algorithm performed by step 1320 when step 1310 decodes an IP_NEW, TC_NEW, IP_COPYNEW, or TC_COPYNEW opcode. The arguments for these opcodes are given in Table 2 and are similar to those for READ opcodes, as discussed in the description of FIG. 14. Step 1800 sets the current source position symbol from sym. Step 1805 initializes a reset flag to TRUE for IP_COPYNEW and TC_COPYNEW opcodes or FALSE for IP_NEW and TC_NEW opcodes. Step 1810 determines if a common node already exists for adr; if not, step 1815 creates a common node for sym, adr, size, and opcode type (i.e., IP_ vs. TC_ opcode), sets the reset flag initialized in step 1805, and clears the new flag in the common node.

Step 1820 determines if execution is currently in a C$PAR PARALLEL region; if not, the algorithm terminates. Step 1825 determines if the new flag in the common node for adr is set; if so, the algorithm terminates. Step 1830 sets the new flag in the common node for adr. Step 1835 checks the state of the reset flag set in steps 1805 and 1815. Steps 1840 and 1845 translate the declared area into shadow variable space and check for semantic inconsistencies; step 1840 is used when the reset flag is set and step 1845 is used otherwise. In both cases, step 1850 creates a memory node for sym, adr, and size, locates the topmost entry on the stack for a C$PAR PARALLEL region, and adds the memory and common nodes to the memory and common linked lists for this stack entry.

Procedure entry opcode: FIG. 19 is a flowchart of the algorithm performed by step 1320 when step 1310 decodes an ENTRY opcode. The arguments for this opcode are given in Table 2; num_blocks is the number of parallel constructs in the called procedure, scope denotes the scope of the called procedure, sym denotes the called procedure name, and line is the source line number of the beginning of the called procedure. Step 1900 adds the called procedure as a new leaf in the dynamic call tree. Step 1905 allocates a stack entry for the called procedure and pushes it onto the stack. Step 1910 sets the current source position procedure and line from scope and line. Step 1915 creates a dependence node, if it does not already exist, for the stack entry created in step 1905. Step 1920 adds the appropriate stack padding to the local stack size estimate for the stack entry created in step 1905.

Procedure and region exit opcodes: FIG. 20 is a flowchart of the algorithm performed by step 1320 when step 1310 decodes an EXIT or REXIT opcode or when invoked from steps 3210 or 3220. Step 2000 updates the global stack size estimates on the stack based on the construct being exited, and step 2005 pops the stack entry for this construct off of the stack. Step 2010 frees the storage for the construct's memory list, and step 2015 frees the storage for the corresponding COMMON list. Step 2020 determines which opcode is being processed. For EXIT, step 2025 removes the called procedure leaf node, added in step 1900, from the dynamic call tree; steps 2030–2045 are used for REXIT. Step 2030 clears a flag to indicate that execution is no longer in a C$PAR PARALLEL region. Step 2035 frees the storage for the global sync data structure. Step 2040 allocates a new thread id, and step 2045 sets the global fence from this thread id.

FIG. 21 is a flowchart of the algorithm performed by step 2000 to update the global stack size estimates for a stack entry and those of enclosing constructs and procedures. Step 2100 accesses the stack entry for the construct being exited. Steps 2105 and 2110 set the stack entry's global stack size estimate to the maximum of the global and local estimates. Step 2115 accesses the stack entry for the nearest enclosing C$PAR PARALLEL region or procedure. Step 2120 adds the estimate produced in steps 2105 and 2110 to this enclosing stack entry's local estimate, and steps 2125 and 2130 set this entry's global estimate to the maximum of the global estimate or the estimate produced in step 2120.

Region entry opcode: FIG. 22 is a flowchart of the algorithm performed by step 1320 when step 1310 decodes an RENTRY opcode. The arguments for this opcode are given in Table 2; loc is the construct number and line is the source line number of the beginning of the parallel construct. Step 2200 sets a flag to indicate that execution will now be in a C$PAR PARALLEL region. Step 2205 allocates a stack entry for the C$PAR PARALLEL region and pushes it onto the stack. Step 2210 creates a sync node, if it does not already exist, for the current set of global locks. Step 2215 saves the current global context in the stack entry created in step 2205 and then sets the new global context from the sync node. Step 2220 sets the source position line and context from line and the global context. Step 2225 allocates a new thread id and performs other stack entry initializations required for region entry. Step 2230 adds the appropriate stack padding to the local stack size estimate for the stack entry, and step 2235 sets the region thread id and global fence from the thread id allocated in step 2225.

Worksharing construct opcodes: FIG. 23 is a flowchart of the algorithm performed by step 1320 when step 1310 decodes an LENTRY or SENTRY opcode. The arguments for these opcodes are given in Table 2 and are similar to those for RENTRY opcodes, as discussed in the description of FIG. 22. Step 2300 sets the source position line from line. Step 2305 determines if execution is currently in a worksharing construct; if so, steps 2310 and 2315 record a semantic inconsistency for nested worksharing constructs. Step 2320 determines if execution is currently in a synchronization construct; if so, steps 2325 and 2330 record a semantic inconsistency for worksharing nested inside of synchronization constructs. Execution proceeds at step 2335 for the beginning of a legal worksharing construct; a C$PAR PDO or C$PAR SINGLE PROCESS stack entry is allocated and pushed onto the stack. Step 2340 allocates a new thread id and performs other stack entry initializations required for construct entry. Step 2345 determines if a C$PAR PDO or C$PAR SINGLE PROCESS is being entered. For C$PAR PDO, step 2350 initializes the set of ordered sections seen in the loop to empty, step 2355 sets the global select flags to mem__beg__iter, and step 2360 saves the thread id in the stack entry created in step 2335. For C$PAR SINGLE PROCESS, step 2365 creates a sync node, if it does not already exist, for the current set of global locks, step 2370 saves the current global context in the stack entry created in step 2335 and then sets the new global context from the sync node, and step 2375 sets the source position context from the global context.

FIG. 24 is a flowchart of the algorithm performed by step 1320 when step 1310 decodes an IENTRY or LAST__IENTRY opcode. The arguments for these opcodes are given in Table 2 and are similar to those for RENTRY opcodes, as discussed in the description of FIG. 22. Step 2400 determines, from the stack entry on the top of the stack, if execution is currently in a sequential loop. If so, step 2405 changes the stack entry type to a sequential iteration; otherwise, execution continues at step 2410, which changes the stack entry type to a parallel iteration. Steps 2415 and 2420 set the global select flags to mem__end__iter when entering the last loop iteration. Step 2425 sets the stack entry source position from the current source position. Step 2430 determines if any loop iterations have yet been executed; if not, step 2435 allocates a new thread id, and step 2440 sets the stack entry current thread id from this new thread id. In either case, step 2445 initializes the set of ordered sections used in the upcoming loop iteration to empty.

FIG. 25 is a flowchart of the algorithm performed by step 1320 when step 1310 decodes an IEXIT opcode or when invoked from step 3240. Step 2500 determines, from the stack entry on the top of the stack, if execution is currently in a sequential loop iteration. If so, step 2505 changes the stack entry type, which was changed in step 2405, back to a sequential loop; otherwise, execution continues at step 2510, which changes the stack entry type, which was changed in step 2410, back to a parallel loop. Step 2515 restores the thread id to the value saved in step 2360, and step 2520 sets the global select flags to mem__mid__iter. Step 2525 checks for the possibility of C$PAR ORDERED SECTION semantic inconsistencies; this is possible if the set of sections seen in the loop thus far is not equal to the set of sections used in the current iteration. Step 2530 records a semantic inconsistency for each C$PAR ORDERED SECTION that was not executed in all loop iterations.

Synchronization opcodes: FIG. 26 is a flowchart of the algorithm performed by step 1320 when step 1310 decodes a CENTRY, OENTRY, EXT__LOCK, or EXT__UNLOCK opcode. The arguments for these opcodes are given in Table 2; loc is the construct number and line is the source line number of the beginning of the construct, and sym or arg denote the name of the lock (construct). Step 2600 allocates a stack entry for the construct. The stack entry is pushed onto the stack for CENTRY and OENTRY only; EXT__LOCK and EXT__UNLOCK opcodes do not use the stack. Step 2605 creates a dependence node, if it does not already exist, for the stack entry created in step 2600. Step 2610 creates a sync node, if it does not already exist, for the current set of global locks. Step 2615 adds the lock to the set of global locks. Step 2620 sets the global context from the sync node, and then sets the source position line and context from line and the global context. Step 2625 determines if the opcode is EXT__LOCK or EXT__UNLOCK; if so, the algorithm terminates. Step 2630 saves the previous global context, from before step 2620, in the stack entry created in step 2600 and sets the stack entry source position from the current source position.

Step 2635 allows the algorithm to proceed only for C$PAR ORDERED SECTION entry. Step 2640 creates an osec node, if it does not already exist, for the current set of global locks, and then sets the osec node source position from the current source position. Step 2645 determines if the lock is in the set of ordered sections used in the current loop iteration; if so, step 2650 records a semantic inconsistency for executing a C$PAR ORDERED SECTION more than once in a loop iteration. Step 2655 determine if the block is in the set of ordered sections seen in any loop iteration; if so, and step 2660 determines that execution is in the first iteration of the loop, step 2665 records a semantic inconsistency for not executing a C$PAR ORDERED SECTION in all loop iterations. Step 2670 adds the lock to the set of ordered sections seen in any loop iteration and the set of ordered sections used in the current loop iteration.

Other construct exit opcodes: FIG. 27 is a flowchart of the algorithm performed by step 1320 when step 1310 decodes an LEXIT, SEXIT, CEXIT, or OEXIT opcode or when invoked from steps 3230, 3250, 3260, or 3270. The arguments for these opcodes are given in Table 2 and are similar to those for the corresponding entry opcodes as discussed in the descriptions of FIG. 23 and FIG. 26. Step 2700 pops the stack entry for the construct being exited off of the stack. Step 2705 determines if execution is currently in a sequential loop or a serialized C$PAR SINGLE PROCESS; if so, the algorithm terminates. For LEXIT, steps 2710 and 2715 free the storage for the construct's memory list. For CEXIT and OEXIT, steps 2720 and 2725 remove the lock from the set of global locks. For opcodes other than LEXIT, step 2730 restores the global context from the global context saved in the stack entry by steps 2370 and 2630, and step 2735 restores the source position context from the restored global context.

Construct entry/exit sub-procedures: FIG. 28 is a flowchart of the algorithm performed by steps 2010 and 2715 to free the storage for items on the memory list of a stack entry. Step 2800 determines if there are any more memory list items to free; if not, the algorithm terminates. Step 2805 determines if the next item at the head of the memory list is associated with a LOCAL, FIRST__LOCAL, or LAST__

LOCAL opcode. If so, step 2810 removes the list item's type flags from the shadows for the list item's address and size; otherwise, step 2815 removes the mem_undef flags from the shadows for the list item's address and size. In either case, step 2820 unlinks and frees the list item at the head of the memory list.

FIG. 29 is a flowchart of the algorithm performed by step 2015 to free the storage for items on the COMMON list of a stack entry. Step 2900 determines if there are any more COMMON list items to free; if not, the algorithm terminates. Step 2905 clears the new flag in the item at the head of the COMMON list, and step 2910 unlinks and frees the item.

FIG. 30 is a flowchart of the algorithm performed by steps 2225 and 2340 to allocate a new thread id and perform other stack entry initializations during construct entry. Step 3000 sets the stack entry source position from the current source position. Step 3005 allocates a new thread id, and step 3010 sets the stack entry current thread id and start thread id from this new thread id. Step 3015 creates a dependence node, if it does not already exist, for the stack entry.

Barrier opcodes: FIG. 31 is a flowchart of the algorithm performed by step 1320 when step 1310 decodes a BARRIER or EXT_BARRIER opcode. The arguments for these opcodes are given in Table 2; for BARRIER, arg denotes the source line number of the C$PAR BARRIER construct, and for EXT_BARRIER, arg denotes the name of the barrier. Step 3100 determines if the opcode is EXT_BARRIER; if so, execution continues at step 3130. For BARRIER, step 3105 sets the source position line from arg. Step 3110 determines if execution is currently in a worksharing construct; if so, step 3115 records a semantic inconsistency for executing a barrier nested inside of a worksharing construct. Step 3120 determines if execution is currently in a synchronization construct; if so, step 3125 records a semantic inconsistency for executing a barrier inside of a synchronization construct. Step 3130 allocates a new thread id, and step 3135 sets the stack entry current thread id and the global fence from this new thread id.

Other opcodes: FIG. 32 is a flowchart of the algorithm performed by step 1320 when step 1310 decodes a STOP opcode. The algorithm repeatedly executes the algorithms for the exit opcodes corresponding to constructs on the stack until the stack is empty. For each stack entry, actions are performed as if step 1320 was executed after step 1310 decoded the corresponding opcode. Each exit opcode algorithm causes a construct to be popped off of the stack. Step 3200 determines if there are any stack entries remaining to process; if so, execution continues at step 3205. Steps 3205 and 3210 use the EXIT opcode algorithm for stack entries for procedures. Steps 3215 and 3220 use the REXIT opcode algorithm for stack entries for C$PAR PARALLEL regions. Steps 3225 and 3230 use the LEXIT opcode algorithm for stack entries for C$PAR PDO or sequential loops. Steps 3235 and 3240 use the IEXIT opcode algorithm for stack entries for parallel or sequential loop iterations. Steps 3245 and 3250 use the CEXIT opcode algorithm for stack entries for C$PAR CRITICAL SECTIONs. Steps 3255 and 3260 use the OEXIT opcode algorithm for stack entries for C$PAR ORDERED SECTIONs. Steps 3265 and 3270 use the SEXIT opcode algorithm for stack entries for parallel or serialized C$PAR SINGLE PROCESS. When the stack is empty, step 3275 terminates the simulator and generates simulator output 140.

FIG. 33 is a flowchart of the algorithm performed by step 1320 when step 1310 decodes an INIT, LINE, STACKSIZE, FREE, CALL, or NOP opcode. The arguments for these opcodes are given in Table 2. The arguments for INIT are similar to those for READ opcodes, as discussed in the description of FIG. 14. For LINE, arg is a source line number. For STACKSIZE, size is a stack size estimate for the current procedure. The adr argument for FREE is similar to the same argument for MALLOC opcodes, as discussed in the description of FIG. 16. For NOP, arg specifies the number of buffer words to consume and ignore before decoding and processing the next opcode.

For INIT (step 3300), step 3305 sets the source position symbol from sym, and step 3310 translates the initialized area for adr and size into shadow variable space and checks for semantic inconsistencies. For LINE (step 3315), step 3320 sets the source position line from arg. For STACKSIZE (step 3325), step 3330 locates the topmost entry on the stack for a C$PAR PARALLEL region or procedure, and step 3335 sets that stack entry's local stack size estimate from size (plus the appropriate stack padding). For FREE (step 3340), step 3345 frees the storage for the heap node created in step 1600, and step 3350 removes the mem_undef flags from the shadows for adr and the size specified in the heap node. For CALL (step 3355), step 3360 sets the global call position from the current source position. For NOP (step 3365), the number of buffer words specified by arg are consumed before completing step 1320 and proceeding to step 1300.

VII. Runtime Library: D. Low-Level Opcode Processing

Translate buffer to shadows: FIG. 34 is a flowchart of the algorithm performed by steps 1630, 1635, 1710, 1715, 1840, 1845, and 3310 to translate a buffer of memory into shadow space and check for semantic inconsistencies. The arguments for this algorithm are:

mode—depends on the particular calling step sym—enotes the symbol name being accessed size—the number of buffer elements adr—the address of the first buffer element type1, type2—flags passed on to subsequent procedures The arguments used for each particular calling step and simulator input opcode (see Table 1) are given in Table 5; sym, size, and adr are from the arguments listed in Table 2 for the specified opcodes, except that sym unused for MALLOC opcodes. Step 1710 uses type2=mem_undef, whereas step 1715 uses type2=type1. Step 1840 uses mode=MARK, whereas step 1845 uses mode=COMMON.

TABLE 5

Input Arguments for Algorithm of FIG. 34

| step | opcode | mode | type1 | type2 |
|---|---|---|---|---|
| 1630 | MALLOC | MARK | t | type1 |
| 1635 | MALLOC | MARK | h | type1 |
| 1710, | AUTO | MARK | a | u, |
|  | LOCAL | MARK | l |  |
| 1715 | FIRST_LOCAL | FLOCAL | fl | type1 |
|  | LAST_LOCAL | LLOCAL | ll |  |
| 1840, | IP_NEW | MARK, | pn | type1 \| cp |
|  | TC_NEW |  | tn | type1 \| u |
| 1845 | IP_COPYNEW | COMMON | pc | type1 \| d |
|  | TC_COPYNEW |  | tc | type1 \| d |
| 3310 | INIT | DEFINE | d |  |

Notes:
1 type1 and type2 flags are mem_flags from Table 3.

The algorithm attempts to translate the buffer specified by adr and size into shadow space while using as few shadow variables, with the largest shadow access sizes, as possible. Steps 3400 and 3405 are used, except for FIRST_LOCAL and LAST_LOCAL opcodes, to translate the leading, misaligned area of the buffer so that the major area of the buffer can be translated with fewer, larger shadow variables. Step 3410 translates this major area, and steps 3415 and 3420 translate any area that might remain after the major area with smaller shadows.

FIG. 35 is a flowchart of the algorithm performed by step 3405 to translate the leading, misaligned buffer area. Step 3500 initializes the shadow access size. Steps 3505 and 3510 determine if there is any leading area left to process; if not, the algorithm terminates. Step 3515 determines if a shadow of the current access size is required to align the leading buffer area; if so, step 3520 translates a single buffer element with the current shadow access size, step 3525 updates the shadow variable, and step 3530 decrements the buffer size and advances the address to the next buffer element. Step 3535 doubles the shadow access size and repeats the process.

FIG. 36 is a flowchart of the algorithm performed by step 3410 to translate the major area of the buffer. Step 3600 initializes the shadow access size to its maximum value (in the preferred embodiment, eight bytes). Step 3605 determines if the buffer area has yet been translated at some shadow access size; if so, the algorithm terminates. Step 3610 determines if the current shadow access size can be used; if so, step 3615 selects a (wide) size to use for actual buffer translation and decreases the buffer size accordingly. Step 3620 determines if there is major buffer area remaining to be translated; if so, step 3625 translates a vector of buffer elements with the specified (wide) size and shadow access size, and step 3630 decrements the (wide) size and advances the address to the next portion of the buffer. Steps 3635 and 3640 check for semantic inconsistencies for FIRST_LOCAL and LAST_LOCAL opcodes. Step 3645 updates the shadow variables for the translated portion of the buffer, and step 3650 decreases the shadow access size by half and repeats until the major area of the buffer is translated with the appropriate shadow access size.

FIG. 37 is a flowchart of the algorithm performed by step 3420 to translate any remaining buffer area. Step 3700 determines if there is any buffer area remaining to translate; if not, the algorithm terminates. Step 3705 translates a vector of buffer elements with the specified size and a shadow access size of one byte. Step 3710 decrements the buffer size and advances the buffer address. Steps 3715 and 3720 check for semantic inconsistencies for FIRST_LOCAL and LAST_LOCAL opcodes. Step 3725 updates the shadow variables for the translated portion of the buffer.

FIG. 38 is a flowchart of the algorithm performed by steps 3640 and 3720 to check for semantic inconsistencies for FIRST_LOCAL and LAST_LOCAL opcodes. Step 3800 sets a pointer to the first shadow variable for the translated vector from step 3625 or 3705. Step 3805 determines if there are any shadow variables left to check; if not, the algorithm terminates. Step 3810 checks if any of the private flags are set in the current shadow; if so, steps 3815, 3820, and 3825 are used to record a share_first or share_last semantic inconsistency (for FIRST_LOCAL or LAST_LOCAL opcodes, respectively). Step 3830 advances the pointer to the next shadow variable and repeats the process.

Translate vector to shadows: FIG. 39 is a flowchart of the algorithm performed by steps 1410, 3520, 3625, and 3705 to translate a vector from memory into shadow space and check for semantic inconsistencies. The arguments for this algorithm are:

sym—denotes the symbol name being accessed
size—the number of vector elements
adr—the base address of the vector
num_bytes—the vector element size in bytes
stride—the distance between element accesses in bytes
type—flags denoting the access type for the vector The arguments used for each particular calling step and simulator input opcode (see Table 1) are given in Table 6; sym and adr are from the arguments listed in Table 2 for the specified opcodes.

Step 3900 initializes a count of the number of shadow variables produced during translation to zero. Step 3905 determines if a portion of the vector remains to be translated; if so, step 3910 initializes a temporary address pointer and byte count from the current adr and num_bytes. Step 3915 determines if there are any bytes in the current element access left to translate; if so, step 3920 creates a shadow page, if it does not already exist, for the current address. Step 3925 determines if the shadow page needs to be split because its shadow access size is too large for the current element size; if so, step 3930 splits the shadow page by dividing and replicating each shadow in the page so that the resulting shadows each have a shadow access size equal to the element size. Step 3935 creates a context in the shadow page, if it does not already exist, for the global context. Step 3940 checks for semantic inconsistencies, advances the temporary address pointer and decrements the temporary byte count, and increments the shadow variable count. Step 3945 decrements the vector size and advances the base address by the element stride and repeats the process.

TABLE 6

Input Arguments for Algorithm of FIG. 39

| step | opcode | size | num_bytes | stride | type |
|------|--------|------|-----------|--------|------|
| 1410 | READ | size | bytes | stride | r |
|      | WRITE |     |           |        | w |
|      | PDO_WRITE |  |           |        | w |
|      | READn |     |           |        | r |
|      | WRITEn |    |           |        | w |
|      | S_READn |   |           |        | r \| s |
|      | S_WRITEn |  |           |        | w \| s |
| 3520 |        | 1 | width | width | type1 |
| 3625 |        | wide_size | width | width | type1 |
| 3705 |        | size | 1 | 1 | type1 |

Notes:
1 type flags are mem_flags from Table 3.

FIG. 40 is a flowchart of the algorithm performed by step 3940 to check for semantic inconsistencies during vector translation. Step 4000 initializes an index to the start of the current shadow page. Step 4005 determines if there are any shadows left to process in the shadow page; if not, the algorithm terminates. Step 4010 determines if any of the private flags are set in the current shadow. If not, step 4015 increments the shadow variable count by the number of contexts that exist for the current shadow; otherwise, step 4020 checks to see if the input type flags indicate a write or definition operation. If so, step 4025 performs the appropriate shadow checks; otherwise, step 4030 checks to see if the input type flags indicate a summary operation or procedure-local variable declaration. If not, steps 4035–4050 are used to record a share_first or share_last semantic inconsistency (for FIRST_LOCAL and LAST_LOCAL opcodes, respectively); in either case, step 4055 performs the appropriate shadow checks for non-write/definition operations. Step 4060 increments the temporary address pointer, decrements the temporary byte count by the shadow page access size, and advances the index to the next shadow in the shadow page.

Fetch I/O shadows: FIG. 41 is a flowchart of the algorithm performed by step 1545 to translate an I/O operation into shadow space and check for semantic inconsistencies. This algorithm is similar to that for translating a memory reference into shadow space except:

the shadow space used here represents the I/O unit (or stream, file descriptor, etc.) that is accessed, rather than the memory locations accessed; and the preferred embodiment assumes a non-reentrant I/O library implementation (which is typically found in current practice), so the preferred embodiment treats accesses to all I/O units as equivalent.

Step 4100 creates a shadow page, if it does not already exist, for the I/O unit being accessed. According to the assumptions above, the preferred embodiment uses the same shadow storage for all I/O units. Step 4105 creates a shadow context, if it does not already exist, for the global context. Step 4110 sets a count of the number of shadow variables produced during translation to the number of contexts in the shadow page, and step 4115 returns this count for use after step 1545.

Remove flags from shadows: FIG. 42 is a flowchart of the algorithm performed by steps 1605, 2810, 2815, and 3350 to remove the specified flags from the shadows for a buffer with the specified address and number of bytes. Step 4200 determines if any portion of the buffer remains to be processed; if not, the algorithm terminates. Step 4205 determines if a shadow page for the current address exists. If so, step 4210 determines if the shadow page needs to be split because its shadow access size is too large for the current number of bytes; if so, step 4215 splits the shadow page by dividing and replicating each shadow in the page so that the resulting shadows each have a shadow access size equal to the current number of bytes (see also steps 3925 and 3930). Step 4220 initializes an index to the start of the shadow page. Step 4225 determines if there are any shadows left to process in the shadow page. If so, and the flag to be removed is mem_undef (step 4230), step 4235 adds the mem_undef flag to the current shadow for all its contexts; otherwise, step 4240 removes the specified flags from the current shadow for all its contexts. Step 4245 advances the index to the next shadow in the shadow page. Step 4250 examines the processed shadow page and frees the storage for each context that has the mem_undef flag set for each shadow in that context. Step 4255 decrements the number of bytes and advances the current address by the number of entries in the shadow page.

Shadow checks: FIG. 43 is a flowchart of the algorithm performed by step 4025 to check a shadow variable for semantic inconsistencies for operations that write or define memory. Step 4300 attempts to locate a context for the shadow and the global context. Step 4305 determines if the shadow has this context defined; if so, step 4310 determines if execution is currently in a worksharing construct. If so, step 4315 sets the mem_def_part flag in the shadow; otherwise, step 4320 clears this flag. Step 4325 determines if any of the private flags are set in the shadow; if so, step 4330 determines if execution is currently in a C$PAR PARALLEL region. If so, steps 4335–4345 set the mem_writelocal flag (and the mem_writelast flag if the mem_lastlocal flag is set in the shadow) in the shadow; otherwise, steps 4350–4360 clear these flags under the corresponding conditions. Step 4365 sets the write shadow from the current thread id and sets the shadow write source position from the current source position. Step 4370 clears the mem_beg_iter, mem_mid_iter, mem_end_iter, and mem_cmn_part flags, and then sets the global select and mem_defined flags, in the shadow. If execution is currently in a C$PAR PARALLEL region (step 4375), step 4380 clears the mem_def_part and mem_cmn_part flags in the shadow for all its contexts.

FIG. 44 is a flowchart of the algorithm performed by step 4055 to check a shadow variable for semantic inconsistencies for operations that do not write or define memory. Step 4400 initializes a pointer to the first context for the shadow. Step 4405 determines if there are any contexts left to examine; if not, the algorithm terminates. Step 4410 determines if any of the private flags are set in the shadow for the current context; if so, step 4415 determines if the mem_defined flag is set in the shadow. If so, step 4420 checks further for semantic inconsistencies; otherwise, step 4425 determines if the mem_firstlocal flag is set in the shadow. If not, step 4430 determines if execution is currently in a C$PAR PDO iteration; if so, a first semantic inconsistency is recorded; otherwise, a par_undef semantic inconsistency is recorded. Step 4445 determines if the current context is the global context; if so, step 4450 sets the read shadow from the current thread id. Step 4455 advances the context pointer to the next context for the shadow.

FIG. 45 is a flowchart of the algorithm performed by step 4420 to check further for semantic inconsistencies. Step 4500 determines if the mem_def_part flag is set in the shadow for the current context. If so, steps 4505–4520 are used to record a partial_loc or partial_cmn semantic inconsistency (for mem_def_part or mem_cmn_part flags set in the current shadow, respectively); otherwise, step 4525 determines if execution is currently in a C$PAR SINGLE PROCESS. If not, step 4530 checks further for semantic inconsistencies for C$PAR PDO. Steps 4535–4545 record a partial_loc semantic inconsistency if the mem_def_part flag is set in the current shadow and the write shadow is before the start of the current parallel construct, and steps 4550–4560 record a partial_cmn semantic inconsistency if the mem_cmn_part flag is set in the shadow and the write shadow is before the start of the current parallel construct.

FIG. 46 is a flowchart of the algorithm performed by step 4530 to check further for semantic inconsistencies for C$PAR PDO. Step 4600 locates the stack entry for the parallel construct for which a data dependence exists. Step 4605 determines if a dependence does exist; if not, the algorithm terminates. Step 4610 determines if the stack entry for the dependence is for a C$PAR PDO; if so, and step 4615 determines that the current write shadow equals the stack entry's current timestamp, the algorithm terminates. Step 4620 determines if the stack entry is for a C$PAR PARALLEL region; if not, the algorithm terminates. Step 4625 determines if the write shadow is greater than or equal to the stack entry's current timestamp; if not, the algorithm terminates. Step 4630 determines if any of the private flags are set in the shadow; if so, the algorithm terminates. A semantic inconsistency is known to exist at step 4635. Step 4635 is used to record a not_local semantic inconsistency if execution is currently in a C$PAR PDO iteration; otherwise, step 4645 records a par_undef semantic inconsistency.

Calculate all dependences: FIG. 47 is a flowchart of the algorithm performed by steps 1420 and 1550 to calculate all the data dependences for an opcode. The arguments for this algorithm are:

optype—the operation type (READ, WRITE, IO)

num—the number of shadow variables in the translated reference sym—denotes the symbol name being accessed type—flags denoting the access type The arguments used for each particular calling step and simulator input opcode (see Table 1) are given in Table 7. Step 1420 uses num from the value returned from step 1410 and sym from the arguments listed in Table 2 for the specified opcodes. Step 1550 uses num from the value returned from step 1545 and sym and type are unused.

TABLE 7

Input Arguments for Algorithm of FIG. 47

| step | opcode | optype | type |
|---|---|---|---|
| 1420 | READ | READ | d |
| | WRITE | WRITE | d |
| | PDO_WRITE | WRITE | d |
| | READn | READ | d |
| | WRITEn | WRITE | d |
| | S_READn | READ | s |
| | S_WRITEn | WRITE | s |
| 1550 | IO | IO | |
| | POISON_IO | IO | |

Notes:
1 type flags are mem_flags from Table 3.

Step 4700 determines if execution is currently in a C$PAR PARALLEL region; if not, and step 4705 determines that the operation is not a read, the algorithm terminates. Step 4710 initializes an index (i) to the first translated shadow variable. Step 4715 determines if any shadows remain to be processed; if not, the algorithm terminates. Step 4720 sets a pointer to the with shadow. Steps 4725–4735 calculate an anti dependence if the read shadow is greater than or equal to the global fence and the operation is a write. Step 4740 determines if the write shadow is greater than or equal to the global fence; if not, and execution is not currently in a C$PAR PARALLEL region, step 4750 checks for escaped references; otherwise, steps 4755–4780 check for I/O, flow, and output dependences for I/O, read, and write operations, respectively. Step 4785 checks for other semantic inconsistencies, and step 4790 increments the shadow index and repeats the process.

FIG. 48 is a flowchart of the algorithm performed by step 4785 to check for other semantic inconsistencies. Step 4800 determines if the current shadow's context is the same as the global context; if not, the algorithm terminates. For I/O operations (step 4805), step 4810 sets both the read and write shadows from the current thread id, and step 4815 sets the shadow read and write source positions from the current source position. Step 4820 determines if execution is currently in a C$PAR PARALLEL region (but not in a C$PAR PDO); if so, step 4825 records a filterable io semantic inconsistency. For write operations (step 4830), step 4835 determines if execution is currently in a C$PAR PARALLEL region (but, as in step 4820, not in a C$PAR PDO); if so, step 4840 updates the shadow and step 4845 records a filterable outp semantic inconsistency.

FIG. 49 is a flowchart of the algorithm performed by step 4750 to check for escaped references. This algorithm records semantic inconsistencies arising from improper accesses outside of C$PAR PARALLEL regions. Step 4900 determines if the mem_writelast flag is set in the shadow; if so, step 4905 determines if the mem_end_iter flag is set. If so, step 4910 clears the mem_writelocal, mem_writelast, and mem_end_iter flags in the shadow; otherwise, step 4915 determines if the mem_beg_iter or mem_mid_iter flags are set. If so, step 4920 records a was_last semantic inconsistency; otherwise, step 4925 records a par_def semantic inconsistency. Step 4930 determines if the mem_writelocal flag is set in the shadow. If not, the algorithm terminates; otherwise, step 4935 determines if the mem_end_iter flag is set. If so, step 4940 records a last semantic inconsistency; otherwise, step 4945 determines if the mem_beg_iter or mem_mid_iter flags are set. If so, step 4950 records a not_last semantic inconsistency; otherwise, step 4955 records a par_def semantic inconsistency.

Update shadows: FIG. 50 is a flowchart of the algorithm performed by steps 1425, 3525, 3645, 3725, and 4840 to update shadow flags after translation and semantic inconsistency checking. The arguments for this algorithm are:

optype—the operation type (READ, WRITE)

num—the number of shadow variables in the translated reference to update clear_flags—flags to clear in each shadow set_flags—flags to set in each shadow The arguments used for each particular calling step and simulator input opcode (see Table 1) or mode (from that calling step) are given in Table 8. Steps 1425, 3525, 3645, and 3725 use num from the values returned from steps 1410, 3520, 3625, and 3705, respectively; step 4840 updates a single shadow.

Step 5000 initializes an index (i) to the first shadow variable to update. Step 5005 determines if any shadows remain to be processed; if not, the algorithm terminates. Step 5010 sets a pointer to the with shadow, step 5015 clears the clear_flags in the shadow, and step 5020 sets the set_flags in the shadow. Step 5025 determines if a read operation is being performed; if so, step 5030 sets the read shadow from the current thread id and step 5035 updates the shadow read source position from the current source position; otherwise, step 5040 determines if the mem_defined flag appears in the set_flags. If so, step 5045 sets the write shadow from the current thread id and step 5050 updates the shadow write source position from the current source position. Step 5055 increments the shadow index and repeats the process.

Calculate dependence: FIG. 51 is a flowchart of the algorithm performed by steps 4735, 4760, 4770, and 4780 to calculate various types of data dependences. The arguments for this algorithm are:

dt—the semantic inconsistency type (simulator internal opcode from Table 3) for normal dependences dt_filt—the semantic inconsistency type (simulator internal opcode from Table 3) for filterable dependences sym—denotes the symbol name being accessed type—flags denoting the access type rw_shadow—the shadow to use to calculate the dependence (read or write shadow)

The arguments used for each particular calling step are given in Table 9; sym and type are from the calling steps (see the description of FIG. 47), except that sym and type are unused for step 4760.

TABLE 8

Input Arguments for Algorithm of FIG. 50

| step | opcode mode | optype | clear_flags | set_flags |
|---|---|---|---|---|
| 1425 | READ | READ | s | |
| | WRITE | WRITE | 1 \| 2 \| s | gs \| d |
| | PDO_WRITE | WRITE | 1 \| 2 \| s | gs \| d |
| | READn | READ | s | |
| | WRITEn | WRITE | 1 \| 2 \| s | gs \| d |
| | S_READn | READ | | s |
| | S_WRITEn | WRITE | 1 \| 2 | gs \| d \| s |
| 3525, | FLOCAL | WRITE | 1 \| 3 \| d | type2 |
| | LLOCAL | WRITE | 1 \| 3 \| d | type2 |
| 3645, | COMMON | WRITE | 1 \| 3 | type2 |
| | MARK | WRITE | 1 \| 3 \| d | type2 |

TABLE 8-continued

Input Arguments for Algorithm of FIG. 50

| step | opcode mode | optype | clear_flags | set_flags |
|---|---|---|---|---|
| 3725 | DEFINE | WRITE | 1 \| s | gs \| d |
| 4840 | | WRITE | 1 \| 2 \| s | gs \| d |

Notes:
1 clear_flags and set_flags are mem_flags from Table 3.
2 1 = b | m | e; 2 = wo | wa; 3 = wo | dp | cp; gs = global select (mem_ flags from Table 3).

TABLE 9

Input Arguments for Algorithm of FIG. 51

| step | dt | dt_filt | rw_shadow |
|---|---|---|---|
| 4735 | anti | anti_sync | read |
| 4760 | io | io_sync | write |
| 4770 | flow | flow_sync | write |
| 4780 | outp | outp_sync | write |

Step 5100 locates the stack entry for the parallel construct for which a data dependence exists. Step 5105 adds the shadow flags to the input type flags. Step 5110 determines if an I/O dependence is being calculated; if so, steps 5115–5125 record a filterable I/O semantic inconsistency if a dependence exists and execution is not currently in a C$PAR PARALLEL region. Step 5130 determines if the stack entry for the dependence is for a C$PAR PDO; if so, and step 5135 determines that the rw_shadow is equal to the stack entry's current timestamp, step 5140 records a filterable semantic inconsistency. Step 5145 determines if the stack entry is for a C$PAR PARALLEL region; if so, and step 5150 determines that the rw_shadow is greater than or equal to the stack entry's current timestamp, step 5155 records a filterable semantic inconsistency. In addition, if step 5160 determines that an anti dependence is being calculated, step 5165 records a filterable, reverse, flow semantic inconsistency.

FIG. 52 is a flowchart of the algorithm performed by steps 4600 and 5100 to locate the stack entry for the parallel construct for which a data dependence exists. Step 5200 determines if the algorithm is being invoked via step 4600. If so, the write shadow is used for rw_shadow in the remainder of the algorithm (step 5205); otherwise, the rw_shadow specified in Table 9 is used. Step 5210 sets a pointer to the top of the stack and initializes the returned stack pointer to nil. Step 5215 determines if there are any entries left on the stack to process; if not, the algorithm terminates with the current returned stack pointer. Step 5220 determines if execution is currently in a C$PAR PDO. If so, step 5225 determines if the current stack entry is for a C$PAR PARALLEL region or C$PAR PDO; otherwise, step 5230 determines if the current stack entry is for a C$PAR PDO. In these cases, step 5235 determines if the rw_shadow is greater than or equal to the stack entry's start timestamp; if so, step 5240 sets the returned stack pointer to the current stack entry. Step 5245 determines if the rw_shadow is less than or equal to the stack entry's current timestamp; if so, the algorithm terminates with the returned stack pointer set in step 5240. Step 5250 advances the stack pointer to the next item on the stack and repeats the process.

Record semantic inconsistency: FIG. 53 is a flowchart of the algorithm performed by steps 2310, 2315, 2325, 2330, 2530, 2650, 2665, 3115, 3125, 3820, 3825, 4040, 4050, 4435, 4440, 4510, 4520, 4545, 4560, 4640, 4645, 4825, 4845, 4920, 4925, 4940, 4950, 4955, 5125, 5140, 5155, and 5165 to record a normal or filterable semantic inconsistency. The arguments for this algorithm are:

dt—the semantic inconsistency type (simulator internal opcode from Table 3) for normal semantic inconsistencies dt_filt—the semantic inconsistency type (simulator internal opcode from Table 3) for filterable semantic inconsistencies flags—flags denoting the access type The arguments used for each particular calling step are given in the descriptions of the corresponding figures.

Step 5300 determines if a filterable semantic inconsistency is being recorded; if not, step 5305 sets the issued simulator internal opcode to dt. Steps 5310–5320 set dt to summ and dt to summ sync for filterable semantic inconsistencies, other than I/O, where the mem_summary flag is set. Step 5325 determines if the semantic inconsistency can be filtered: if both source locations associated with the semantic inconsistency are synchronized and have the same context, step 5330 sets the issued simulator internal opcode to dt filt; otherwise, step 5305 sets the issued opcode to dt. Step 5335 checks to see if the semantic inconsistency has previously been recorded for the current stack entry and source positions; if not, step 5340 creates a semantic inconsistency entry for the issued opcode, stack entry, and source positions and adds the entry to the stack entry dependence node (created in step 1915, 2605, or 3015) list.

VIII. Runtime Library: E. Termination and Simulator Output Generation

FIG. 54 is a flowchart of the algorithm performed by step 3275, or when calls inserted by step 535 are executed during step 135, to terminate step 135 and generate simulator output 140. Step 5400 opens the simulator output file, the name of which was set in step 1205. Step 5405 writes the dynamic call tree, created in step 1900, to the simulator output file; this step comprises performing a depth-first traversal of the tree and generating output for each node. The output consists of one line per tree node, where each line comprises information about the called procedure name and source location, as well as the calling procedure name and call site location. Step 5410 sets a pointer to the first stack entry for the program. Step 5415 determines if any stack entries remain; if so, step 5420 determines if the current stack entry is for a C$PAR PARALLEL region or C$PAR PDO. If so, step 5425 filters the list of semantic inconsistencies for the stack entry, which were recorded in step 5340, to identify possible reductions. Step 5430 writes a line to the simulator output file that identifies the construct type and source location for the stack entry. Step 5435 writes the semantic inconsistencies for the stack entry to the simulator output file; this step comprises, for each item in the stack entry dependence node list, writing a line to the simulator output file comprising the simulator output opcode and source positions. The simulator output opcode is determined from the simulator internal opcode according to Table 4; REDUCTION flags result from the filtering performed in step 5425. Step 5440 advances the pointer to the next stack entry for the program, and step 5445 closes and finalizes the simulator output file.

FIG. 55 is a flowchart of the algorithm performed by step 5425 to filter the list of semantic inconsistencies for a stack entry to identify possible reductions. Step 5500 sets a (first) pointer to the first not_local semantic inconsistency in the list. Step 5505 determines if any not_local semantic inconsistencies remain to be checked; if not, the algorithm terminates. Step 5510 determines if the two source positions for the semantic inconsistency described by the first pointer are identical; if so, step 5515 sets a second pointer to the first partial loc semantic inconsistency in the list. Step 5520 determines if any partial_loc semantic inconsistencies remain to be checked; if so, step 5525 determines if the first and second pointers reference the same source location and symbol. If so, and step 5530 determines that the sink position for the second pointer is in a C$PAR CRITICAL SECTION, the REDUCTION flag is added to the flags for both pointers. Step 5540 advances the second pointer, and step 5545 advances the first pointer, in their respective parts of the list.

IX. Postprocessor

Postprocessor 145 translates simulator output 140 into report 150 so that semantic inconsistencies are reported in a useful, readable format. In particular, simulator output opcodes in simulator output 140 are translated into textual messages that explain the corresponding semantic inconsistencies to the user. Source positions associated with particular semantic inconsistencies are represented in simulator output 140 with symbol numbers; information from program database 105 is used to translate these numbers back into the appropriate procedure names, symbol (variable) names, names of COMMON blocks, names of C$PAR CRITICAL SECTIONs, names of C$PAR ORDERED SECTIONs, etc.

As can be seen, the present invention provides a method for validating the correctness of parallel computer programs by identifying semantic inconsistencies between these programs and their corresponding sequential computer programs. The method is portable across various computer architectures and platforms. The portability and generality of the validation method is facilitated by the method's use of source-to-source transformation and sequential execution techniques, which provide independence of such factors as: the features of a particular hardware architecture or configuration, operating system, compiler, linker, or thread environment; the particular timing or interleaving of events associated with particular parallel executions of programs; the number of threads used; or the programming language used. The present invention supports as inputs a wide variety of common programming languages and parallelism specification methods, and does not require that input parallel computer programs be modified in order to accomplish validation. Semantic inconsistencies are reported with respect to programmer-level constructs in programs being analyzed. Separate compilation is facilitated by the use of a program database.

The preferred embodiment of the present invention illustrates a complete, parallel programming language dialect. Parallel regions, not merely parallel loops, are supported; as a result, many types of semantic inconsistencies associated with parallel regions and with interactions between parallel loops are detected. The preferred embodiment analyzes orphaned as well as conventional nestings of parallel programming constructs with equivalent functionality.

There are several alternative embodiments of the present invention, based on the generality of the structure of the invention. While the preceding description contains many specificities, these should not be construed as limitations on the scope of the invention, but rather as an exemplification of one preferred embodiment thereof. For example, the present invention should not be construed as being restricted to source-to-source program transformation methods, to transformation methods employing the insertion of calls to library procedures, or to validation methods that employ event buffering. The structure does not mandate the use of a program database and does not require that semantic inconsistencies be reported only once, or only at the termination of the analysis. Many variations will become apparent to those skilled in the art from the preceding description and accompanying drawings. Accordingly, the scope of the invention should be determined not by the embodiments illustrated, but by the appended claims and their legal equivalents.

We claim:

1. A method for detecting individual errors in a parallel computer program by translating a parallel computer program into a sequential computer program, said method comprising the steps of:

identifying a parallel computer program having at least one parallelism specification;

generating a corresponding sequential computer program to the parallel computer program by ignoring said at least one parallelism specification contained in the parallel computer program;

adding to said corresponding sequential computer program at least one first instruction, to generate at least one first trace event, said at least one first instruction relating to said corresponding sequential computer program, and at least one second instruction, to generate at least one second trace event, said at least one second instruction based upon the ignored at least one parallelism specification logically partitioning the sequential computer program into at least one disjoint group based upon the at least one second trace event, said at least one disjoint group comprising at least one of the at least one first trace events; and executing only said sequential computer program a single time, and analyzing said at least one disjoint group of said at least one first trace event based on types of second trace events used to partition said at least one first trace event to detect and report each precise semantic inconsistency between said parallel computer program and said corresponding sequential computer program, thereby detecting one or more semantic inconsistencies associated with a plurality of different executions of the parallel computer program.

2. The method of claim 1 further comprising the step of inserting, in said sequential computer program, event trace generating machine instructions, said generating instructions for generating said event trace to identify said semantic inconsistencies.

3. The method of claim 1 further comprising the step of inserting, in said sequential computer program, event trace analyzing machine instructions, said analyzing instructions for analyzing said event trace and detecting and reporting said semantic inconsistencies.

4. The method of claim 2 further comprising the steps of:

selecting one or more instrumentation intervals in said sequential computer program, each of said instrumentation intervals comprising one or more machine instructions in said sequential computer program; and inserting, within each one of said instrumentation intervals, event trace generating machine instructions for generating said event trace to identify said semantic inconsistencies, said generating instructions, when executed, collecting, in a computer storage medium, the portions of said event trace corresponding to said instrumentation intervals.

5. The method of claim 3 further comprising the steps of:

selecting one or more instrumentation intervals in said sequential computer program, each of said instrumentation intervals comprising at least one machine instruction in said sequential computer program, each of said instrumentation intervals being delimited by a start point and an end point; and inserting, at said end point of each of said instrumentation intervals, event trace analyzing machine instructions, said analyzing instructions for analyzing said event trace and detecting and reporting said semantic inconsistencies.

6. The method of claim 4 further comprising the steps of:

declaring a buffer object, said buffer object being addressable within said instrumentation intervals and being stored in said computer storage medium; and inserting, within each one of said instrumentation intervals, event trace generating machine instructions for generating said event trace to identify said semantic inconsistencies, said generating instructions comprising machine instructions that, when executed, store buffer object values into said buffer object, each one of said buffer object values corresponding to an event in said event trace for one of said instrumentation intervals.

7. The method of claim 5 further comprising, for each event in said event trace, the steps of:

determining, based on a current state of said sequential computer program, a new state of said sequential computer program, said new state reflecting the effect of said event in said event trace on said current state;

determining if said new state is semantically inconsistent with said current state given said event in said event trace;

detecting and reporting said semantic inconsistencies; and updating said current state to coincide with said new state.

8. The method of claim 7 wherein said state of said sequential computer program is stored in a computer storage medium and comprises:

a synchronization context comprising a list of at least one synchronization construct that are active at a given point in the execution of said sequential computer program;

a shadow address space comprising, for each of at least one address in the computer storage medium accessed during the execution of said sequential computer and for each synchronization context under which each address was accessed, at least one timestamp; and an event activation stack, the activation stack comprising entries for the events in said event trace corresponding to the procedures and the parallel programming constructs that are active at a given point in the execution of said sequential computer program.

9. The method of claim 8 wherein said at least one timestamp in said shadow address space further comprises a read timestamp and a write timestamp.

10. A system for detecting errors in a parallel computer program by translating a parallel computer program into a sequential computer program, comprising:

a computer storage medium, the computer storage medium for storing a parallel computer program having at least one parallelism specification;

means for generating a corresponding sequential computer program to the parallel computer program by ignoring said at least one parallelism specification contained in the parallel computer program, the corresponding sequential computer program being stored in the computer storage medium;

means for adding to said corresponding sequential computer program at least one instruction to generate at least one trace event based upon the at least one parallelism specification and the corresponding sequential computer program to produce said sequential computer program, the sequential computer program being stored in the computer storage medium; and means for analyzing said at least one trace event when said sequential computer program is executed once to detect and report semantic inconsistencies between said parallel computer program and said corresponding sequential computer program and associated with two or more executions of the parallel computer program.

11. The system of claim 10 further comprising means for inserting, in said sequential computer program, event trace generating machine instructions, said generating instructions for generating said event trace to identify said semantic inconsistencies.

12. The system of claim 10 further comprising means for inserting, in said sequential computer program, event trace analyzing machine instructions, said analyzing instructions for analyzing said event trace and detecting and reporting said semantic inconsistencies.

13. The system of claim 11 further comprising:

means for selecting one or more instrumentation intervals in said sequential computer program, each of said instrumentation intervals comprising one or more machine instructions in said sequential computer program; and means for inserting, within each one of said instrumentation intervals, event trace generating machine instructions for generating said event trace to identify said semantic inconsistencies, said generating instructions, when executed, collecting, in the computer storage medium, the portions of said event trace corresponding to said instrumentation intervals.

14. The method of claim 12 further comprising:

means for selecting one or more instrumentation intervals in said sequential computer program, each of said instrumentation intervals comprising at least one machine instruction in said sequential computer program, each of said instrumentation intervals being delimited by a start point and an end point; and means for inserting, at said end point of each of said instrumentation intervals, event trace analyzing machine instructions, said analyzing instructions for analyzing said event trace and detecting and reporting said semantic inconsistencies.

15. The system of claim 13 further comprising:

means for declaring a buffer object, said buffer object being addressable within said instrumentation intervals and being stored in said computer storage medium; and means for inserting, within each one of said instrumentation intervals, event trace generating machine instructions for generating said event trace to identify said semantic inconsistencies, said generating instructions comprising machine instructions that, when executed, store buffer object values into said buffer object, each one of said buffer object values corresponding to an event in said event trace for one of said instrumentation intervals.

16. The system of claim 14 further comprising, for each event in said event trace:

means for determining, based on a current state of said sequential computer program, a new state of said sequential computer program, said new state reflecting the effect of said event in said event trace on said current state;

means for determining if said new state is semantically inconsistent with said current state given said event in said event trace;

means for detecting and reporting said semantic inconsistencies; and means for updating said current state to coincide with said new state.

17. The system of claim 16 wherein said state of said sequential computer program is stored in the computer storage medium and comprises:

a synchronization context comprising a list of at least one synchronization construct that are active at a given point in the execution of said sequential computer program;

a shadow address space comprising, for each of at least one address in the computer storage medium accessed during the execution of said sequential computer and for each synchronization context under which each address was accessed, at least one timestamp; and an event activation stack, the activation stack comprising entries for the events in said event trace corresponding to the procedures and the parallel programming constructs that are active at a given point in the execution of said sequential computer program.

18. The system of claim 17 wherein said at least one timestamp in said shadow address space further comprises a read timestamp and a write timestamp.

19. The method defined in claim 1, wherein only one trace event is generated for each at least one added instruction.

20. The method defined in claim 1, wherein the step of executing said sequential computer program detects semantic inconsistencies between one or more different parallel executions of said parallel computer program and said corresponding sequential computer program.

21. The method defined in claim 1, wherein the step of executing the sequential computer program is performed only once.

22. The method defined in claim 1, further comprising the step of providing a computer storage medium for storing the sequential computer program and the parallel computer program.

23. The system defined in claim 10, wherein only one trace event is generated for each at least one added instruction.

24. The system defined in claim 10, wherein the means for analyzing detects semantic inconsistencies between one or more different parallel executions of said parallel computer program and said corresponding sequential computer program.

25. The system defined in claim 10, wherein the sequential computer program is executed only once.

* * * * *